US009578491B2

(12) United States Patent
Umehara

(10) Patent No.: US 9,578,491 B2
(45) Date of Patent: *Feb. 21, 2017

(54) TRANSMISSION MANAGEMENT SYSTEM AND TRANSMISSION SYSTEM

(71) Applicant: RICOH COMPANY, LTD., Tokyo (JP)

(72) Inventor: Naoki Umehara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 97 days.

This patent is subject to a terminal disclaimer.

(21) Appl. No.: 14/688,306

(22) Filed: Apr. 16, 2015

(65) Prior Publication Data

US 2015/0256998 A1 Sep. 10, 2015

Related U.S. Application Data

(63) Continuation of application No. 13/809,200, filed as application No. PCT/JP2011/066776 on Jul. 15, 2011, now Pat. No. 9,043,399.

(30) Foreign Application Priority Data

Jul. 28, 2010 (JP) .................................. 2010-169434
May 12, 2011 (JP) .................................. 2011-107320

(51) Int. Cl.
*G06F 15/16* (2006.01)
*H04W 8/22* (2009.01)
(Continued)

(52) U.S. Cl.
CPC ............ *H04W 8/22* (2013.01); *H04L 65/1083* (2013.01); *H04L 65/403* (2013.01);
(Continued)

(58) Field of Classification Search
USPC ........................................ 709/204, 223, 224
See application file for complete search history.

(56) References Cited

U.S. PATENT DOCUMENTS 7,103,806 B1 9/2006 Horvitz
7,631,039 B2 12/2009 Eisenberg
(Continued)

FOREIGN PATENT DOCUMENTS

CN 1794708 A 6/2006
JP 2003-069563 3/2003
(Continued)

OTHER PUBLICATIONS

International Search Report issued Oct. 18, 2011 in PCT/JP2011/066776 Filed Jul. 15, 2011.

(Continued)

*Primary Examiner* — Liangche A Wang
(74) *Attorney, Agent, or Firm* — Oblon, McClelland, Maier & Neustadt, L.L.P.

(57) ABSTRACT

A disclosed transmission management system includes a receiver unit to receive alteration information for altering a communication status of a first transmission terminal from the first transmission terminal that communicates with a second transmission terminal to exchange content data, a terminal management unit to manage first status information indicating the communication status of the first transmission terminal, an acquisition unit to acquire the first status information from the terminal management unit in a case where the receiver unit receives the alteration information for altering the communication status of the first transmission terminal, and an alteration unit to alter the first status information managed by the terminal management unit, based on the alteration information for altering the communication status of the first transmission terminal received by the receiver unit and the first status information acquired by the acquisition unit.

16 Claims, 33 Drawing Sheets

(51) Int. Cl.
  *H04M 3/42* (2006.01)
  *H04N 7/15* (2006.01)
  *H04L 29/06* (2006.01)
  *H04W 76/02* (2009.01)
  *H04M 3/56* (2006.01)

(52) U.S. Cl.
  CPC ........ *H04M 3/42374* (2013.01); *H04N 7/152* (2013.01); *H04W 76/023* (2013.01); *H04M 3/567* (2013.01)

(56) References Cited

U.S. PATENT DOCUMENTS

| | | | |
|---|---|---|---|
| 7,694,010 B2 * | 4/2010 | Bleumer | G06F 11/1474 705/401 |
| 8,243,704 B2 | 8/2012 | Horio et al. | |
| 8,782,229 B2 | 7/2014 | Umehara | |
| 2003/0135629 A1 * | 7/2003 | Sasaki | G06Q 30/02 709/229 |
| 2006/0031682 A1 | 2/2006 | Sakai et al. | |
| 2006/0291580 A1 | 12/2006 | Horvitz | |
| 2007/0081644 A1 * | 4/2007 | Jachner | H04M 3/56 379/106.01 |
| 2008/0120409 A1 | 5/2008 | Sun et al. | |
| 2009/0006571 A1 * | 1/2009 | Muto | H04L 12/24 709/206 |
| 2010/0118109 A1 | 5/2010 | Sakai et al. | |
| 2012/0002003 A1 | 1/2012 | Okita et al. | |
| 2015/0077505 A1 | 3/2015 | Umehara | |
| 2015/0138306 A1 | 5/2015 | Umehara | |

FOREIGN PATENT DOCUMENTS

| | | | |
|---|---|---|---|
| JP | 2003069563 A | * | 3/2003 |
| JP | 2006-287395 | | 10/2006 |
| JP | 2006287395 A | * | 10/2006 |
| JP | 2007-089160 | | 4/2007 |
| JP | 2007089160 A | * | 4/2007 |
| JP | 2007-150841 | | 6/2007 |
| JP | 2007150841 A | * | 6/2007 |
| JP | 2007-243727 | | 9/2007 |
| JP | 2008-98750 | | 4/2008 |
| JP | 2008-283694 | | 11/2008 |
| JP | 2009-21769 | | 1/2009 |
| JP | 2009-246687 | | 10/2009 |
| JP | 2010-124431 | | 6/2010 |
| JP | 2012-075072 | | 4/2012 |
| JP | 2012-075073 | | 4/2012 |

OTHER PUBLICATIONS

Office Action issued Aug. 6, 2013 in Japanese Patent Application No. 2013-125162.
Extended European Search Report issued Oct. 9, 2014 in Patent Application No. 11812414.8.
Office Action issued Oct. 29, 2013 in Japanese Application No. 2013-125162.
Office Action issued Nov. 4, 2014 in Chinese Patent Application No. 201180046957.4 (with English translation).

* cited by examiner

FIG.7

| IP ADDRESS OF RELAY DESTINATION TERMINAL | IMAGE QUALITY OF RELAYED VIDEO DATA |
|---|---|
| 1.3.2.4 | HIGH IMAGE QUALITY |
| 1.3.1.3 | LOW IMAGE QUALITY |
| 1.3.2.3 | MEDIUM IMAGE QUALITY |
| ... | ... |

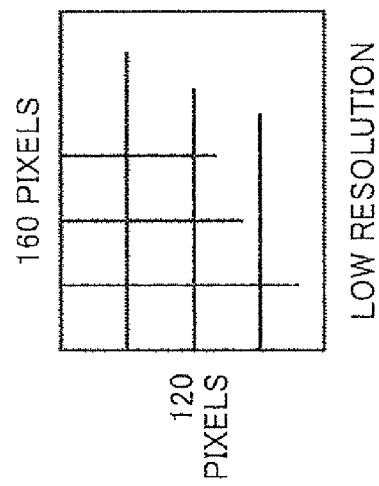
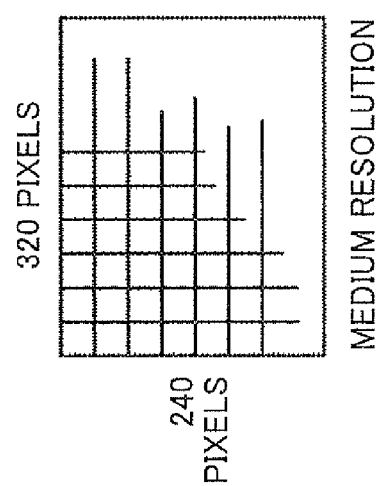
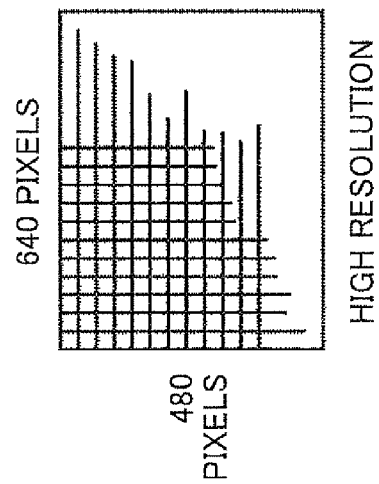

FIG.9

| RELAY DEVICE ID | OPERATING STATUS | RECEIPT TIME AND DATE | IP ADDRESS OF RELAY DEVICE | MAXIMUM DATA TRANSMISSION SPEED (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.10

| TERMINAL ID | PASSWORD |
|---|---|
| 01aa | aaaa |
| 01ab | abab |
| 01ba | baba |
| ... | ... |

FIG.11

| TERMINAL ID | ADDRESS NAME | OPERATING STATUS | COMMUNICATION STATUS | RECEIPT TIME AND DATE | IP ADDRESS OF TERMINAL |
|---|---|---|---|---|---|
| 01aa | AA TERMINAL TOKYO OFFICE JAPAN | ONLINE | NONE | 2009.11.10.13:40 | 1.2.1.3 |
| 01ab | AB TERMINAL TOKYO OFFICE JAPAN | OFFLINE | | 2009.11.09.12:00 | 1.2.1.4 |
| ... | ... | ... | ... | ... | ... |
| 01ba | BA TERMINAL OSAKA OFFICE JAPAN | ONLINE | CALLING | 2009.11.10.13:45 | 1.2.2.3 |
| 01bb | BB TERMINAL OSAKA OFFICE JAPAN | ONLINE | NONE | 2009.11.10.13:50 | 1.2.2.4 |
| ... | ... | ... | ... | ... | ... |
| 01ca | CA TERMINAL NEW YORK OFFICE USA | OFFLINE | | 2009.11.10.12:45 | 1.3.1.3 |
| 01cb | CB TERMINAL NEW YORK OFFICE USA | ONLINE | NONE | 2009.11.10.13:55 | 1.3.1.4 |
| ... | ... | ... | ... | ... | ... |
| 01da | DA TERMINAL WASHINGTON DC OFFICE USA | ONLINE | BUSY | 2009.11.08.12:45 | 1.3.2.3 |
| 01db | DB TERMINAL WASHINGTON DC OFFICE USA | ONLINE | NONE | 2009.11.10.12:45 | 1.3.2.4 |
| ... | ... | ... | ... | ... | ... |

FIG.12

| REQUEST SOURCE TERMINAL ID | DESTINATION TERMINAL ID |
|---|---|
| 01aa | 01ab,···,01ba,01bb,···,01ca,01cb,···,01da,01db,··· |
| 01ab | 01aa,01ca,01cb |
| 01ba | 01aa,01ab,01ca,01cb,01da,01db |
| ... | ... |
| 01db | 01aa,01ab,01ba,···,01da,01ca,01cb,···,01da |
| ... | ... |

FIG.13

| SESSION ID | RELAY DEVICE ID | REQUEST SOURCE TERMINAL ID | DESTINATION TERMINAL ID | DELAY TIME (ms) | DELAY INFORMATION RECEIPT TIME AND DATE |
|---|---|---|---|---|---|
| se1 | 111a | 01aa | 01bb,01cb,01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.14

| DELAY TIME (ms) | IMAGE QUALITY OF VIDEO DATA |
|---|---|
| 0~100 | HIGH IMAGE QUALITY |
| 100~300 | LOW IMAGE QUALITY |
| 300~500 | MEDIUM IMAGE QUALITY |
| 500~ | (INTERRUPTED) |

FIG.15

| SESSION ID | RELAY DEVICE ID |
|---|---|
| 01aa | 111a |
| 01ab | 111a |
| ... | ... |
| 01ba | 111b |
| 01bb | 111b |
| ... | ... |
| 01ca | 111c |
| 01cb | 111c |
| ... | ... |
| 01da | 111d |
| 01db | 111d |
| ... | ... |

FIG.16

| ALTERATION REQUEST INFORMATION | PRE-ALTERATION STATUS INFORMATION | ALTERATION INFORMATION |
|---|---|---|
| CALL | NONE | ACCEPTED |
| JOIN | ACCEPTED | BUSY |
| LEAVE | BUSY | NONE |

FIG.17

| ALTERATION REQUEST INFORMATION | TERMINAL INFORMATION | PRE-ALTERATION STATUS INFORMATION | ALTERATION INFORMATION |
|---|---|---|---|
| INVITE | REQUEST SOURCE | NONE | CALLING |
| | DESTINATION | NONE | RINGING |
| | OWN TERMINAL SELECTION | NONE | ACCEPTED |
| ACCEPT | REQUEST SOURCE | CALLING | ACCEPTED |
| | DESTINATION | ACCEPTED | ACCEPTED |
| | | RINGING | ACCEPTED |
| CANCEL | REQUEST SOURCE | ACCEPTED | NONE |
| | | CALLING | NONE |
| | DESTINATION | RINGING | NONE |

FIG.18

| ALTERATION REQUEST INFORMATION | TERMINAL INFORMATION | ASSESSMENT INFORMATION | PRE-ALTERATION STATUS INFORMATION | ALTERATION INFORMATION |
|---|---|---|---|---|
| REJECT | REQUEST SOURCE | PART | CALLING | CALLING |
| | | ALL | CALLING | NONE |
| | | PART | ACCEPTED | ACCEPTED |
| | DESTINATION | | RINGING | NONE |

FIG.22

ADDRESS LIST

| | AB TERMINAL TOKYO OFFICE JAPAN | AC TERMINAL TOKYO OFFICE JAPAN | AD TERMINAL TOKYO OFFICE JAPAN | AE TERMINAL TOKYO OFFICE JAPAN | AF TERMINAL TOKYO OFFICE JAPAN | AG TERMINAL TOKYO OFFICE JAPAN |
| | BA TERMINAL OSAKA OFFICE JAPAN | BB TERMINAL OSAKA OFFICE JAPAN | BC TERMINAL OSAKA OFFICE JAPAN | BD TERMINAL TOKYO OFFICE JAPAN | BE TERMINAL TOKYO OFFICE JAPAN | BF TERMINAL TOKYO OFFICE JAPAN |
| | CA TERMINAL NEW YORK OFFICE USA | CB TERMINAL NEW YORK OFFICE USA | CC TERMINAL NEW YORK OFFICE USA | CD TERMINAL NEW YORK OFFICE USA | CE TERMINAL NEW YORK OFFICE USA | CF TERMINAL NEW YORK OFFICE USA |
| | DA TERMINAL WASHINGTON DC OFFICE USA | DB TERMINAL WASHINGTON DC OFFICE USA | DC TERMINAL WASHINGTON DC OFFICE USA | DD TERMINAL WASHINGTON DC OFFICE USA | DE TERMINAL WASHINGTON DC OFFICE USA | DF TERMINAL WASHINGTON DC OFFICE USA |

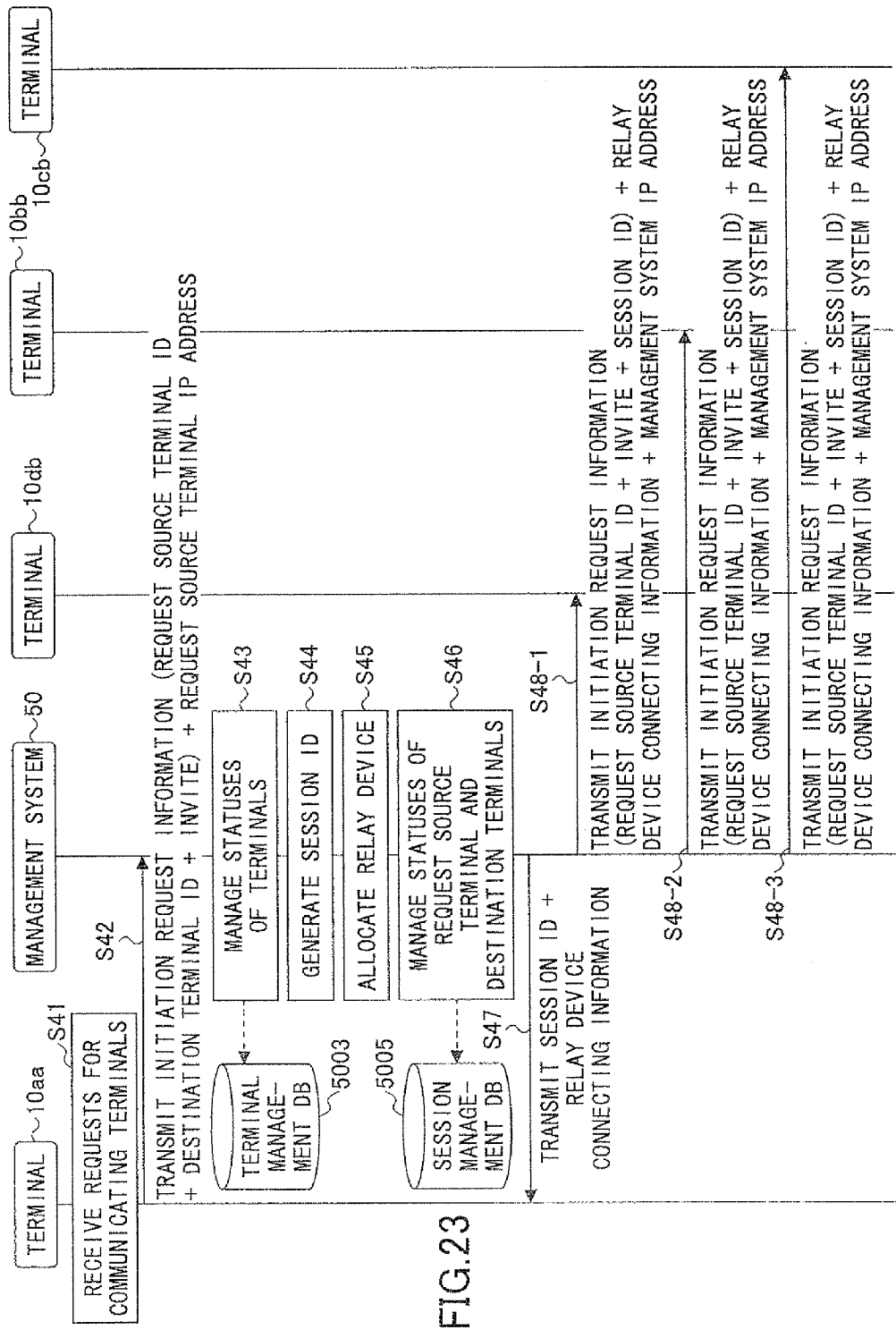

TRANSMISSION MANAGEMENT SYSTEM AND TRANSMISSION SYSTEM

CROSS-REFERENCE TO RELATED APPLICATIONS

The present application is a continuation application of and claims the benefit of priority under 35 U.S.C. §120 from U.S. application Ser. No. 13/809,200, filed Jan. 9, 2013, which is a national stage of International Application No. PCT/JP2011/066776, filed Jul. 15, 2011, which is based upon and claims the benefit of priority under 35 U.S.C. §119 from Japanese Priority Application No. 2010-169434 filed on Jul. 28, 2010 and Japanese Priority Application No. 2011-107320 filed on May 12, 2011, with the Japanese Patent Office, the entire contents of each of which is hereby incorporated by reference.

TECHNICAL FIELD

The disclosures herein generally relate to a transmission system to transmit content data and a transmission management system to manage a status of a transmission terminal to transmit the content data.

BACKGROUND ART

A videoconferencing system is a technology to conduct videoconferences via communication networks such as the Internet. Owing to recent demand for reducing time and expenses for business trips, such a videoconferencing system is becoming increasingly popular. In the videoconferencing system, the videoconference may be implemented by transmitting and receiving telecommunication data such as image data and audio data between two or more terminals at different locations.

In a case where the two terminals at different locations start communicating, and the communications are conducted via Internet Protocol (IP) telephones (i.e., one of phone services), the Session Initiation Protocol (SIP) is generally utilized as a communication protocol to establish a session between the terminals at two different locations. With this type of communication protocol (i.e., SIP), the SIP server controls a call between the communication terminals (i.e., a call is established between the terminals by exchanging call information between them). Once the session has been established between the communication terminals, they are instantly in communication, such as transmitting voice data, with each other. However, since the SIP is designed as the communication protocol specifically to control a call or a communication session between the two locations (i.e., two terminals), the SIP may not control calls among more than two locations (i.e., two or more communication terminals).

U.S. Pat. No. 7,631,039 (hereinafter called "Patent Document 1") discloses an example of a related art technology for initiating a videoconference among terminals at more than two locations. This technology utilizes an allocator that determines conference information indicating a conference attribute. Specifically, in the technology disclosed in Patent Document 1, two or more clients receive the conference information determined by the allocator. These clients are each connected to a multipoint conference unit (MCU) that relays communication data including audio data and image data based on the received conference information. When the MCU has been connected to each of the clients, the MCU relays the communication data received from the clients to the other clients. As a result, a videoconference may be initiated among the clients (terminals) located at more than two locations.

However, in the related art videoconference system, a management system utilized for controlling communications among videoconferencing terminals may not manage communication statuses of the videoconferencing terminals. Accordingly, when the management system transmits information desirable for initiating the communications to destination videoconferencing terminals, connections between the videoconferencing terminals may not be established due to engagement of the destination videoconferencing terminals with other videoconference terminals. That is, in the related art technology, the management system does not detect communication statuses of the destination videoconference terminals before transmitting the information desirable for initiating the communications to destination videoconference terminals, and therefore, the management system may not effectively control the connections among the videoconference terminals.

SUMMARY OF THE INVENTION

It is a general object of at least one embodiment of the present invention to provide a transmission system and a transmission management system that substantially eliminate one or more problems caused by the limitations and disadvantages of the related art.

According to one embodiment, there is provided a transmission management system that includes a receiver unit configured to receive first alteration information for altering a communication status of a first transmission terminal from the first transmission terminal that communicates with a second transmission terminal to exchange content data therebetween; a terminal management unit configured to manage first status information indicating the communication status of the first transmission terminal; an acquisition unit configured to acquire the first status information indicating the communication status of the first transmission terminal from the terminal management unit in a case where the receiver unit receives the first alteration information for altering the communication status of the first transmission terminal; and an alteration unit configured to alter the first status information indicating the communication status of the first transmission terminal managed by the terminal management unit, based on the alteration information for altering the communication status of the first transmission terminal received by the receiver unit and the first status information indicating the communication status of the first transmission terminal acquired by the acquisition unit.

According to another embodiment, there is provided a transmission system that includes the transmission management system; a first transmission terminal and a second transmission terminal configured to communicate with the transmission management system to exchange content data and alteration information for altering communication statuses of the first transmission terminal and the second transmission terminal; and a relay device configured to relay the content data transmitted from the first transmission terminal to the second transmission terminal. In the transmission system, the transmitter unit of the transmission management system transmits the predetermined information for altering the communication status of one of the first transmission terminal and the second transmission terminal to at least one of the first transmission terminal, the second transmission terminal and the relay device.

BRIEF DESCRIPTION OF THE DRAWINGS

Other objects and further features of embodiments will be apparent from the following detailed description when read in conjunction with the accompanying drawings, in which:

FIG. 7 is a conceptual diagram illustrating an alteration quality management table;

FIGS. 8A through 8C are conceptual diagrams illustrating image quality of image data;

FIG. 9 is a conceptual diagram illustrating a relay device management table;

FIG. 10 is a conceptual diagram illustrating a terminal authentication management table;

FIG. 11 is a conceptual diagram illustrating a terminal management table;

FIG. 12 is a conceptual diagram illustrating an address list management table;

FIG. 13 is a conceptual diagram illustrating a session management table;

FIG. 14 is a conceptual diagram illustrating a quality management table;

FIG. 15 is a conceptual diagram illustrating a relay device selection management table;

FIG. 16 is a conceptual diagram illustrating a status alteration management table;

FIG. 17 is another conceptual diagram illustrating a status alteration management table;

FIG. 18 is another conceptual diagram illustrating a status alteration management table;

FIG. 22 is a conceptual diagram illustrating an address list according to an embodiment;

FIG. 23 is a sequence diagram illustrating a process in which communication initiation is requested;

BEST MODE OF CARRYING OUT THE INVENTION

Overall Configuration of Embodiment

Figure 1:
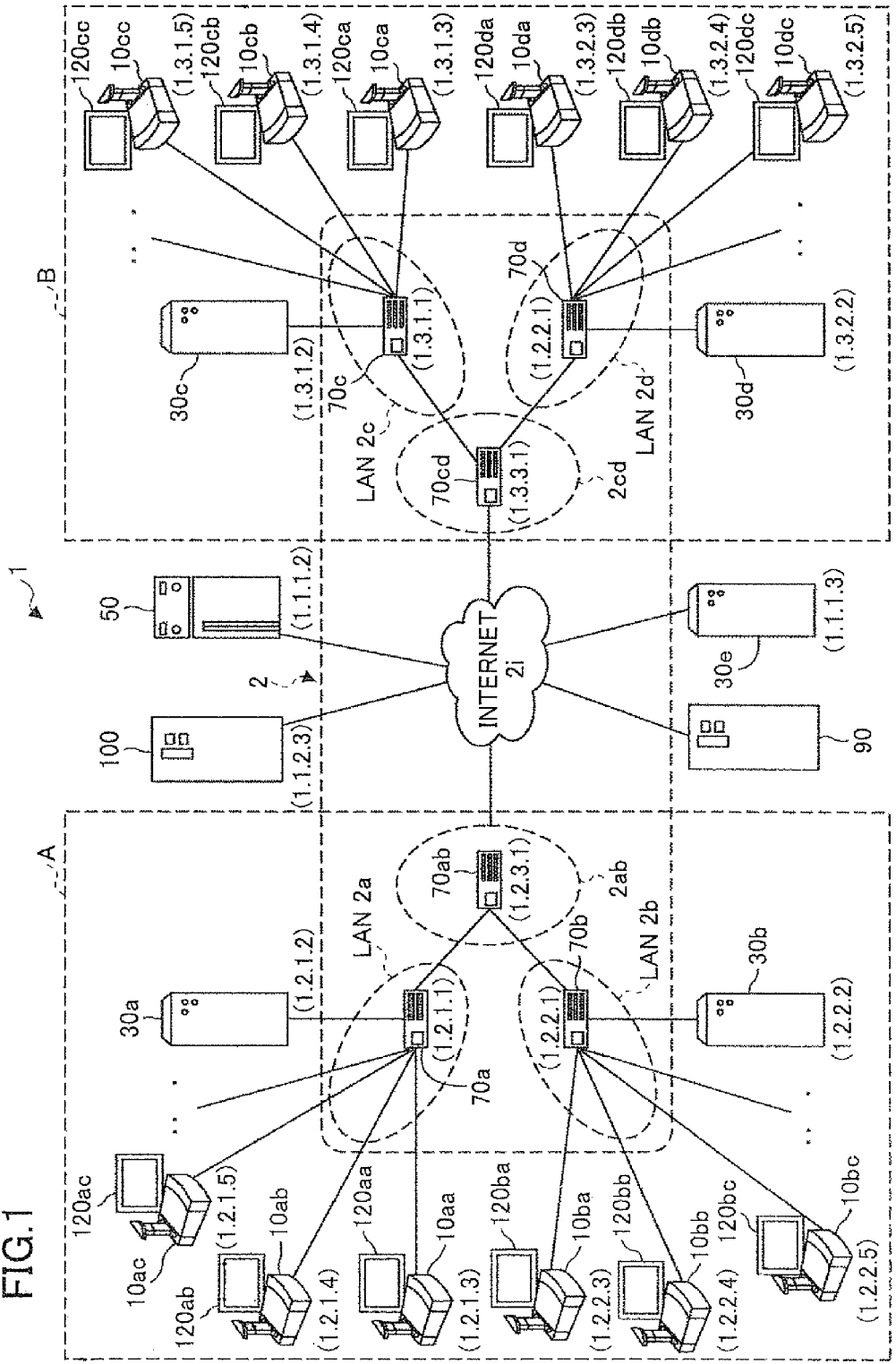
FIG. 1 is a schematic diagram illustrating a transmission system according to an embodiment.

In the following, preferred embodiments will be described with reference to FIGS. 1 through 37. FIG. 1 is a schematic diagram illustrating a transmission system 1 according to an embodiment. Initially, an outline of the transmission system 1 according to the embodiment is described with reference to FIG. 1.

There are various types of transmission systems. One example may be a data providing system. In the data providing system, content data are transmitted from one terminal to another terminal via a transmission management system in one-way direction. Another example may be a communication system. In the communication system, information or emotional expressions are mutually communicated among two or more transmission terminals via the transmission management system. The communication system is utilized for mutually exchanging information or emotional expressions among the two or more communication terminals (i.e., the transmission terminals) via a communication management system (i.e., the transmission management system). Examples of the communications system include a videoconference system, a videophone system, an audio conference system, a voice-call system, and a personal computer screen sharing system.

The following embodiments describe the transmission system, the transmission management system, and the transmission terminal by conceptualizing the videoconference system as an example of the communications system, the videoconference management system as an example of the communication management system, and the videoconference terminal as an example of the communication terminal. That is, the transmission management terminal and the transmission management system utilized in this embodiment may be applied not only to the videoconference system, but may also be applied to the communication system or the transmission system.

As illustrated in FIG. 1, the transmission system 1 includes two or more transmission terminals (10aa, 10ab, . . . ), displays (120aa, 120ab, . . . ) for the transmission terminals (10aa, 10ab, . . . ), two or more relay devices (30a, 30b, 30c, 30d, and 30e), a transmission management system 50, a program providing system 90, and a maintenance system 100.

Note that in this embodiment, any one of the transmission terminals (10aa, 10ab, . . . ) may be referred to as a "transmission terminal 10", any one of the displays (120aa, 120ab, . . . ) for the transmission terminals (10aa, 10ab, . . . ) may be referred to as a "display 120", and any one of the relay devices (30a, 30b, 30c, 30d, and 30e) may be referred to as a "relay device 30".

The transmission terminal 10 is configured to transmit and receive image data and audio data as examples of content data. Note that in the following, the "transmission terminal" and the "transmission management system" may be simply called as the "terminal" and the "management system", respectively. The communications in this embodiment not only include transmission and reception of audio data but also include transmission and reception of image data. That is, the transmission terminal 10 transmits and receives image data and audio data. However, the transmission terminal 10 may transmit and receive the audio data alone without transmitting or receiving the image data.

In this embodiment, dynamic image data (i.e., video data) are illustrated as an example of the image data; however, the image data may also be static image data. Or, the image data may include both the dynamic and the static image data. The relay device 30 is configured to relay the image data and the audio data among the terminals 10. The management system 50 is configured to manage the terminal 10 and the relay device 30 in an integrated fashion.

Routers (70a, 70b, 70c, 70d, 70d, 70ab, and 70cd) depicted in FIG. 1 are configured to select optimal paths for the image data and the audio data. Note that in this embodiment, any one of the routers (70a, 70b, 70c, 70d, 70d, 70ab, and 70cd) may be simply called a "router 70".

The program providing system 90 includes a not-illustrated hard disk (HD) configured to store programs for a terminal, with which the terminal 10 may implement various functions or various methods. Accordingly, the program providing system 90 may transmit such programs for the terminal to the terminal 10. The HD of the program providing system 90 further stores programs for a relay device, with which the relay device 30 may implement various functions or various methods. Accordingly, the program providing system 90 may also transmit such programs for the relay device to the relay device 30. In addition, the HD of the program providing system 90 further stores transmission management programs, with which the management system 50 may implement various functions or various methods. Accordingly, the program providing system 90 may also transmit such transmission management programs to the management system 50.

The maintenance system 100 is a computer configured to maintain or manage at least one of the terminal 10, the relay device 30, the management system 50, and the program providing system 90. For example, if the maintenance system 100 is domestically located while the terminal 10, the relay device 30, the management system 50 or the program providing system 90 is located abroad, the maintenance system 100 remotely maintains or manages at least one of the terminal 10, the relay device 30, the management system 50, and the program providing system 90 via a communication network 2. Further, the maintenance system 100 performs maintenance, such as the management of a model number, a manufacturer's serial number, a sales destination, a maintenance inspection, and a failure history, on at least one of the terminal 10, the relay device 30, the management system 50, and the program providing system 90 without utilizing the communication network 2.

The terminals (10aa, 10ab, 10ac, 10a . . . ), the relay device 30a and the router 70a are connected via a LAN 2a so that they may communicate with one another. Further, the terminals (10ba, 10bb, 10bc, 10b . . . ), the relay device 30b and the router 70b are connected via a LAN 2b so that they may communicate with one another. As illustrated in FIG. 1, the LAN 2a and LAN 2b are set up in a predetermined region A. In the region A, the LAN 2a and LAN 2b are connected via a dedicated line 2ab including the router 70ab so that they may communicate with one another. For example, the region A may be Japan, and the LAN 2a may be set up in the Tokyo Office, whereas the LAN 2b may be set up in the Osaka Office.

Meanwhile, the terminals (10ca, 10cb, 10cc, 10c . . . ), the relay device 30c and the router 70c are connected via a LAN 2c so that they may communicate with one another. The terminals (10da, 10db, 10dc, 10d . . . ), the relay device 30d and the router 70d are connected via a LAN 2d so that they may communicate with one another. Further, the LAN 2c and LAN 2d are set up in a predetermined region B. In the region B, the LAN 2c and LAN 2d are connected via a dedicated line 2cd including the router 70cd so that they may communicate with one another. For example, the region B may be USA, and the LAN 2c may be set up in the New York Office, whereas the LAN 2d may be set up in the Washington, D.C. Office. The region A and the region B are connected from the respective routers 70ab and 70cd via the Internet 2i so that the region A and the region B are mutually in communication via the Internet 2i.

Further, the management system 50 and the program providing system 90 are connected to the terminal 10 and the relay device 30 via the Internet 2i so that they may communicate with one another. The management system 50 and the program providing system 90 may be located in the region A or the region B, or may be a region other than the regions A and B.

The relay device 30e is connected to the terminal 10 via the communication network 2. The relay device 30e is configured to be operating constantly, and may be located in a region other than the regions A and B for not being affected by the communications in the local areas of the regions A and B. Thus, when the terminal 10 desires to communicate with another terminal located in the other local area, the relay device 30e is utilized for relaying the communication data between the two terminal at different local areas. Further, the relay device 30e may also be utilized as an emergency relay device when the terminals located within the same local area desire to communicate with one another but the relay devices located in this local area are not operating.

Note that in this embodiment, the communication network 2 is made up of the LAN 2a, the LAN 2b, the dedicated line 2ab, the Internet 2i, the dedicated line 2cd, the LAN 2c and the LAN 2d. In the communication network 2, the communications are typically carried out via the wires, but may partially carried out wirelessly.

In FIG. 1, the set of four numerals attached beneath each of the terminal 10, the relay device 30, the management system 50, the router 70, the program providing system 90, and the maintenance system 100 simply indicates the IP address of the typical IPv4. For example, the IP address for the terminal 10aa is "1.2.1.3", as illustrated in FIG. 1. The IP addresses may be the IPv6; however, in this embodiment, the Ipv4 is used for simplifying the illustration.

Hardware Configuration of Embodiment

Next, the hardware configuration of the transmission system 1 according to the embodiment is described. In this embodiment, when the delay in receiving the image data by the terminal 10 is detected, the resolution of the image data may be altered by the relay device 30 and then the altered image data may be transmitted to the terminal 10 that is utilized as a relay destination.

Figure 37:
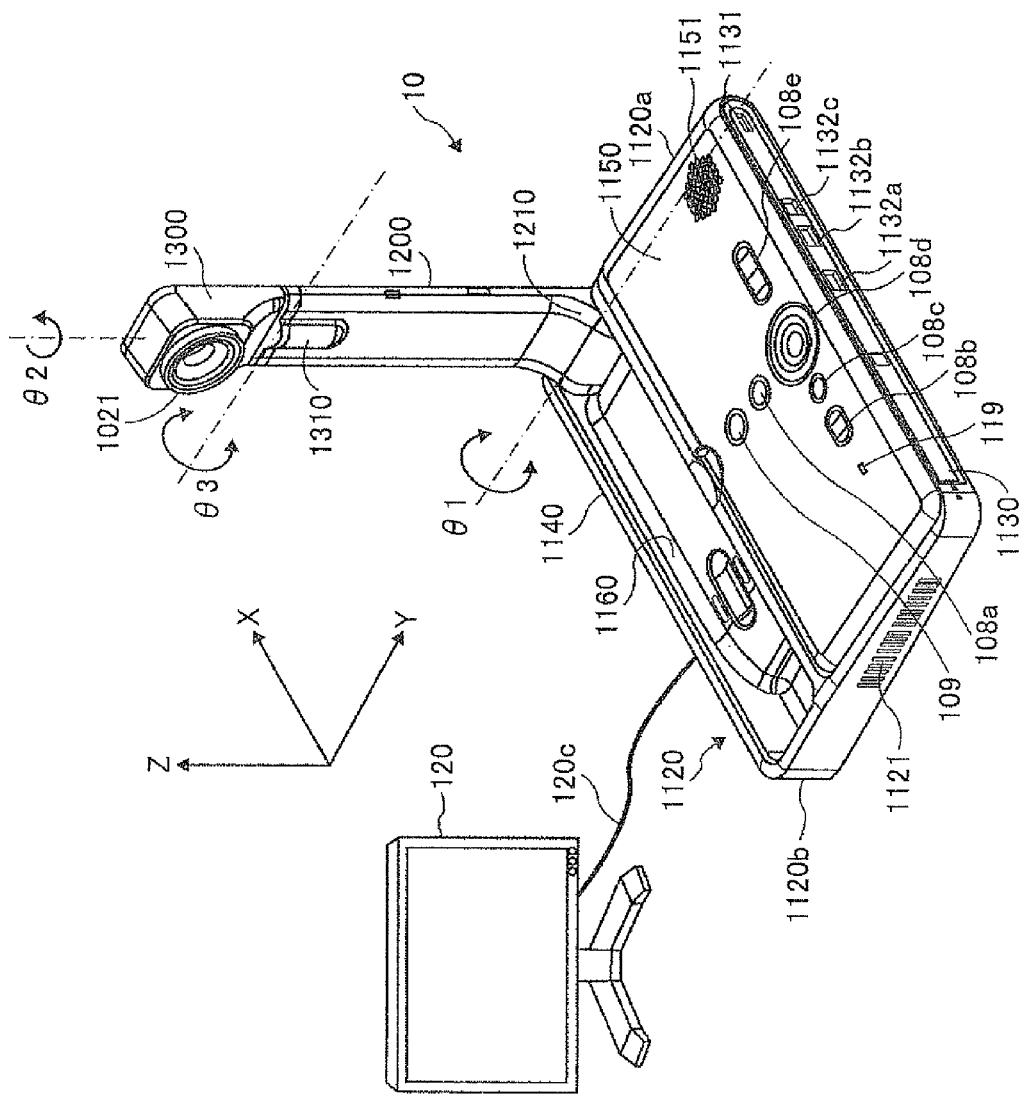
FIG. 37 is an external diagram illustrating the transmission terminal utilized in the transmission system according to the embodiment.

FIG. 37 is an external diagram illustrating the terminal 10 according to the embodiment. Hereinafter, an X-axis direction represents a longitudinal direction of the terminal 10, a Y-axis direction represents a direction perpendicular to the X-axis direction in a horizontal plane, a Z-axis direction represents a direction perpendicular to the X-axis direction and the Y-axis direction (i.e., vertical direction).

As illustrated in FIG. 37, the terminal 10 includes a case 1120, an arm 1200 and a camera housing 1300. A front-wall face 1120a of the case 1120 includes a not-illustrated air-intake face formed of air-intake holes and a rear-wall face 1120b of the case 1120 includes an exhaust face 1121 formed of exhaust holes. Accordingly, the terminal 10 may take in external air behind the terminal 10 via the air-intake face and exhaust the air inside the terminal 10 via the exhaust face 1121 by driving a cooling fan arranged inside the case 1120. A right-wall face 1130 of the case 1120 includes a sound collecting hole 1131, via which a build-in microphone 114 (see FIG. 2) is capable of picking up audio sound such as voice, sound, or noise.

The right-wall face 1130 of the case 1120 includes an operations panel 1150. The operations panel 1150 includes operations buttons (108a to 108e), a later-described power switch 109, a later-described alarm lamp 119, and a sound output face 1151 formed of sound output holes for outputting sound from a later-described built-in speaker 115. Further, a left-wall face 1140 of the case 1120 includes a recessed seating unit 1160 for accommodating an arm 1200 and an operations panel 1200. The right-wall face 1130 of the case 1120 further includes connecting ports (1132a to 1132c) for electrically connecting cables to a later-described external device connecting IF 118. The left-wall face 1140 of the case 1120 further includes a not-illustrated connecting port for electrically connecting a display cable 120c cable to the later-described external device connecting IF 118.

Note that hereinafter, any one of the operations buttons (108a to 108e) may be called an "operations button 108" and any one of the connecting ports (1132a to 1132c) may be called a "connecting port 1132".

Next, the arm 1200 is attached to the case 1120 via a torque hinge 1210 such that the arm 1200 moves in upward and downward directions within a tilt-angle θ1 range of 135 degrees with respect to the case 1120. The arm 1200 illustrated in FIG. 37 is arranged at a tilt-angle θ1 of 90 degrees.

The camera housing 1300 includes a later-described camera 112 configured to take images of a user, documents, a room, and the like. The camera housing 1300 further includes a torque hinge 1310. The camera housing 1300 is attached to the arm 1200 via the torque hinge 1310. The camera housing 1300 is rotationally attached to the arm 1200 in the upward and downward directions via the torque hinge 1310 such that the camera housing 1300 moves in a pan-angle θ2 range of ±180 degrees and a tilt-angle θ3 range of ±45 degrees based on the pan and tilt angles illustrated in FIG. 37 are both 0.

Note that external appearances of the relay device 30, the management system 50, the program providing system 90, and the maintenance system 100 are all similar to a typical server computer, and their descriptions are therefore omitted.

Figure 2:
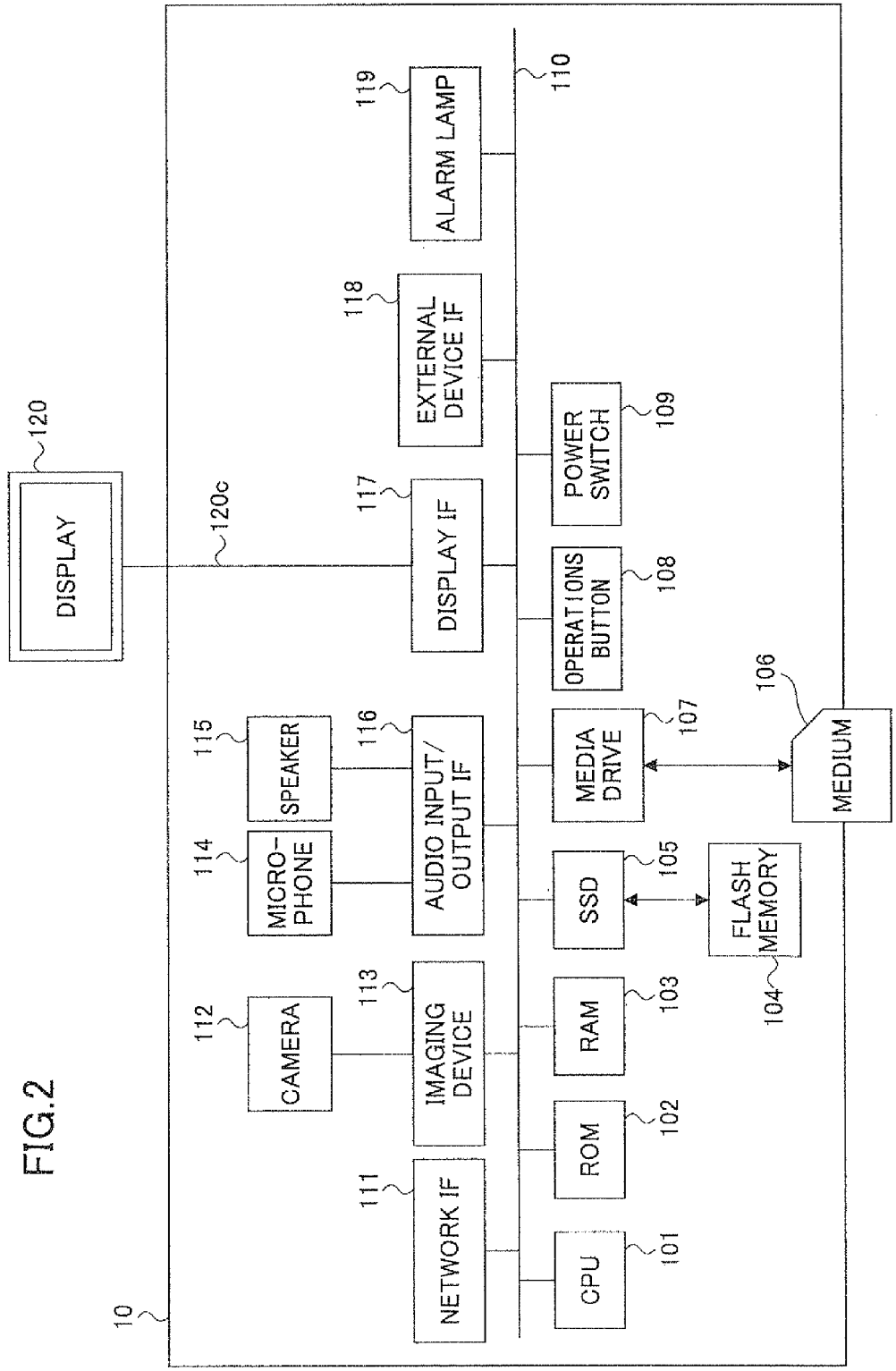
FIG. 2 is a hardware configuration diagram illustrating a transmission terminal in the transmission system according to the embodiment.

FIG. 2 is a hardware configuration diagram illustrating the terminal (i.e., transmission terminal) 10 according to an embodiment. As illustrated in FIG. 2, the terminal 10 includes a central processing unit (CPU) 101 configured to control overall operations of the terminal 10, a read only memory (ROM) 102 storing programs for the terminal, a random access memory (RAM) 103 utilized as a work area of the CPU 101, a flash memory 104 configured to store various data such as image data or audio data, a solid state drive (SDD) 105 configured to control retrieval and writing (storing) of the various data in the flash memory 104 and the like based on the control of the CPU 101, a media drive 107 configured to control retrieval and writing (storing) of data into a recording medium 106 such as a flash memory, the operations button 108 operated by a user for selecting an address of the terminal 10, the power switch 109 for switching ON/OFF of the power of the terminal 10, and a network interface (IF) for transmitting data utilizing the communication network 2.

The terminal 10 further includes the built-in camera 112 configured to image a subject based on the control of the CPU 101, an imaging device IF 113 configured to control driving of the camera 112, a display IF configured to transmit image data to the external display 120 based on the control of the CPU 101, the external device connecting IF 118 configured to connect various external devices to the connecting ports (1132a to 1132c) illustrated in FIG. 37, the alarm lamp 119 configured to inform the user of various functional problems of the terminal 10, and a bus line 110 such as an address bus or a data bus for electrically connecting the elements and devices with one another illustrated in FIG. 2 via the bus line 110.

The display 120 is a display unit formed of liquid crystal or an organic EL material configured to display images of the subject or icons for operating the terminal 10. Further, the display 120 is connected to the display IF 117 via the cable 120c (see FIG. 37). The cable 120c may be an analog RGB (VGA) cable, a component video cable, a high-definition multimedia interface (HDMI) cable or a digital video interface (DVI) cable.

The camera 112 includes lenses and a solid-state image sensor configured to convert light into electric charges to produce digital images (videos) of the subject. Examples of the solid-state image sensor include a complementary metal oxide semiconductor (CMOS) or a charge coupled device (CCD).

The external device connecting IF 118 may be connected via a universal serial bus (USB) with external devices such as the external camera, the external microphone, and the external speaker. On connecting the external camera to the external device connecting IF 118 via the USB, the external camera is driven in priority to the built-in camera 112. Likewise, on connecting the external microphone or external speaker to the external device connecting IF 118 via the USB, the external microphone or external speaker is driven in priority to the built-in microphone 114 or the built-in speaker 115.

Note that the recording medium 106 is removable from the terminal 10. In addition, if the recording medium 106 is a non-volatile memory configured to retrieve or write data based on the control of the CPU 101, the recording medium 106 is not limited to the flash memory 104, and may be an electrically erasable and programmable ROM (EEPROM).

Further, the aforementioned programs for the terminal may be recorded in an installable format or in an executable format on a computer-readable recording medium such as the recording medium 106 to distribute such a recording medium.

Figure 3:
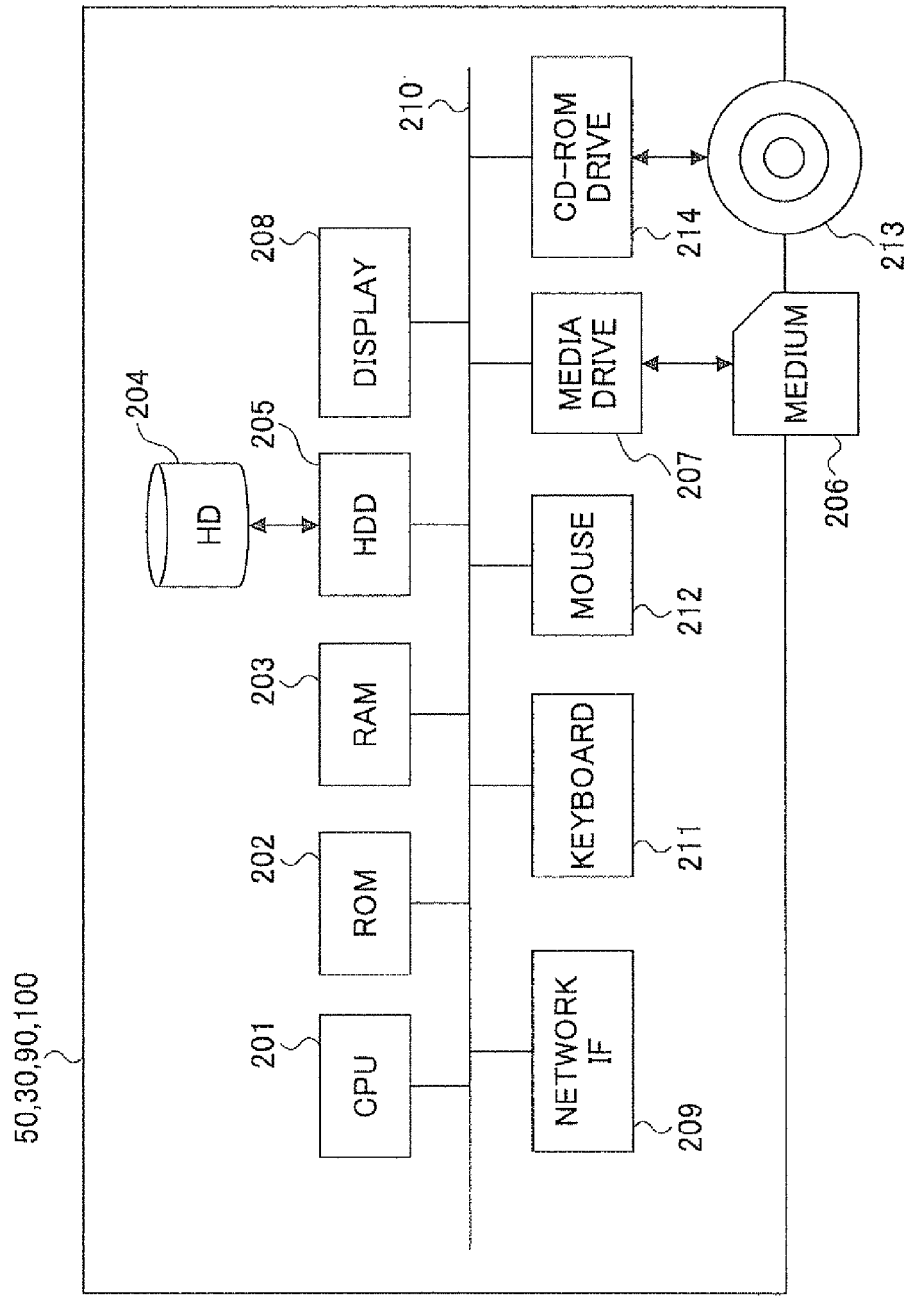
FIG. 3 is a hardware configuration diagram illustrating a transmission management system, a relay device, a program providing system, or a maintenance system in the transmission system according to the embodiment.

FIG. 3 is a hardware configuration diagram illustrating the management system 50 according to an embodiment. The management system 50 includes a central processing unit (CPU) 201 configured to control overall operations of the management system 50, a read only memory (ROM) 202 storing programs for the transmission management, a random access memory (RAM) 203 utilized as a work area of the CPU 201, a hard disk (HD) 204 configured to store various data, a hard disk drive (HDD) 205 configured to control retrieval and writing (storing) of the various data in the HD 204 based on the control of the CPU 201, a media drive 207 configured to control retrieval and writing (storing) of data into a recording medium 206 such as a flash memory, a display 208 configured to display various information such as a cursor, menus, windows, characters and images, a network IF 209 for transmitting data utilizing the later-described communication network 2, a keyboard 211 including plural keys for inputting the characters, numerals, and various instructions, a mouse 212 for selecting or executing various instructions, selecting items to be processed, and moving the cursor, a CD-drive 214 configured to control retrieval or writing of data in the compact disk read-only memory (CD-ROM) 213 as an example of a removable recording medium, and a bus line 210 such as an address bus or a data bus for electrically connecting the elements and devices with one another illustrated in FIG. 3 via the bus line 210.

Note that the aforementioned programs for the transmission management may be recorded in an installable format or in an executable format on a computer-readable recording medium such as the recording medium 206 or the CD-ROM 213 to distribute such a recording medium.

Further, the relay device 30 includes a hardware configuration similar to that of the management system 50, and the description of the hardware configuration of the relay device 30 is therefore omitted. Note that the ROM 202 stores programs for controlling the relay device 30. In this case, the programs for the relay device may also be recorded in an installable format or in an executable format on a computer-readable recording medium such as the recording medium 206 or the CD-ROM 213 to distribute such a recording medium.

Further, the program providing system 90 includes a hardware configuration similar to that of the management system 50, and the description of the hardware configuration of the program providing system 90 is therefore omitted. Note that the ROM 202 stores programs for controlling the program providing system 90. In this case, the programs for the program providing system 90 may also be recorded in an installable format or in an executable format on a computer-readable recording medium such as the recording medium 206 or the CD-ROM 213 to distribute such a recording medium.

Further, the maintenance system 100 includes a hardware configuration similar to that of the management system 50, and the description of the hardware configuration of the maintenance system 100 is therefore omitted. Note that the ROM 202 stores programs for controlling the maintenance system 100. In this case, the programs for the maintenance system 100 may also be recorded in an installable format or in an executable format on a computer-readable recording medium such as the recording medium 206 or the CD-ROM 213 to distribute such a recording medium.

Note that other examples of the removable recording medium include a compact disc recordable (CD-R), a digital versatile disk (DVD), and a Blu-ray Disc (BD).

Functional Configuration of Embodiment

Figure 4:
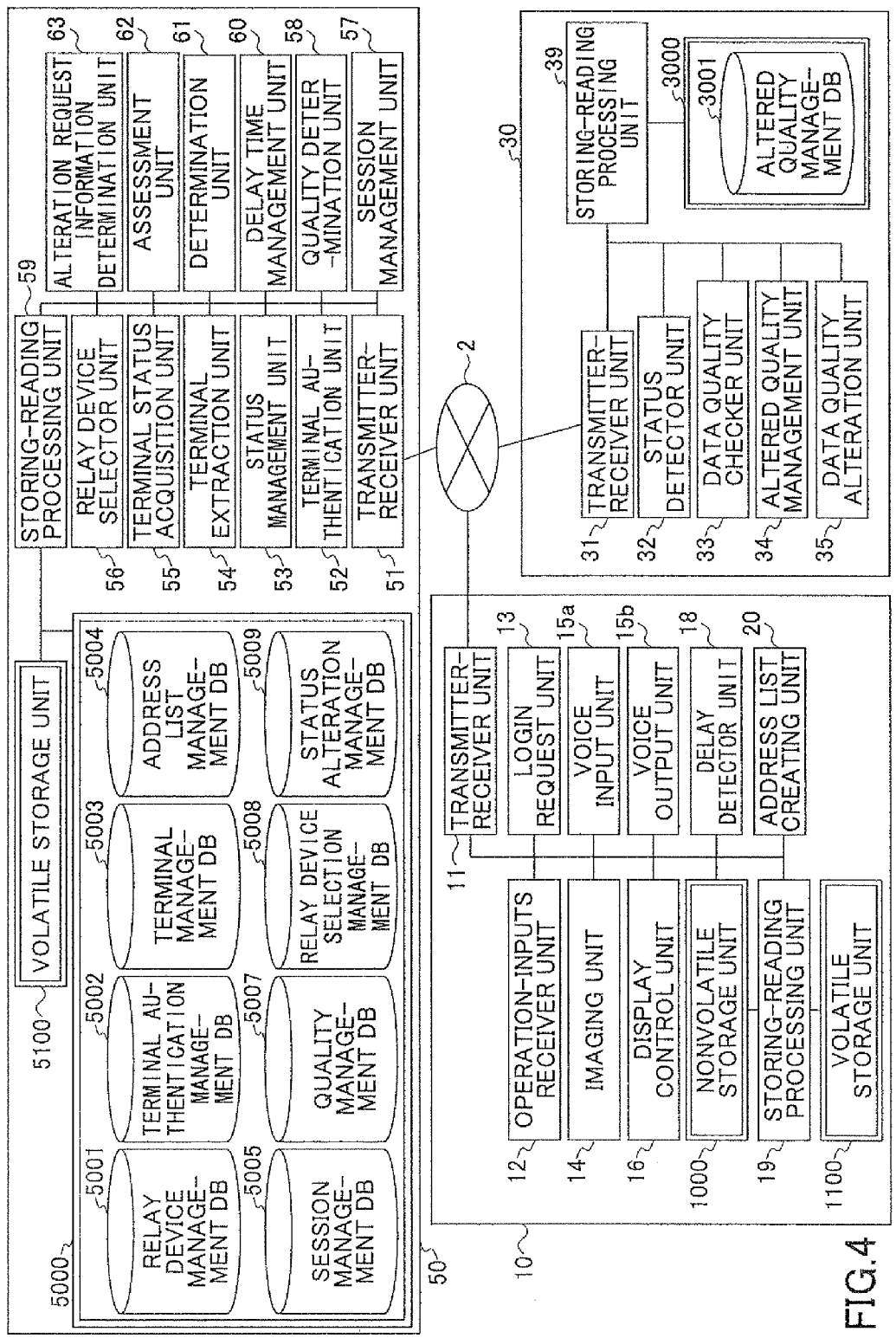
FIG. 4 is a functional block diagram illustrating the transmission terminal, the relay device, and the management system that constitute the transmission system according to the embodiment.

Next, a functional configuration of the transmission system 1 according to the embodiment is described. FIG. 4 is a functional block diagram illustrating the transmission terminal 10, the relay device 30, and the manager system 50 that constitute the transmission system 1 according to the embodiment. As illustrated in FIG. 4, the terminal 10, the relay device 30, and the management system 50 are connected via the communication network 2 such that they carry out data communications with one another via the communication network 2. Note that the program providing system 90 and the maintenance system 100 are not directly associated with videoconferencing communications, and their illustrations are therefore omitted from FIG. 4.

[Functional Configuration of Terminal]

The terminal 10 includes a transmitter-receiver unit 11, an operation-inputs receiver unit 12, a login request unit 13, an imaging unit 14, a sound input unit 15a, a voice output unit 15b, a display control unit 16, a delay detector unit 18, a storing-reading processing unit 19, and an address list creating unit 20. The above units represent functions and units implemented by any of the elements and devices illustrated in FIG. 2, which are activated by instructions from the CPU 201 based on the programs stored in the ROM 102. Further, the terminal 10 further includes a volatile storage unit 1100 formed of the RAM 103 illustrated in FIG. 2, and a non-volatile storage unit 1000 formed of the flash memory 104 illustrated in FIG. 2.

[Functional Units of Terminal]

Next, the functional units of the terminal 10 are described in more detail. The transmitter-receiver unit 11 of the terminal 10 is configured to transmit various data (information) to and receive such data from other terminals, relay devices, and systems. The function of the transmitter-receiver unit 11 may be implemented by the network IF 111 illustrated in FIG. 2. The transmitter-receiver unit 11 starts receiving status information of each of destination candidate terminals from the management system 50 before initiating communication with desired destination terminals. Note that the status information not only includes an operating status (online or offline status), but also includes a detailed status such as engaging or waiting status during the terminal 10 being online. The status information further includes various statuses in addition to the operating status of the terminal 10, examples of which include a status of disconnected cables from the terminal 10, a status of incapability of outputting images while outputting sound, and a mute status of incapability of outputting sound. The following example illustrates a case where the status information is the operating status of the terminal 10.

The operation-inputs receiver unit 12 is configured to receive various inputs from the user, and such a function of the operation-inputs receiver unit 12 is implemented by the operations button 108 and the power switch 109 illustrated in FIG. 2. For example, when the user switches ON the power switch 109 in FIG. 2, the operation-inputs receiver unit 12 illustrated in FIG. 4 receives a power-ON signal to switches ON the power of the terminal 10.

The login request unit 13 is configured to automatically transmit login request information indicating that the user desires to login, and a current IP address of the terminal 10 as an IP address of a request source terminal from the transmitter-receiver unit 11 to the management system 50 via the communication network 2 when the power-ON signal is received by the operation-inputs receiver unit 12 as a trigger. Such a function of the login request unit 13 is implemented by instructions received from the CPU 101 illustrated in FIG. 2. On the other hand, when the user switches OFF the power switch 109, the transmitter-receiver unit 11 transmits power off status information to the management system 50, and the operation-inputs receiver unit 12 subsequently turns OFF the power of the terminal 10 completely. Accordingly, the management system 50 may detect a power status of the terminal 10 as an OFF status.

The imaging unit 14 is configured to take an image of a subject and output image data of the subject, and such a function of the imaging unit 14 is implemented by instructions received from the CPU 101 illustrated in FIG. 2, and also by the camera 112 and the imaging device IF 113 also illustrated in FIG. 2. The sound input unit 15a is configured to input audio data of the audio signal obtained by the microphone 114 that converts voice of the user into the audio signal, and such a function of the sound input unit 15a is implemented by the audio input/output IF 116 illustrated in FIG. 2. The imaging unit 14 is configured to take an image of a subject and output image data of the subject, and such a function of the imaging unit 15 is implemented by instructions received from the CPU 101 illustrated in FIG. 2, and also by the camera 116 and the imaging device IF 113 also illustrated in FIG. 2.

The display control unit 16 is configured to control transmission of the image data to the external display 120, and such a function of the display control unit 16 may be implemented by the network IF 117 illustrated in FIG. 2. The display control unit 16 controls the display 120 such that the display 120 displays the address list containing names of destination terminals to which corresponding status information items of the destination terminals received by the transmitter-receiver unit 11 are reflected before the terminal 10 as the source terminal initiates videoconferencing communications with the desired destination terminals.

For example, the display 120 displays an address list frame 11-1 illustrated in FIG. 22. As illustrated in FIG. 22, the address list frame 11-1 includes names of the destination terminals such as "AB TERMINAL TOKYO OFFICE JAPAN" 11-2, and icons (11-3a, 11-3b, 11-3c, and 11-3d) of status information items for corresponding destination terminal names. The icon 11-3a represents a status where one of destination candidate terminals is in an online and standby status, which indicates that this destination candidate terminal is ready to receive a call. The icon 11-3b represents a status where one of destination candidate terminals is in an offline status, which indicates that this destination candidate terminal is unable to receive a call. The icon 11-3b represents a status where one of destination candidate terminals is already talking to another terminal and is in an engaged status, which indicates that this destination candidate terminal is ready to receive another call in addition to the call already received (i.e., ready to accept a three-party call). The icon 11-3d represents a status where one of destination candidate terminals is calling another terminal or is being called from another terminal, which indicates that this destination candidate terminal is unable to receive a call from other terminals. The icon 11-3d further represents a status where this destination candidate terminal is unable to receive a call from the other terminals since the destination candidate terminal has authorized the call from another terminal or being authorized by another terminal. The address list frame 11-1 includes a scroll bar 11-4 on its right-hand side, and undisplayed address (destination) names and their statuses of the destination candidate terminals in FIG. 22 will appear by selecting an upward-pointing triangle icon or a downward-pointing triangle icon.

The delay detector unit 18 is configured to detect a delayed time (ms) of the image data or the audio data transmitted from another terminal 10 via the relay device 30, and such a function of the delay detector unit 18 may be implemented by instructions received from the CPU 101 illustrated in FIG. 2.

The storing-reading processing unit 19 is configured to store various data in a nonvolatile storage unit 1000 or retrieve various data from the nonvolatile storage unit 1000, and such a function of the storing-reading processing unit 19 may be implemented by instructions received from the CPU 101 and also by the SSD 105 illustrated as an example in FIG. 2. The nonvolatile storage unit 1000 stores a terminal identification (ID), and a password, and the like for identifying the terminal 10. The storing-reading processing unit 19 is configured to further store various data in the volatile storage unit 1100 and retrieve various data from the volatile storage unit 1100. The storing-reading processing unit 19 overwrites the image data and the audio data in the volatile storage unit 1100 with new ones received from the destination terminal every time the terminal 10 talks to the destination terminals. Note that the display 120 displays previous image data before being overwritten with the new image data and the speaker 115 outputs previous audio data before being overwritten with the new audio data.

The address list creating unit 20 is configured to create and update an address list illustrated in FIG. 22 which display statuses of the destination candidates with icons based on the later-described address list information and the status information of the terminal 10 as a destination candidate.

Note that the terminal ID and the later-described relay device ID individually indicate identification information formed of language, characters, and various symbols that uniquely identify the terminal and the relay device. The terminal ID and the relay device ID may be the identification information formed of a combination of two or more of the languages, characters, and various symbols.

(Functional Configuration of Relay Device)

Next, functions and units of the relay device 30 are described. As illustrated as an example in FIG. 4, the relay device 30 includes a transmitter-receiver unit 31, a status detector unit 32, a data quality checker unit 33, a alteration quality management unit 34, a data quality alteration unit 35, and a storing-reading processing unit 39. The above units represent functions and units implemented by any of the elements and devices illustrated in FIG. 3, which are activated by instructions from the CPU 201 based on the programs stored in the ROM 202. Further, the relay device 30 further includes a nonvolatile storage unit 3000 formed of the HD 204 illustrated in FIG. 3, which is capable of maintaining the various data or information even when the power of the relay device 30 is turned off.

(Alteration Quality Management Table)

The nonvolatile storage unit 3000 includes an alteration quality management DB 3001 formed of an alteration quality management table illustrated in FIG. 7. The alteration quality management table includes IP addresses of the terminals 10 utilized as relay destination terminals in relation to image quality of the image data relayed by the respective terminals 10.

Herein, the resolutions of the image data treated in this embodiment are described. FIG. 8A represents a base image used as a low-resolution image formed of 160*120 pixels, FIG. 8B represents a medium-resolution image formed of 320*240 pixels and FIG. 8C represents a high-resolution image formed of 640*480 pixels. When the image data are relayed via a narrowband path, the low-resolution image data used as the base image are relayed. When the image data are relayed via a relatively wide band path, the low-resolution image data used as the base image and the medium-resolution image data exhibiting medium image quality are relayed. When the image data are relayed via a extremely wide band path, the low-resolution image data used as the base image, the medium-resolution image data exhibiting the medium image quality, the high-resolution image data exhibiting high image quality are relayed. As illustrated in FIG. 7, if, for example, the relay device 30 relays the image data addressed to the destination terminal having an IP address "1.3.2.4", the quality of the image data relayed is "high image quality".

[Functional Units of Relay Device]

Next, the functional configuration of the relay device 30 is described. Note that in the following description, the functions of the relay device 30 are illustrated in association with the main elements and devices for implementing the units of the relay device 30 illustrated in FIG. 3.

The transmitter-receiver unit 31 of the relay device 30 is configured to transmit various data (information) to and receive such data from other terminals, relay devices and systems. The function of the transmitter-receiver unit 31 may be implemented by the network IF 209 illustrated in FIG. 3. The status detector unit 32 is configured to detect an operating status of the relay device 30 having the status detector unit 32. The function of the status detector unit 32 may be implemented by instructions from the CPU 201 illustrated in FIG. 3. The operating status may be "ONLINE", "OFFLINE" or "FAILED".

The data quality checker unit 33 is configured to search the alteration quality management table (see FIG. 7) by the IP address of the destination terminal as a search key, and check image quality of the relayed image data by extracting the image quality for the corresponding image data to be relayed. The function of the data quality checker unit 33 may be implemented by instructions from the CPU 201 illustrated in FIG. 3. The alteration quality management unit 34 is configured to alter content of the alteration quality management table of the status alteration management DB 3001 based on the later-described quality information transmitted from the management system 50. The function of the alteration quality management unit 34 may be implemented by instructions from the CPU 201 illustrated in FIG. 3. For example, assume that while a videoconference is held between a request source terminal (terminal 10aa) having a terminal ID "01aa" and a destination terminal (terminal 10db) having a terminal ID "01db", another videoconference is initiated between a request source terminal (terminal 10bb) and a destination terminal (terminal 10ca) via the communication network 2. In this case, if the reception of the image data is delayed in the destination terminal (10db), the relay device 30 may need to degrade the image quality of the relayed image data from high image quality to medium image quality. In such a case, content of the alteration quality management table of the status alteration management DB 3001 is altered such that the quality of the image data relayed by the relay device 30 is degraded from the high image quality to the medium image quality.

The data quality alteration unit 35 is configured to alter the image quality of the image data transmitted from the transmission source terminal 10 based on the altered content of the alteration quality management table of the status alteration management DB 3001. The function of the data quality alteration unit 35 may be implemented by instructions from the CPU 201 illustrated in FIG. 3. The storing-reading processing unit 39 is configured to store various data in the nonvolatile storage unit 3000 and retrieve various data from the nonvolatile storage unit 3000. The function of the storing-reading processing unit 39 may be implemented by the HDD 205 illustrated in FIG. 3.

[Functional Configuration of Management System]

Next, functions and units of the management system 50 are described. The management system 50 includes a transmitter-receiver unit 51 (an example of a receiver unit; an example of a transmitter request), a terminal authentication unit 52, a status management unit 53, a terminal extraction unit 54, a terminal status acquisition unit 55, a relay device selector unit 56, a session management unit 57, a quality determination unit 58, a storing-reading processing unit 59, a delay time management unit 60, a determination unit 61, and an assessment unit 62. The above units represent functions and units implemented by any of the elements and devices illustrated in FIG. 3, which are activated by instructions from the CPU 201 based on the programs stored in the ROM 202. Further, the management system 50 further includes a nonvolatile storage unit 5000 formed of the HD 204 illustrated in FIG. 3, which is capable of maintaining the various data or information even when the power of the management system 50 is turned off. For example, the nonvolatile storage unit 5000 stores an address list frame 11-1 illustrated in FIG. 22. The management system 50 may include a volatile storage unit 5100 formed of the RAM 203 illustrated in FIG. 3.

(Relay Device Management Table)

The nonvolatile storage unit 5000 includes a relay device management DB 5001 formed of a relay device management table illustrated in FIG. 9.

In the relay device management table, the relay device IDs of the relay devices 30 are associated with the operating statuses of the relay devices 30, receipt time and dates at which the status information indicating the operating statuses of the relay devices 30 are received by the management system 50, the IP addresses of the relay devices 30, and the maximum data transmission speeds (Mbps) of the relay devices 30. For example, in the relay device management table illustrated in FIG. 9, the relay device 30a having the relay device ID "111a" is associated with the operating status "ONLINE", the receipt time and date "13:00 November 10, 2009" at which status information of the relay device 30a is received by the management system 50, the IP address "1.2.1.2" of the relay device 30a, and the maximum data transmission speed 100 Mbps of the relay device 30a.

(Terminal Authentication Management Table)

The nonvolatile storage unit 5000 includes a terminal authentication management DB 5002 formed of a terminal authentication management table illustrated in FIG. 10. In the terminal authentication management table, passwords are individually associated with the terminal IDs of all the terminals managed by the management system 50. For example, in the terminal authentication management table illustrated in FIG. 10, the terminal ID "01aa" of the terminal 10aa is associated with the password "aaaa".

(Terminal Management Table)

The nonvolatile storage unit 5000 includes a terminal management DB 5003 (an example of a terminal management unit) formed of a terminal management table illustrated in FIG. 11. In the terminal management table, terminal IDs of the terminals 10 as destination terminals are associated with terminal names of the destination terminals 10, operating statuses of the destination terminals 10, communication statuses of the destination terminals 10 with other terminals, receipt time and dates at which the later-described login request information of the destination terminals 10 is received by the management system 50, and IP addresses of the destination terminals 10. For example, in the terminal management table illustrated in FIG. 11, the terminal 10aa having the terminal ID "01aa" is associated with the terminal name "AA TERMINAL TOKYO OFFICE JAPAN" of the terminal 10aa, the operating status "ONLINE" of the terminal 10aa, the communication status "NONE" indicating that the terminal 10aa is in a waiting status and not communicating with other terminals, the receipt time and date "13:40 November 10, 2009" at which the login request information of the terminal 10aa is received by the management system 50, and the IP address "1.2.1.3" of the terminal 10aa. Note that the communication status includes "CALLING" indicating a status where the terminal is calling another terminal, "RINGING" indicating a status where the terminal is being called, "ACCEPTED" indicating a status where the terminal has authorized a communication request from another terminal to or communication request of the terminal has been authorized, and a "BUSY" indicating a status where the terminal is engaged with communicating with another terminal.

(Terminal List Management Table)

The nonvolatile storage unit 5000 includes an address list management DB 5004 formed of an address list management table illustrated in FIG. 12. In the address list management table, terminal IDs of registered destination candidate terminals are associated with the terminal IDs of the request source terminals that request initiation of a videoconference communication. For example, in the address list management table illustrated in FIG. 12, the terminal ID "01aa" of the request source terminal 10aa is associated with a destination candidate terminal 10ab having a terminal ID "01ab", a destination candidate terminal 10ba having a terminal ID "01ba", a destination candidate terminal 10bb having a terminal ID "01bb" and the like, which the request source terminal requests to initiate the videoconference. The destination candidate terminals may be added or deleted based on instructions from the request source terminal to the management system 50.

(Session Management Table)

The nonvolatile storage unit 5000 includes a session management DB 5005 formed of a session management table illustrated in FIG. 13. In the session management table, session IDs that identify sessions in which the communication data are transmitted and received between the terminals are associated with the relay device IDs of the relay devices 30 utilized for relaying the image data and the audio data, the terminal ID of the request source terminal 10, the terminal IDs of the destination terminals 10, delay time (ms) in receiving the image data by the destination terminals 10, and receipt time and dates at which the delay information indicating the delay time transmitted from each of the destination terminals is received by the management system 50. For example, in the session management table illustrated in FIG. 13, the relay device 30a (having the relay device ID "111a") selected for executing the session having the session ID "se1" is associated with the request source terminal 10aa having the terminal ID "01aa" that has a videoconference with the destination terminal 10bb having the terminal ID "01bb", the destination terminal 10cb having the terminal ID "01cb", and the destination terminal 10db having the terminal ID "01db". The session management table indicates that the relay device 30a relays the image data and the audio data between the request source terminal 10aa and the destination terminals 10bb, 10cb, and 10db, and delay time 200 ms in receiving the image data by the destination terminal 10db at the receipt time and date "14:00 November 10, 2009". Note that if the videoconference is conducted between the two terminals 10, the receipt time and date of the delay information may be managed not based on the destination terminals but based on the delay information transmitted from the request source terminal. However, if the videoconference is conducted between three or more terminals 10, the receipt time and date of the delay information may be managed based on the delay information transmitted from the image data and the audio data reception side terminals 10.

(Quality Management Table)

The nonvolatile storage unit 5000 further includes a quality management DB 5007 formed of a quality management table illustrated in FIG. 14. In the quality management table, the delay time (ms) in the request source terminal or the destination terminal is associated with the image quality (quality of image) of the image data relayed by the relay device 30.

(Relay Device Selection Management Table)

The nonvolatile storage unit 5000 further includes a relay device selection management DB 5008 formed of a relay device selection management table illustrated in FIG. 15. In the relay device selection management table, relay device IDs of the relay devices utilized for relaying the image data and the audio data are individually associated with the terminal IDs of all the terminals managed by the management system 50.

(Status Alteration Management Table)

The nonvolatile storage unit 5000 includes a status alteration management DB 5009 (an example of a status alteration management unit) formed of status alteration management tables illustrated in FIGS. 16, 17 and 18. In the status alteration management table illustrated in FIG. 16, alteration request information (an example of alteration information) indicating a request for altering a communication status between the terminals is associated with pre-alteration status information indicating a communication status before the communication status is altered by a status alteration unit 53c (an example of an alteration unit), and alteration information indicating a altered status altered by the status alteration unit 53c. In the status alteration management table illustrated in FIG. 17, the alteration request information is associated with terminal information for identifying the request source terminal and the destination terminal, the pre-alteration status information, and the alteration information. In the status alteration management table illustrated in FIG. 18, the alteration request information is associated with the terminal information, assessment information indicating an assessment result as to whether the alteration request information "REJECT" indicating the rejecting the initiation of the communication is received from all the terminals that have received the alteration request information "INVITE" indicating a request for initiating the communication when the alteration request information "REJECT" is received from any one of the terminals that have received the alteration request information "INVITE", the pre-alteration information, and the alteration information. Note that in addition to "REJECT" and "INVITE", the alteration request information further includes "ACCEPT" indicating the authorization of the communication initiation, "CANCEL" indicating the cancellation of the communication initiation, "JOIN" indicating the initiation of relaying communication data, "CALL" indicating the participation in the established session between the terminals, and "LEAVE" indicating that the end of the communication.

(Functional Units of Management System)

Next, functional units of the management system 50 are described. Note that in the following description, the functions of the management system 50 are illustrated in association with the main elements and devices for implementing the units of the management system 50 illustrated in FIG. 3.

The transmitter-receiver unit 51 of the management system 50 is configured to transmit various data (information) to and receive such data from other terminals, relay devices, and systems. The function of the transmitter-receiver unit 51 may be implemented by the network IF 209 illustrated in FIG. 3. The terminal authentication unit 52 is configured to search the terminal authentication management table (see FIG. 10) of the nonvolatile storage unit 5000 by the terminal ID and a password contained in the login request information as search keys, and authenticate the corresponding terminal based on whether the terminal ID and the password contained in the login request are identical to those managed in the terminal authentication management table.

The status management unit 53 is configured to manage the terminal management table (see FIG. 11) by associating the terminal ID the request source terminal that has requested for login with the operating status, time and date in receiving login request information by the management system 50 and the IP address of the request source terminal. Thus, the status management unit 53 may implement a status setting unit 53a (an example of a setting unit), a status acquisition unit 53b (an example of an acquisition unit), and a status alteration unit 53c based on instructions from the CPU 201 illustrated in FIG. 3.

The status setting unit 53a is configured to set the operating status of the terminal from OFFLINE to ONLINE in the terminal management status (see FIG. 11) based on the status information indicating turning on the power of the terminal instructed by the user who has switched ON the power switch 109 from OFF. The status setting unit 53a sets the operating status of the terminal from ONLINE to OFFLINE in the terminal management status (see FIG. 11) based on the status information indicating turning off the power of the terminal instructed by the user who has switched OFF the power switch 109 from ON.

The status acquisition unit 53b is configured to acquire the status information of at least one of the request source terminal and the destination terminal from the terminal management table (see FIG. 11) when the status alteration information transmitted from the request source terminal or the destination terminal is received by the transmitter-receiver unit 51.

The status alteration unit 53c is configured to alter one of or both of the status information of the request source terminal and the status information of the destination terminal managed by the terminal management table (see FIG. 11) based on the alteration request information received by the transmitter-receiver unit 51.

The terminal extraction unit 54 is configured to search the address list management table (see FIG. 12) by the terminal ID of the request source terminal that has requested for the login as a key, and retrieve the terminal IDs of the destination candidate terminals capable of communicating with the request source terminal. As a result, the terminal extraction unit 54 extracts the terminal IDs of the destination candidate terminals capable of communicating with the request source terminal. Further, the terminal extraction unit 54 is configured to search the address list management table (see FIG. 12) by the terminal ID of the request source terminal that has requested for the login as a key, and extract terminal IDs of other request source terminals that have registered the above terminal ID of the request source terminal as a destination candidate terminal.

The terminal status acquisition unit 55 is configured to search the terminal management table (see FIG. 11) by the terminal IDs of the destination candidate terminals extracted by the terminal extraction unit 54 as search keys, and retrieve the operating statuses of the extracted destination candidate terminals by the terminal IDs of the extracted destination candidate terminals. Thus, the terminal status acquisition unit 55 acquires the operating statuses of the destination candidate terminals capable of communicating with the request source terminal that has requested for the login. Further, the terminal status acquisition unit 55 is configured to search the terminal management table by the terminal IDs of the terminals extracted by the terminal extraction unit 54 as search keys and acquire the operating status of the request source terminal that has requested for the login.

The relay device selector unit 56 is configured to carry out a process of eventually selecting one of the relay devices 30. Thus, the relay device selector unit 56 may implement a session ID generator unit 56a (see FIG. 6), a relay device extraction unit 56b, and a selector unit 56c based on instructions from the CPU 201 illustrated in FIG. 3.

The session ID generator unit 56a is configured to generate session IDs for identifying sessions in which the communication data are transmitted and received between the terminals. The relay device extraction unit 56b is configured to search a relay device selection management table (see FIG. 15) based on the terminal ID of the request source terminal and the terminal ID of the destination terminal contained in the initiation request information transmitted from the request source terminal, and extract the relay device IDs corresponding to the request source terminal and the destination terminal. The selector unit 56c is configured to select the relay devices having the operating status "ONLINE" from the relay device management table (see FIG. 9).

The session management unit 57 is configured to store and manage the session IDs generated by the session ID generator unit 56a in association with the terminal ID of the request source terminal and the terminal ID of the destination terminal. Further, the session management unit 57 is configured to store and manage in the session management table the relay device ID of the finally selected one of the relay devices 30 in association with a corresponding one of session IDs.

The quality determination unit 58 is configured to search the quality management table (see FIG. 14) by the delay time as a search key, extract the image quality of the corresponding image data, and determine the image quality of the image data relayed by the relay device 30. The storing-reading processing unit 59 is configured to store various data in the nonvolatile storage unit 5000 and retrieve various data from the nonvolatile storage unit 5000. The function of the storing-reading processing unit 59 may be implemented by the HDD 205 illustrated in FIG. 3. The delay time management unit 60 is configured to search the terminal management table (see FIG. 11) by the IP address of the destination terminal as a search key to extract the corresponding terminal ID. Further, the delay time management unit 60 is configured to store the delay time indicated by the delay information in a delay time field of the record corresponding to the extracted terminal ID in the session management table (see FIG. 13).

The determination unit 61 is configured to determine an appropriate process to alter the communication status between the terminals based on the alteration request information received form the transmitter-receiver unit 51. The assessment unit 62 is configured to determine whether the alteration request information "REJECT" indicating the rejection of the initiation of the communication is received from all the terminals that have received the alteration request information "INVITE" indicating a request for initiating the communication when the alteration request information "REJECT" indicating the rejection of the initiation of the communication is received from any of the terminals that have received the alteration request information "INVITE". An alteration request information determination unit 63 (an example of an alteration information determination unit) is configured to determine whether the alteration request information received by the transmitter-receiver unit 51 is specific alteration request information. The specific alteration request information not only indicates altering the communication status of one of the request source terminal and the destination terminal, but also indicates altering the communication statuses of both the request source terminal and the destination terminal. For example, the alteration request information "INVITE" may not only alter the communication status of the request source terminal into "CALLING" but also alter the communication status of the destination terminal into "RINGING". Thus, the alteration request information determination unit 63 determines the alteration request information "INVITE" as the specific alteration request information. Likewise, the alteration request information determination unit 63 determines the alteration request information "ACCEPT" indicating the authorization of the communication initiation, "REJECT" indication the rejection of the communication initiation, and "CANCEL" indicating the cancellation of the communication initiation as the specific alteration request information in addition to the alteration request information "INVITE".

[Process and Operation]

Figure 19:
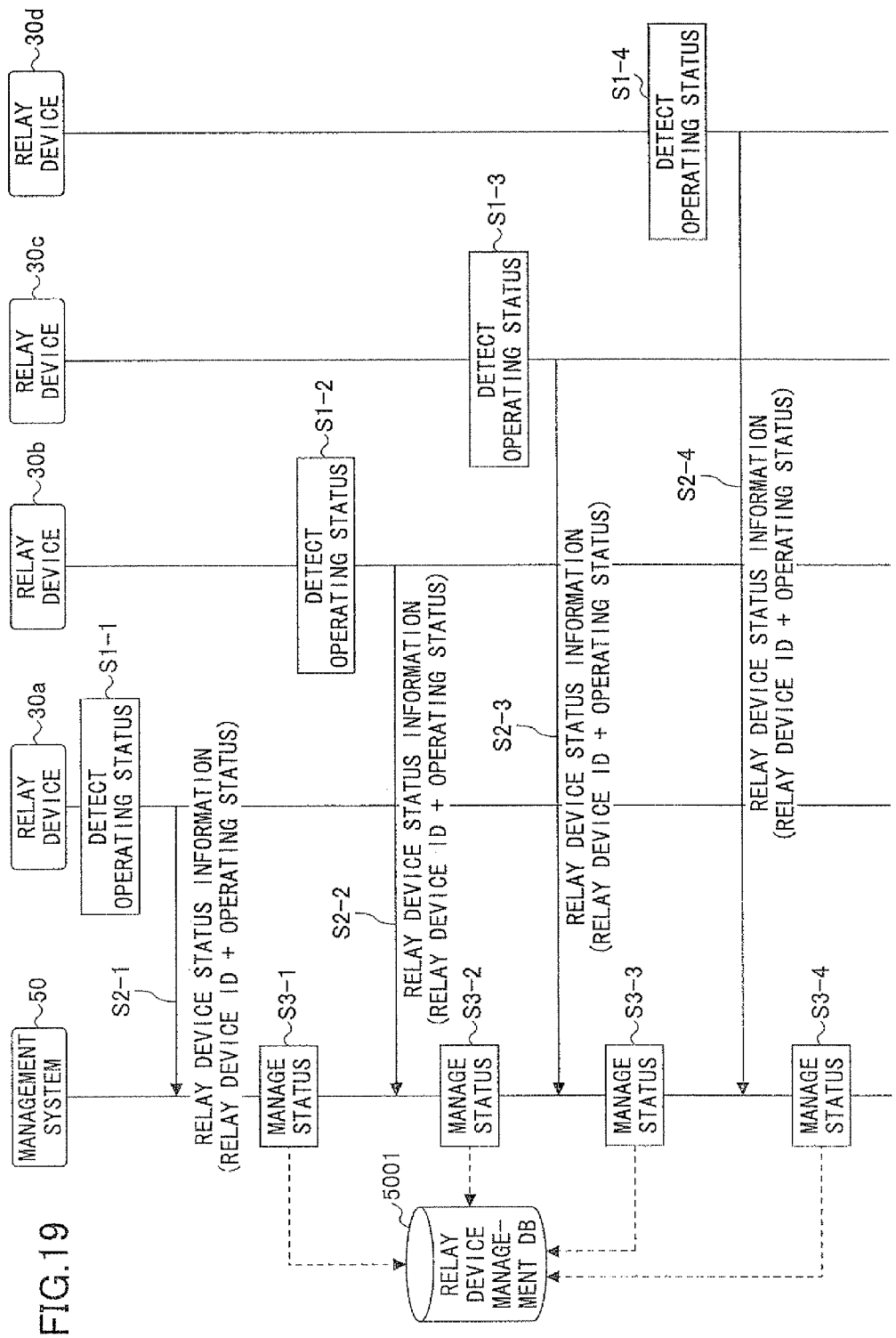
FIG. 19 is a sequence diagram illustrating a process in which status information indicating operating statuses of the relay devices are managed.
Figure 20:
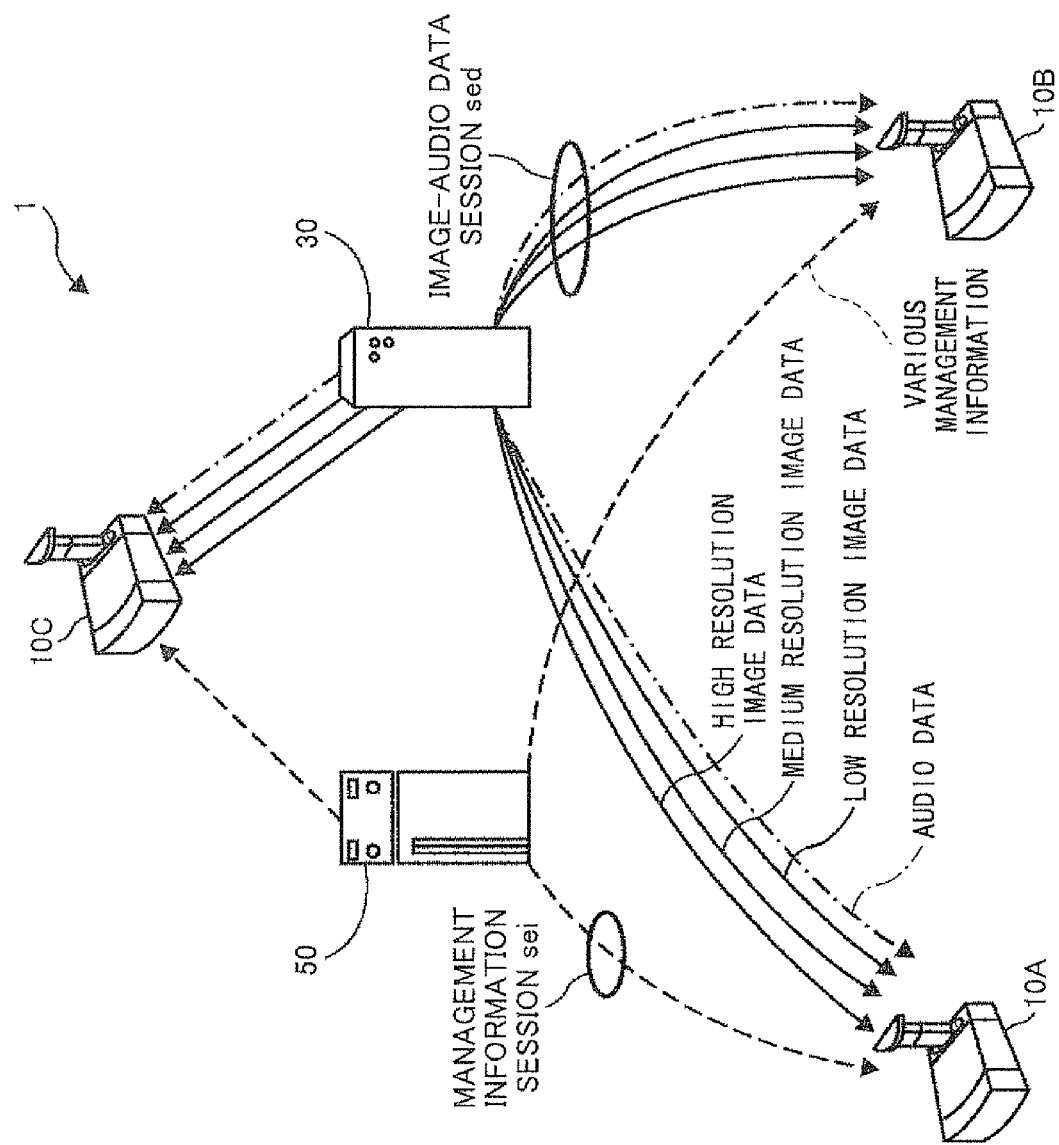
FIG. 20 is a conceptual diagram illustrating transmitting and receiving statuses of image data, audio data and various management information in the transmission system.
Figure 21:
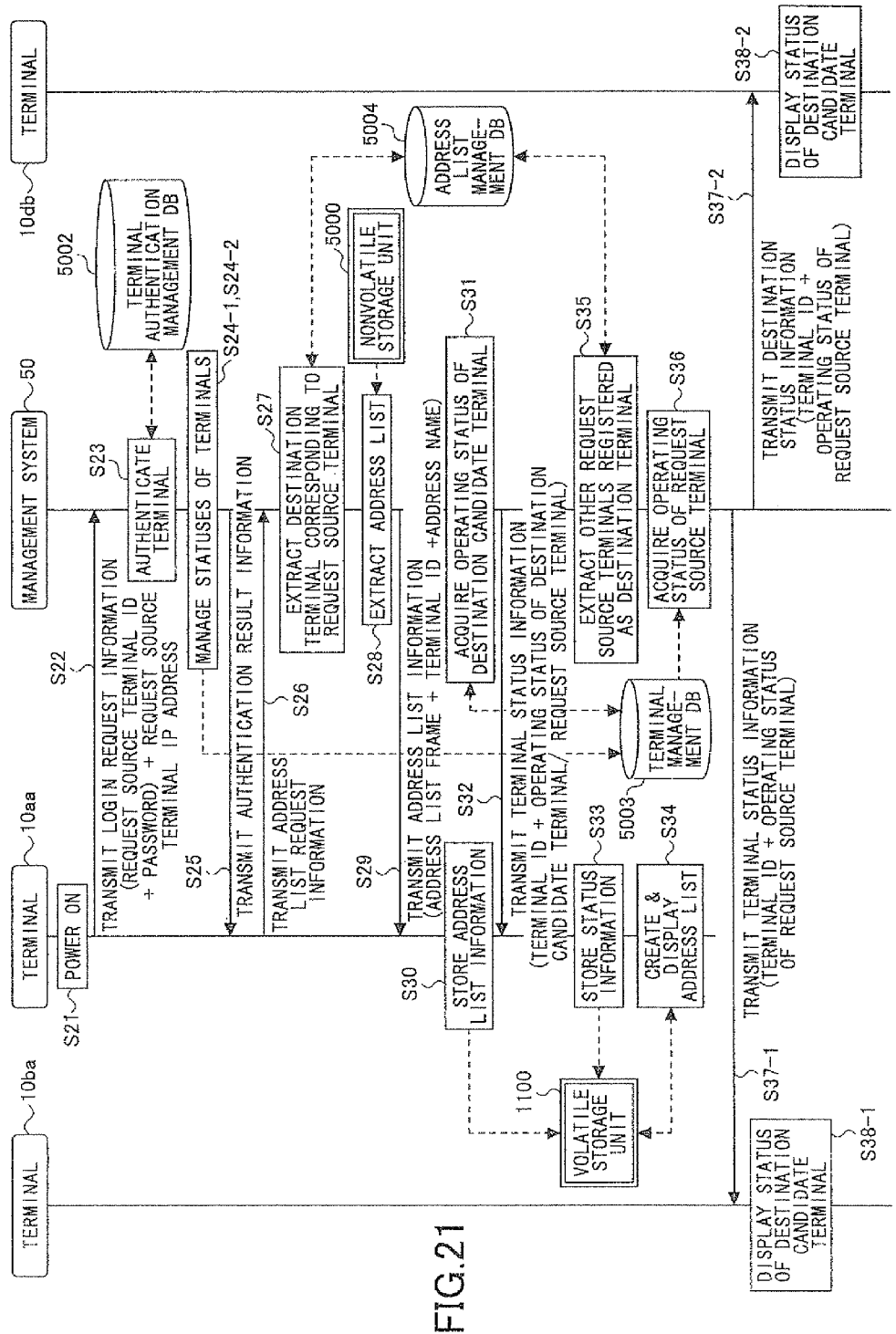
FIG. 21 is a sequence diagram illustrating a process in a preparatory phase for initiating communications among the transmission terminals.
Figure 24:
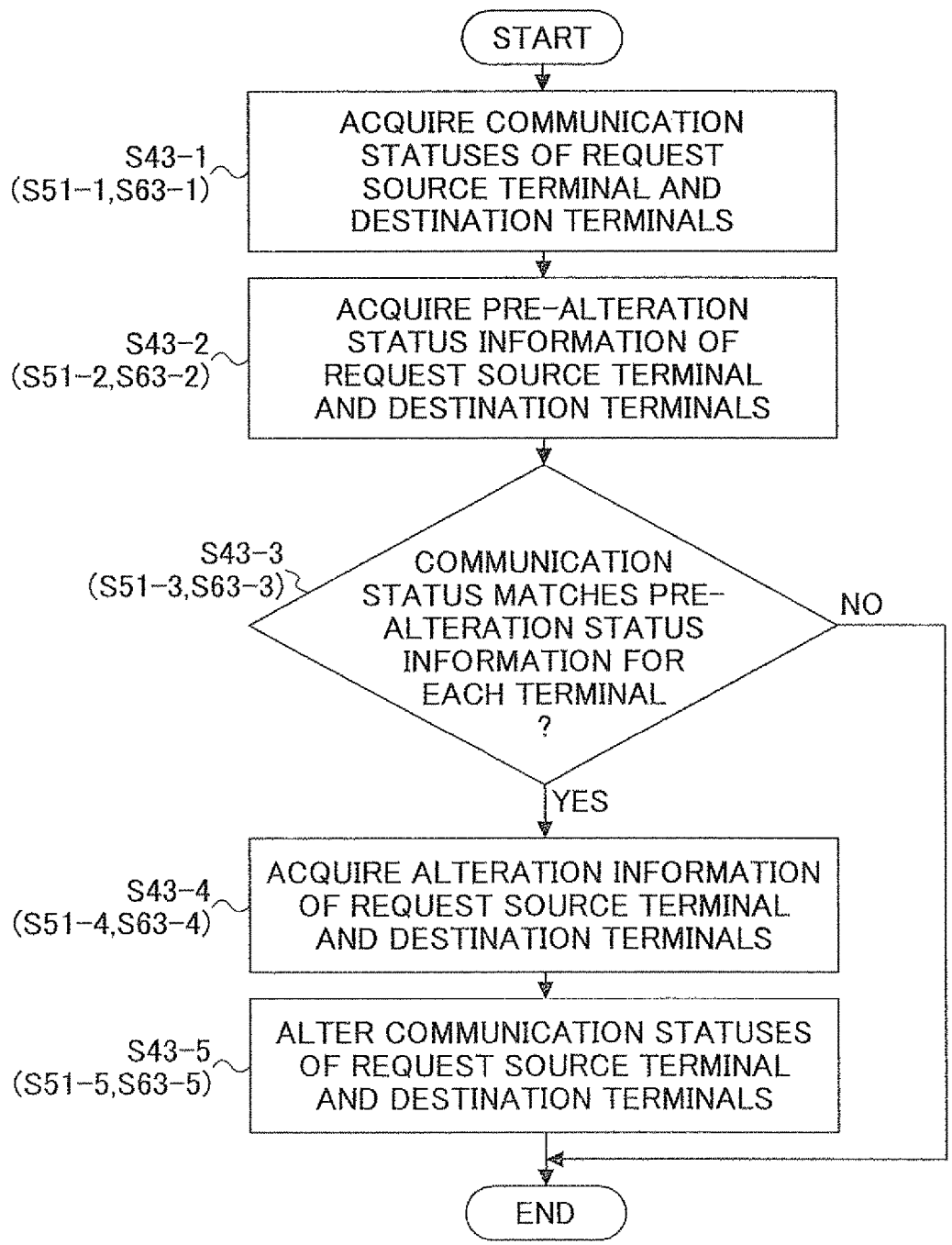
FIG. 24 is a flowchart illustrating a process in which a communication status is altered.
Figure 25:
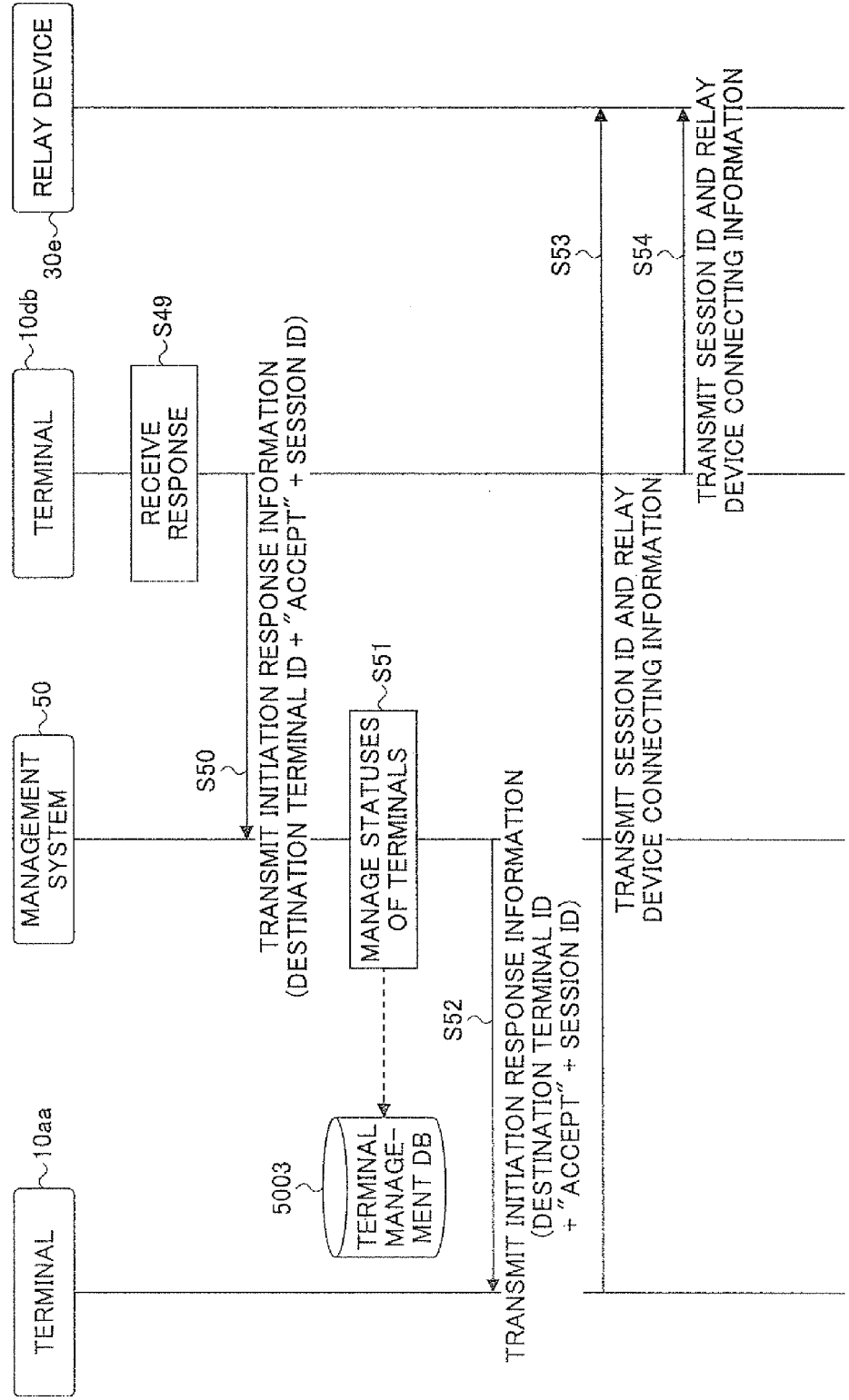
FIG. 25 is a sequence diagram illustrating a process in which a communication initiation request is authorized.
Figure 26:
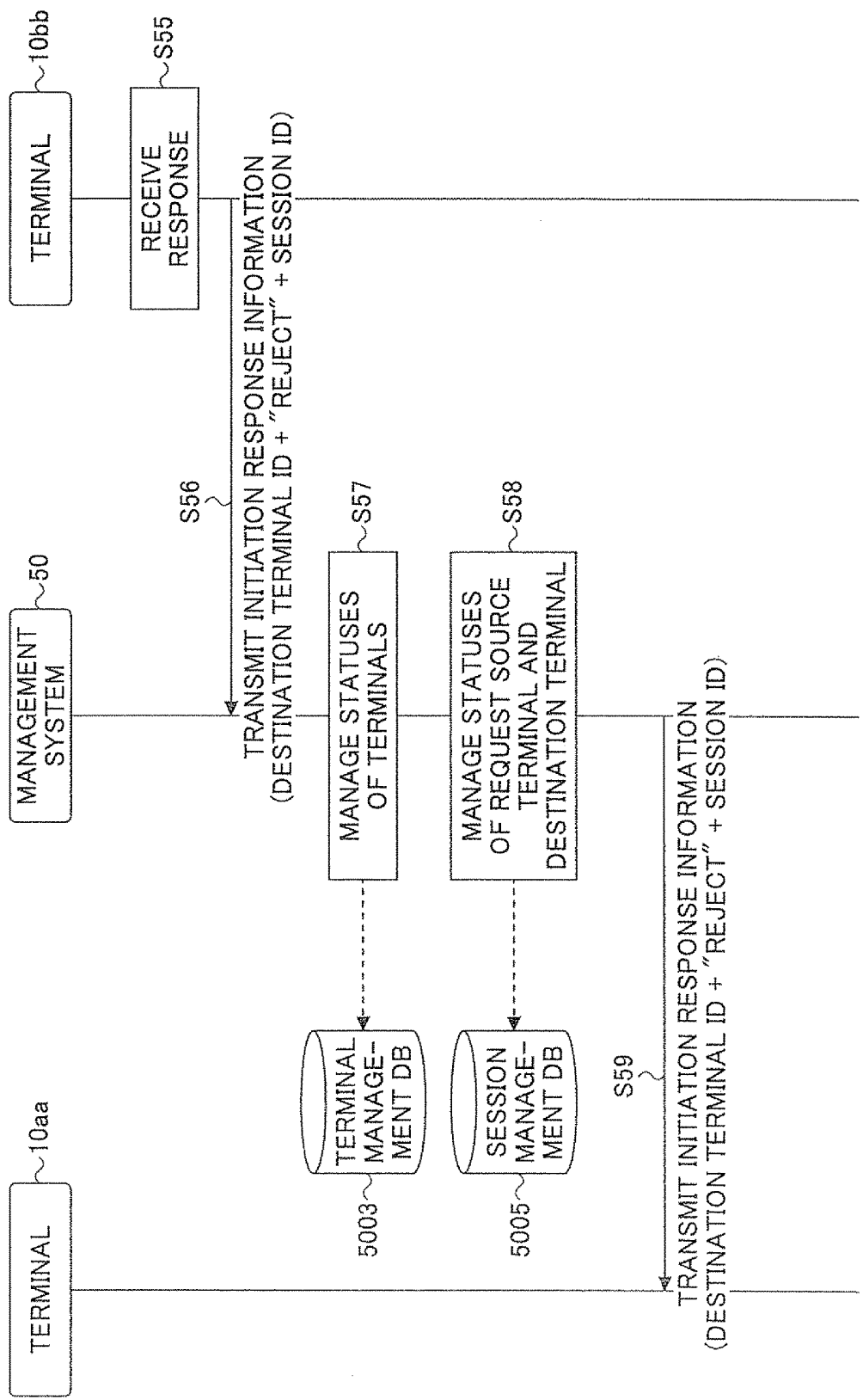
FIG. 26 is a sequence diagram illustrating a process in which the communication initiation request is rejected.
Figure 27:
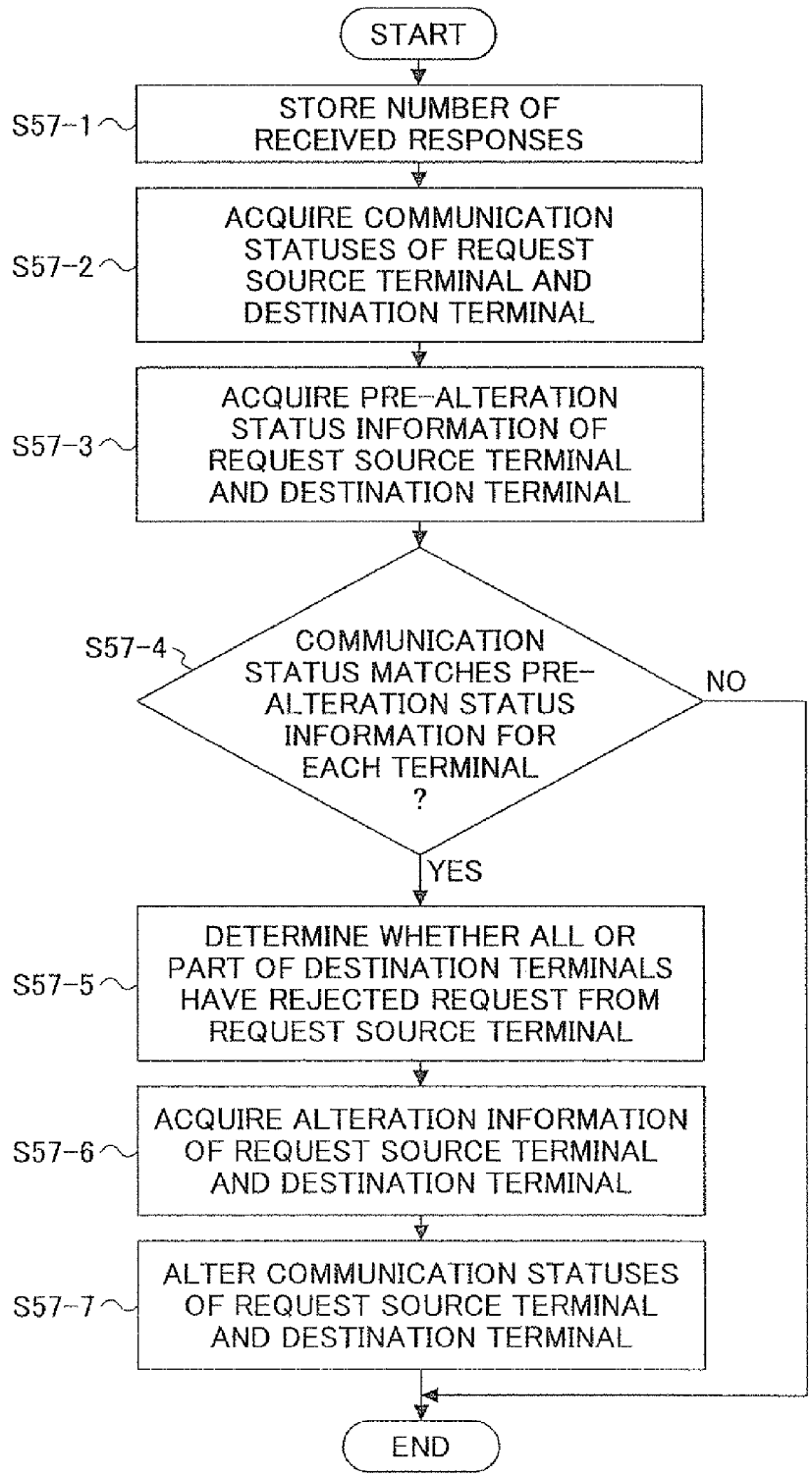
FIG. 27 is a flowchart illustrating a process in which a communication status is altered.
Figure 28:
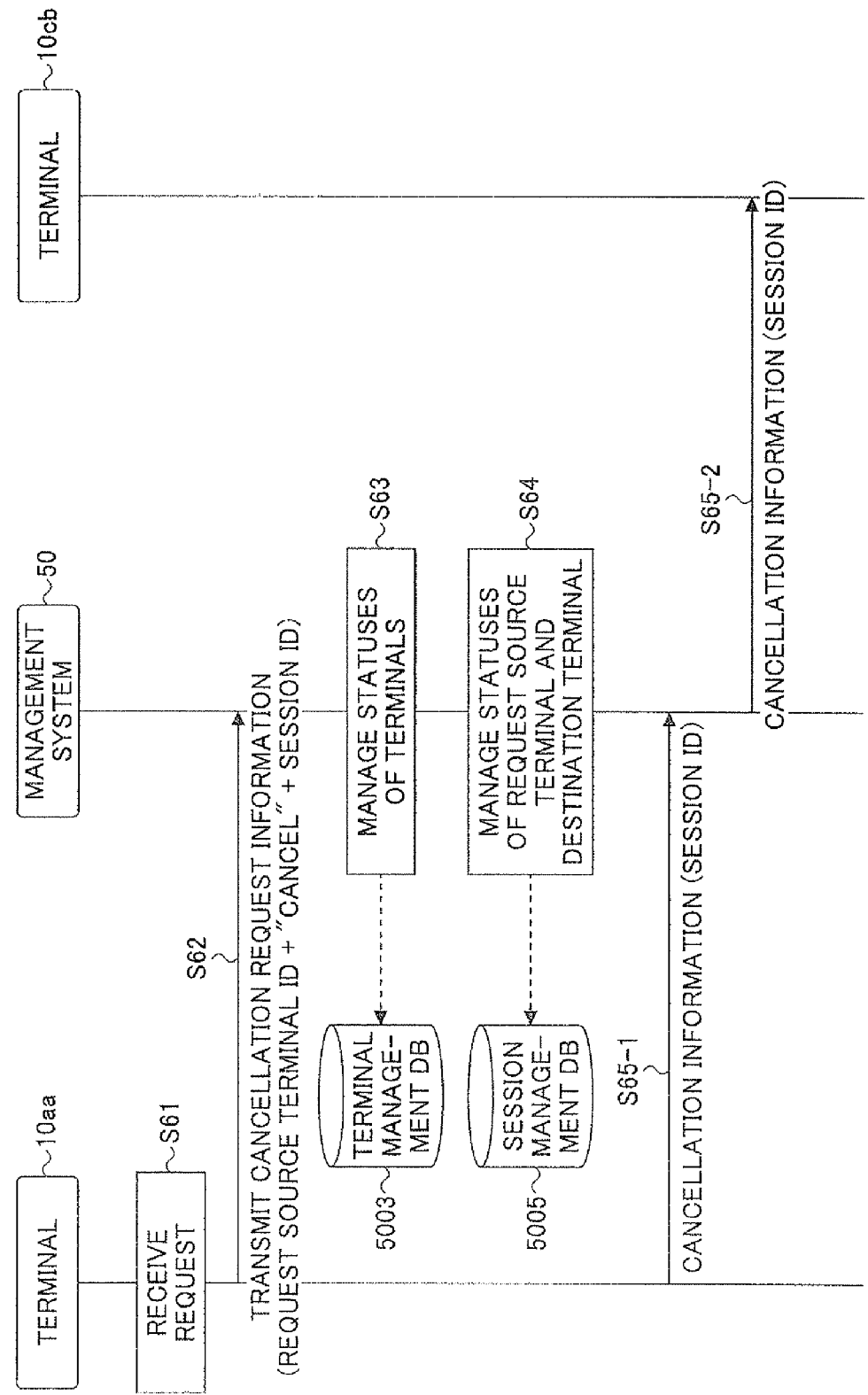
FIG. 28 is a sequence diagram illustrating a process in which the communication initiation request is cancelled.
Figure 29:
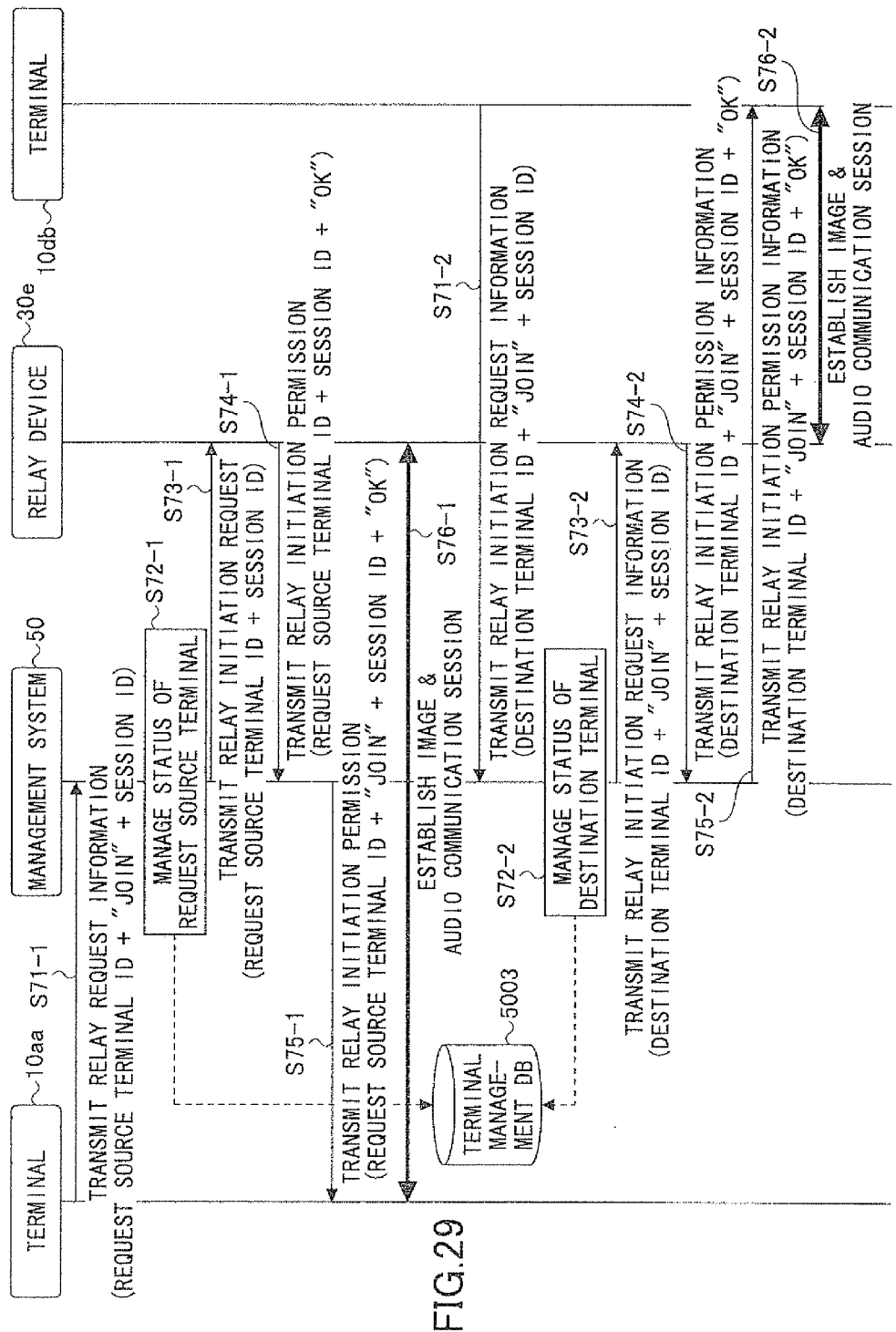
FIG. 29 is a sequence diagram illustrating a process in which communication data relay is requested.
Figure 30:
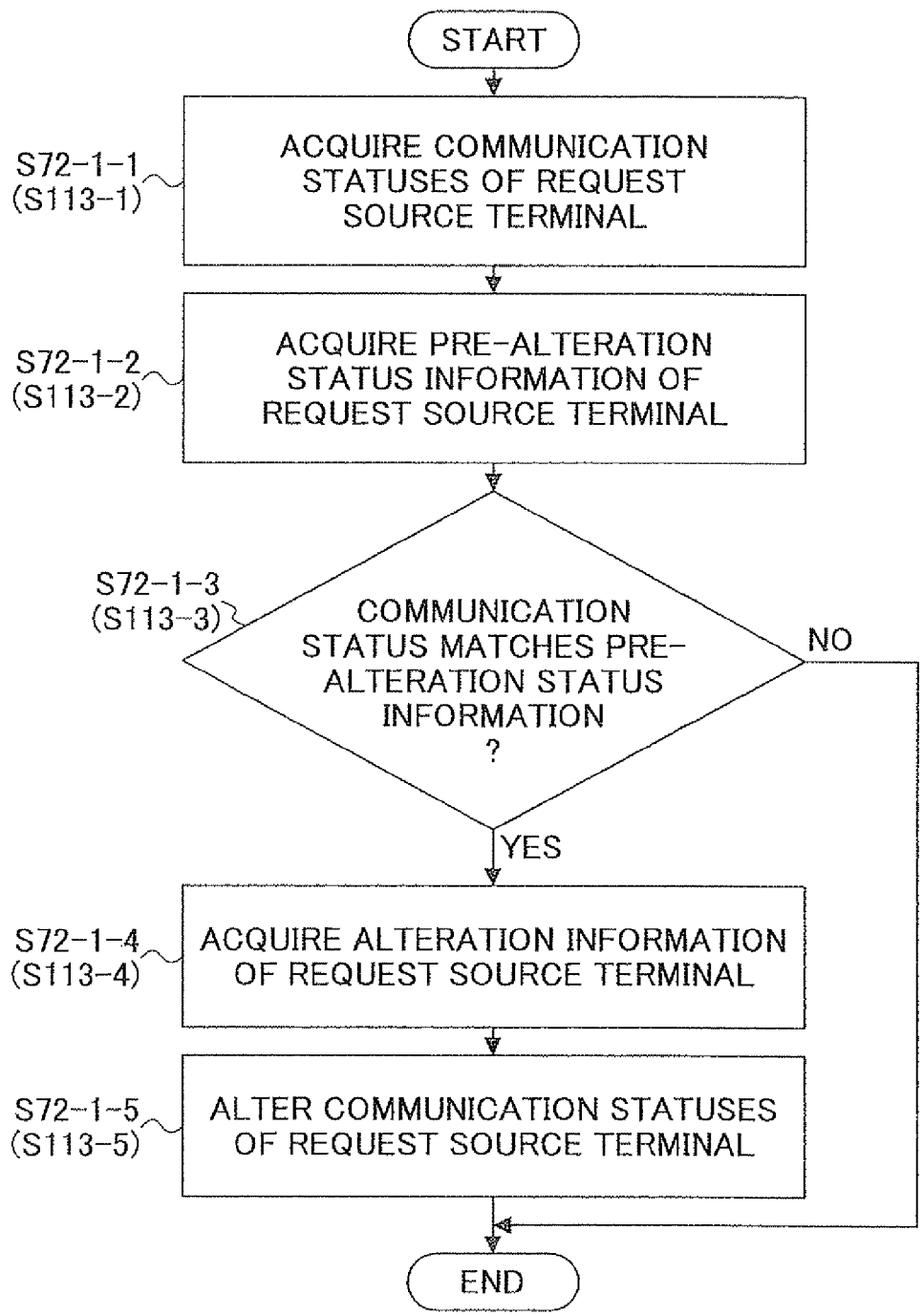
FIG. 30 is a flowchart illustrating a process in which a communication status is altered.
Figure 31:
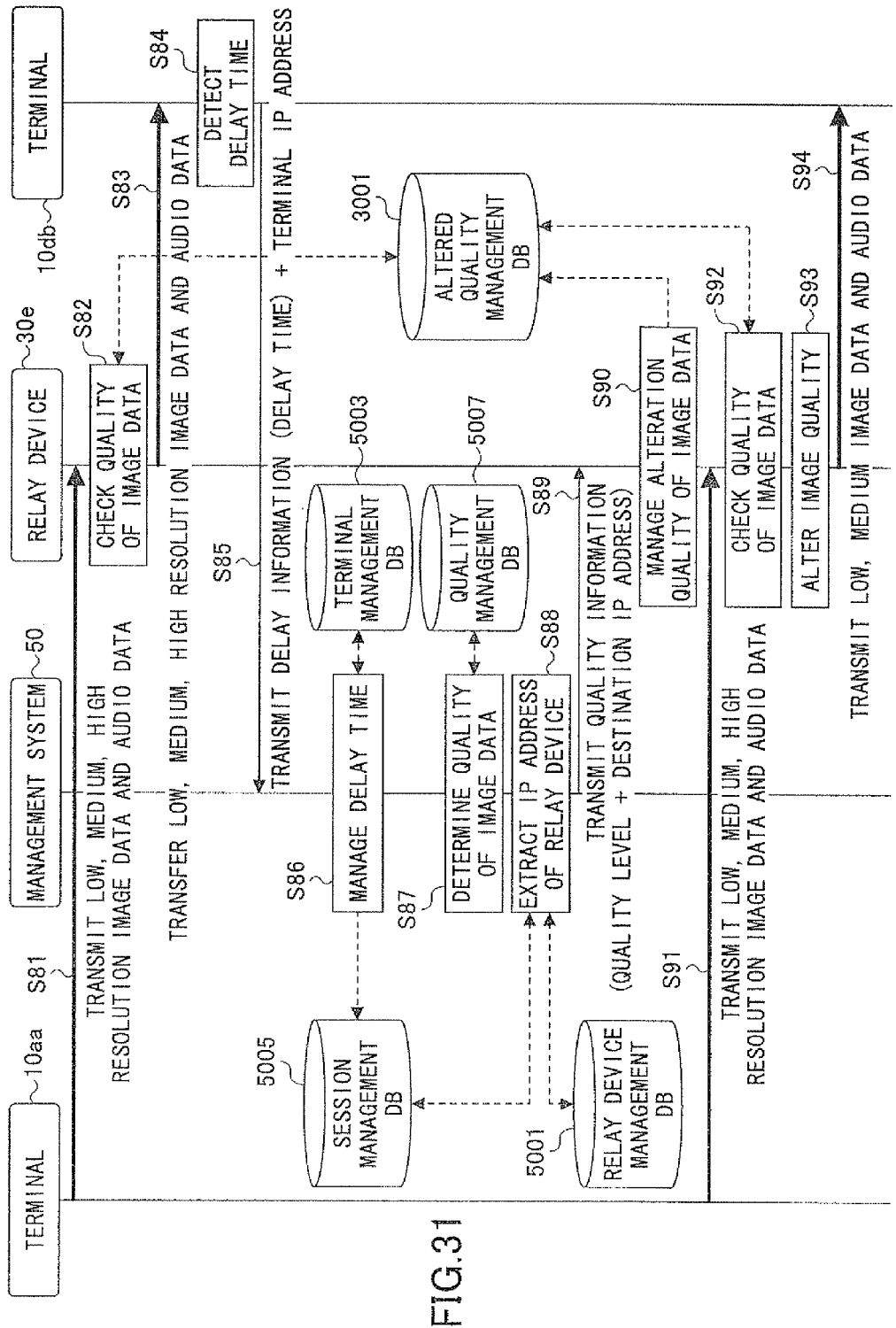
FIG. 31 is a sequence diagram illustrating a process in which image data and audio data are transmitted and received among the transmission terminals.
Figure 32:
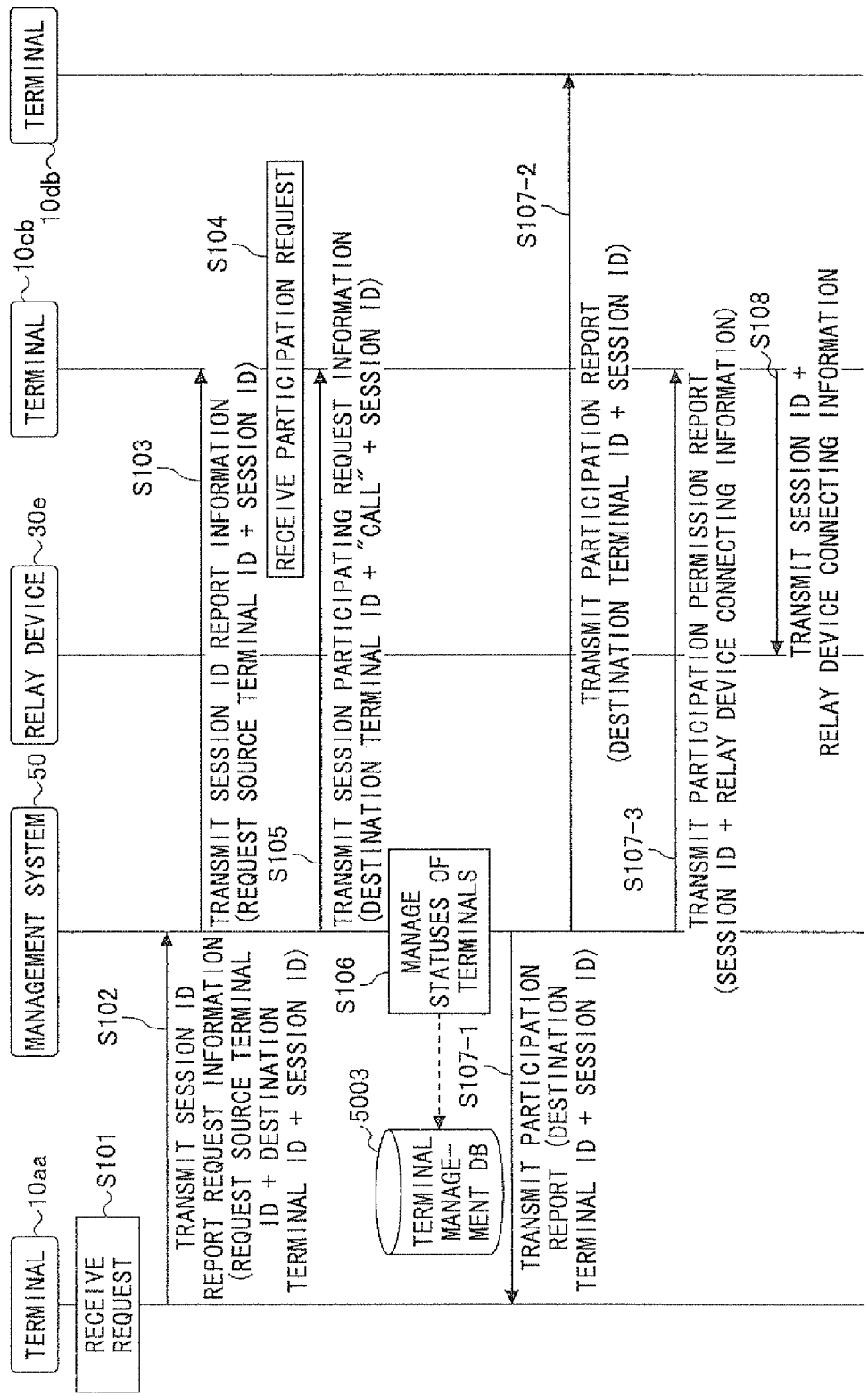
FIG. 32 is a sequence diagram illustrating a process in which participation in a communication data session is requested.
Figure 33:
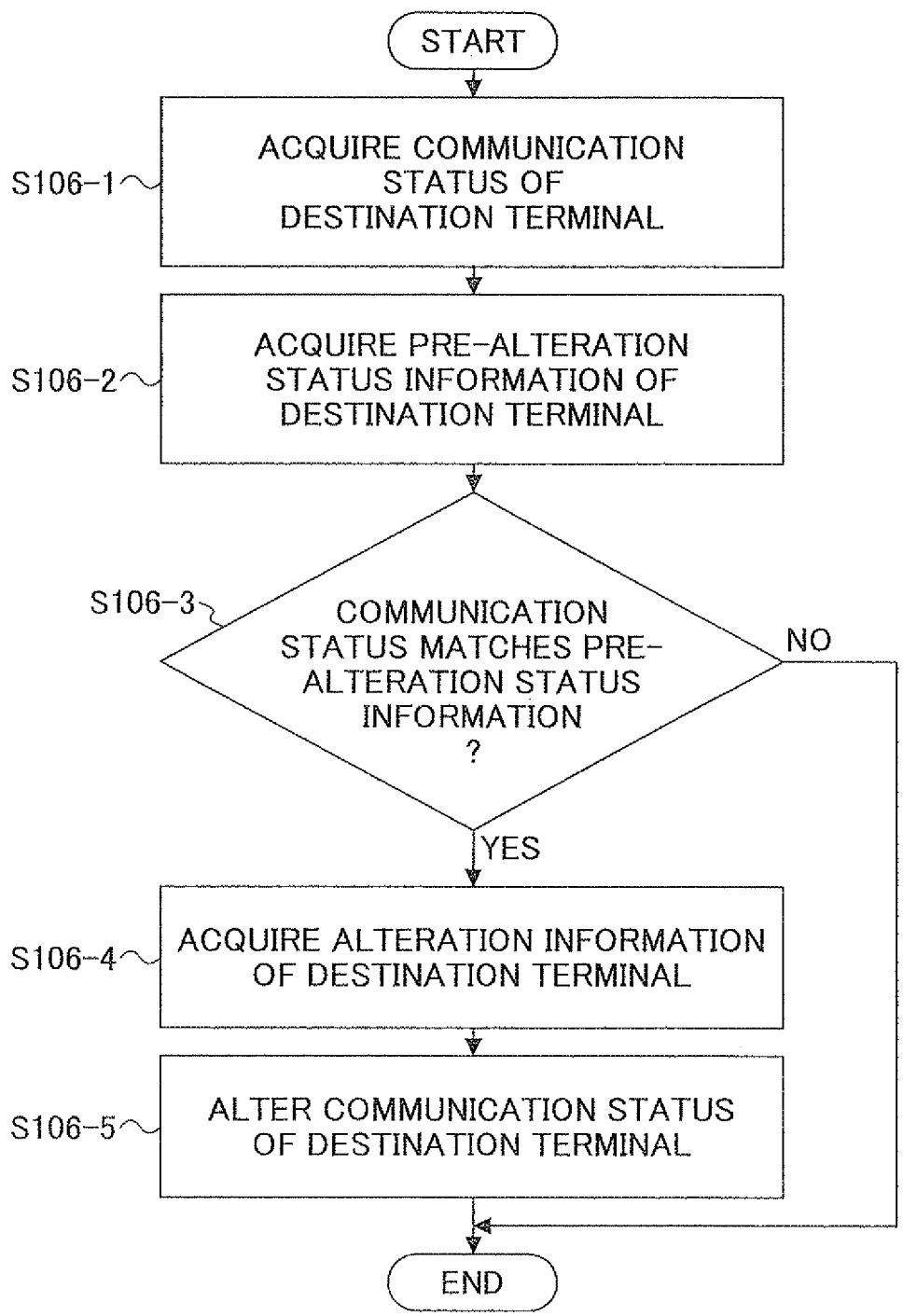
FIG. 33 is a flowchart illustrating a process in which a communication status is altered.
Figure 34:
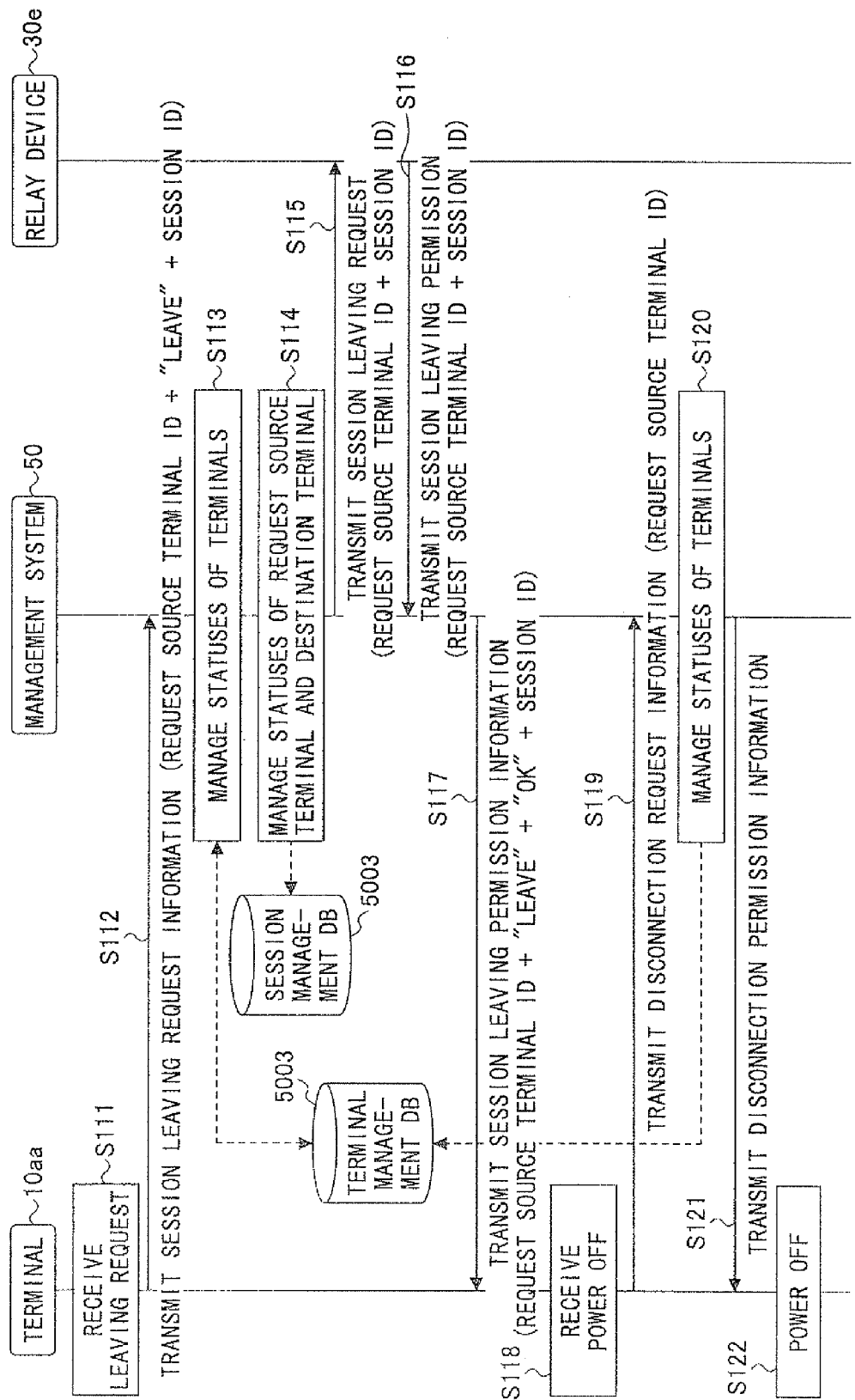
FIG. 34 is a sequence diagram illustrating a process in which leaving from the communication data session is requested.
Figure 35:
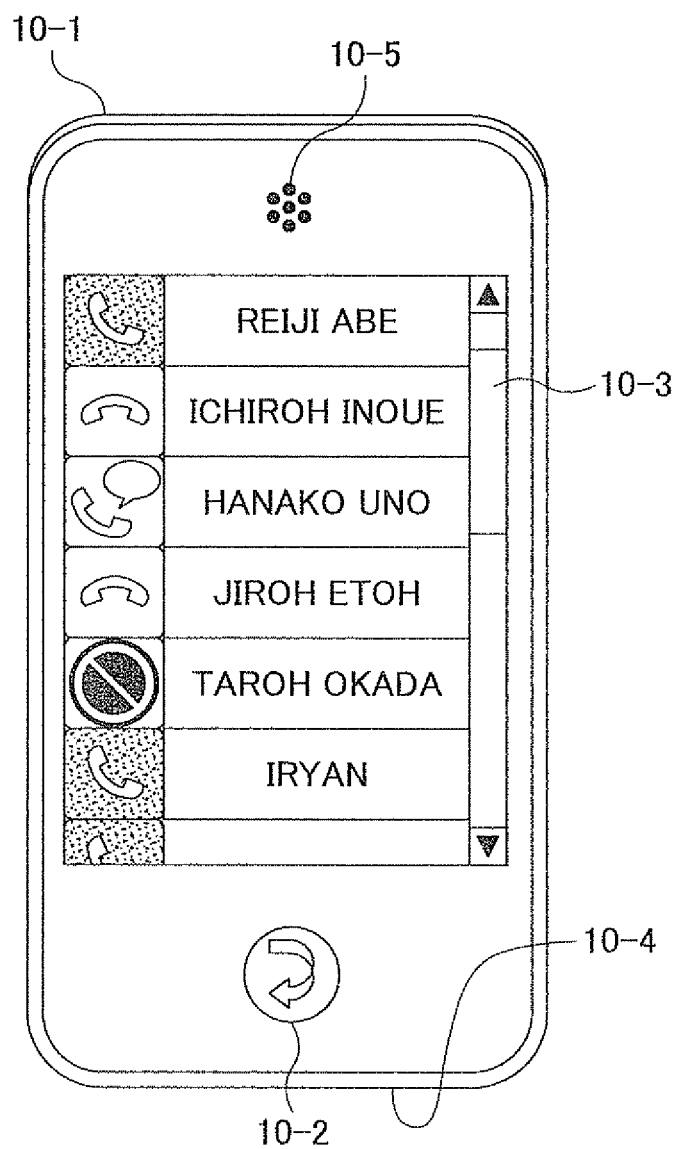
FIG. 35 is a conceptual diagram illustrating an address list according to another embodiment.
Figure 36:
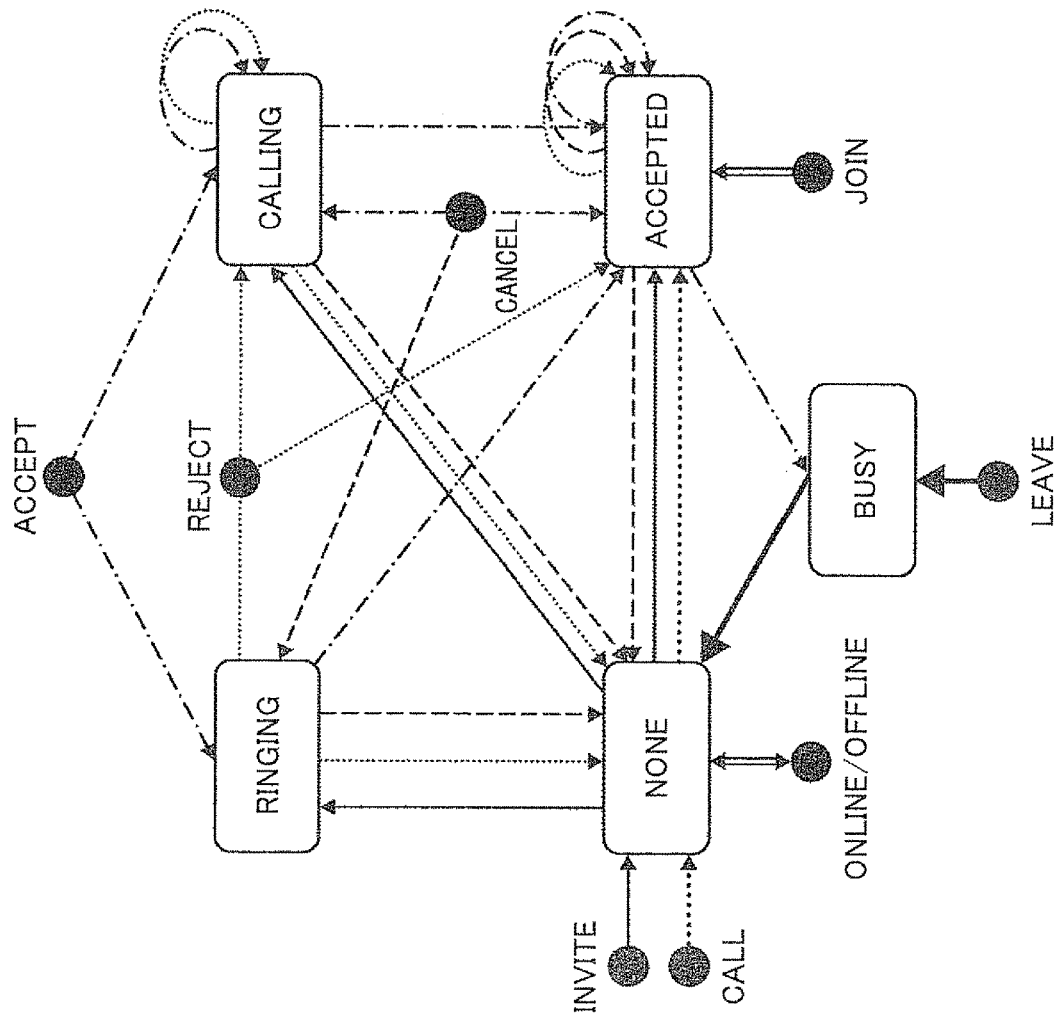
FIG. 36 is a communication status transition diagram illustrating communication status transitions.

So far, the configuration and functions (units) of the transmission system 1 according to the embodiment are described, and processes carried out by the transmission system 1 according to the embodiment are subsequently described with reference to FIGS. 19 to 37. Note that FIG. 19 is a sequence diagram illustrating a process in which status information indicating operating statuses of the relay devices are managed. FIG. 20 is a conceptual diagram illustrating transmitting and receiving statuses of image data, audio data and various management information in the transmission system. FIG. 21 is a sequence diagram illustrating a preparatory process for initiating communication among the transmission terminals. FIG. 22 is a conceptual diagram illustrating an address list according to the embodiment. FIG. 23 is a sequence diagram illustrating a process in which initiation of communication is requested. FIG. 24 is a flowchart illustrating a process in which a communication status is altered. FIG. 25 is a sequence diagram illustrating a process in which the request for initiating the communication is authorized. FIG. 26 is a sequence diagram illustrating a process in which the request for initiating the communication is rejected. FIG. 27 is a flowchart illustrating a process in which a communication status is altered. FIG. 28 is a sequence diagram illustrating a process in which the request for initiating the communication is cancelled. FIG. 29 is a sequence diagram illustrating a process in which relaying of communication data is requested. FIG. 30 is a flowchart illustrating a process in which a communication status is altered. FIG. 31 is a sequence diagram illustrating a process in which image data and audio data are transmitted and received among the transmission terminals. FIG. 32 is a sequence diagram illustrating a process in which participation in a communication data session is requested. FIG. 33 is a flowchart illustrating a process in which a communication status is altered. FIG. 34 is a sequence diagram illustrating a process in which leaving of the communication data session is requested. FIG. 35 is a conceptual diagram illustrating an address list according to another embodiment. FIG. 36 is a communication status transition diagram illustrating communications status transitions. FIG. 37 is an external diagram illustrating the transmission terminal according to the embodiment.

First, a process of managing status information of the relay devices 30 transmitted to the management system 50 is described with reference to FIG. 19. Each of the relay devices 30 includes a status detector unit 32 illustrated in FIG. 4 that regularly detects the operating status of its own device (i.e., own relay device 30) (steps S1-1 to S1-4). The transmitter-receiver units 31 of the rely devices 30 regularly transmit a corresponding status information of its own device to the management system 50 via the communication network 2 so that the management system 50 side may manage the operating statuses of the relay devices 30 in real time (steps S2-1 to S2-4). The status information includes the relay device ID of its own relay device 30 and the operating status detected by the status detector unit 32 of its own relay device 30 associated with the relay device ID. Note that this embodiment illustrates a case where the relay devices (30*a*, 30*b*, 30*d*) are running normally and in the "ONLINE" status; however, the relay device 30*c* is operating but is in the OFFLINE status due to some kind of defects in the programs executing the relay device 30*c*.

Next, in the management system 50, the transmitter-receiver unit 51 receives the status information transmitted from each of the relay devices 30 and the storing-reading processing unit 59 stores each of the status information received by the transmitter-receiver unit 51 in association with the corresponding relay device ID in the relay device management table (see FIG. 9) in the nonvolatile storage unit 5000 (steps S3-1 to S3-4). Accordingly, the "ONLINE", "OFFLINE", or "FAILED" is stored in the operating status field of the relay device management table illustrated in FIG. 9 in association with the relay device ID for each of the relay devices 30. Simultaneously, the receipt time and date of the status information received by the management system 50 is also stored in association with the corresponding relay device ID in the relay device management table. Note that when the status information is not transmitted from the relay device 30, the operating status field and the receipt time and date field of the record in the relay device management table illustrated in FIG. 9 may be blank, or may present the previous operating status or previous receipt time and date.

Next, a concept illustrating transmitting and receiving statuses of image data, audio data and various management information in the transmission system is described with reference to FIG. 20. As illustrated in FIG. 20, management information sessions sei are established between the terminals 10A, 10B, and 10C via the management system 50 for transmitting and receiving various management information items. Further, four image-audio data sessions sed are established between the terminals 10A, 10B, and 10C via the relay device 30 for transmitting and receiving high resolution image data, medium resolution image data, low resolution image data and audio data. Note that the four sessions are illustrated as the image and audio data session sed.

Next, a process in which each of the management information items is transmitted and received in a preparatory phase before the terminal 10aa initiates the communication is described with reference to FIG. 21. Note that FIG. 21 illustrates a process in which various management information items are all transmitted and received in the management information sessions sei.

First, when the user of the terminal 10aa switches ON the power switch 109 illustrated in FIG. 2, the operation-inputs receiver unit 12 illustrated in FIG. 4 receives a power-ON signal to switches ON the power of the terminal 10aa (step S21). On receiving the power-ON signal as a trigger, the login request unit 13 automatically transmits the login request information indicating the login request from the transmitter-receiver unit 11 to the management system 50 via the communication network 2 (step S22). The login request information includes a terminal ID and a password for identifying the terminal 10aa indicating an own terminal as the request source terminal. The terminal ID and password are data that are retrieved from the nonvolatile storage unit 1000 via the storing-reading processing unit 19 and then transmitted to the transmitter-receiver unit 11. Note that when the login request information is transmitted from the terminal 10aa to the management system 50, the receiver side management system 50 may detect the IP address of the transmitter side terminal 10aa.

Next, the terminal authentication unit 52 of the management system 50 authenticates the terminal 10aa based on whether the ID and password identical to those in the login request information are managed in the terminal authentication management DB 5002 of the nonvolatile storage unit 5000 by searching for the ID and password as search keys in the terminal authentication management table (see FIG. 10) (step S23).

The terminal authentication unit 52 manages identical terminal IDs and passwords. Accordingly, when the terminal authentication unit 52 determines that the received login request comes from the terminal 10 having a valid access authorization, the status management unit 53 stores the receipt time and date of the received login information and the IP address of the terminal 10aa in association with the record presented by the terminal ID and the destination name of the terminal 10aa in the terminal management table (see FIG. 11) (step S24-1). Thus, the receipt time and date "2009.11.10.13:40" and the terminal IP address "1.2.1.3" are managed in association with the terminal ID "01aa" in the terminal management table illustrated in FIG. 11.

Subsequently, the status setting unit 53a of the status management unit 53 sets the operating status "ONLINE" and the communication status "NONE" of the terminal 10aa and stores the set operating status and communication status in association with the record presented by the terminal ID and the destination name of the terminal 10aa in the terminal management table (see FIG. 11) (step S24-2). Thus, the operating status "ONLINE" and the communication status "NONE" are managed in association with the terminal ID "01aa" in the terminal management table illustrated in FIG. 11.

The transmitter-receiver unit 51 of the management system 50 transmits authentication result information indicating authentication result acquired by the terminal authentication unit 52 via the communication network 2 to the request source terminal (i.e., terminal 10aa) that has requested the login request (step S25). In the following, the case where the terminal authentication unit 52 has determined that the terminal (e.g., terminal 10aa in this case) has the valid access authorization is further described.

When the terminal 10aa receives the determined result indicating that the terminal 10aa has the valid access authorization, the transmitter-receiver unit 11 of the terminal 10aa transmits address list request information indicating an address list request to the management system 50 via the communication network 2 (step S26). The transmitter-receiver unit 51 of the management system 50 then receives the address list request information.

Next, the terminal extraction unit 54 searches the address list management table (see FIG. 12) by the terminal ID (01aa) of the request source terminal (i.e., terminal 10aa) that has requested for the login as a search key, and retrieves the terminal IDs of the destination candidate terminals capable of communicating with the request source terminal (i.e., terminal 10aa). As a result, the terminal extraction unit 54 extracts the terminal IDs of the destination candidate terminals capable of communicating with the request source terminal (step S27). In addition, the terminal status acquisition unit 54 searches the terminal management table (see FIG. 11) by the terminal IDs of the destination candidate terminals extracted by the terminal extraction unit 54 as search keys, and retrieves the destination names corresponding to the terminal IDs of the destination candidate terminals. In this example, terminal IDs (01ab, 01ba, . . . , 01db, . . . ) of the destination terminals (10ab, 10ba, . . . , 10db, . . . ) associated with the terminal ID "01aa" of the request source terminal (i.e., terminal 10aa) and terminal names (AB TERMINAL TOKYO OFFICE JAPAN, BA TERMINAL OSAKA OFFICE JAPAN, . . . , DB TERMINAL WASHINGTON DC OFFICE USA, . . . ) corresponding to the terminal IDs (01ab, 01ba, . . . , 01db, . . . ) of the destination terminals (10ab, 10ba, . . . , 10db, . . . ) are extracted.

Next, the transmitter-receiver unit 51 of the management system 50 retrieves data indicated by an address list frame (i.e., data indicated by the address list frame 11-1 in FIG. 22) from the nonvolatile storage unit 5000 (step S28), and transmits the address list information (address list frame, terminal IDs, address names) including the address list frame, the terminal IDs and the destination names extracted by the terminal extraction unit 54 to the request source terminal (i.e., terminal 10aa) (step S29). Accordingly, in the request source terminal (terminal 10aa), the transmitter-receiver unit 11 receives the address list information and the storing-reading processing unit 19 stores the address list information in the volatile storage unit 1100 (step S30).

In this embodiment, the address list information is not managed by the terminal 10 but is managed by the management system 50. The management system 50 uniformly manages the address list information of all the terminals in the transmission system 1. Thus, even if a new terminal 10 is added to the transmission system 1, a new model terminal 10 is replaced with the terminal 10 in the transmission system 1, or the appearance of the address list frame is altered, the management system 50 side may handle all the processes concerning these alternations at once so that the terminal 10 side may not need to carry out the process of changing the address list information.

The terminal status acquisition unit 55 of the management system 50 searches the terminal management table (see FIG. 11) by the terminal IDs (01ab, 01ba, . . . , 01db, . . . ) of the destination candidate terminals (10ab, 10ba, . . . , 10db, . . . ) extracted by the terminal extraction unit 54 as search keys, and retrieves the operating statuses of the extracted destination candidate terminals (10ab, 10ba, . . . , 10db, . . . ) based on the terminal IDs extracted by the terminal extraction unit (step S31).

Next, the transmitter-receiver unit 51 transmits terminal status information containing the terminal ID "01ab" used as a search key in step S27 and the operating status "OFFLINE" of the destination terminal (i.e., terminal 10ab) corresponding to the terminal ID "01ab" to the request source terminal (i.e., terminal 10aa) via the communication terminal 2 (step S32). Further, the transmitter-receiver unit 51 separately transmits the remaining terminal status information containing the terminal ID "01ba" and the operating status "ONLINE (CALLING)" of the destination terminal (i.e., terminal 10ba) corresponding to the terminal ID "01ba" to the request source terminal (i.e., terminal 10aa) via the communication terminal 2 as a part of the process in step S32.

Subsequently, the storing-reading processing unit 19 of the request source terminal (i.e., terminal 10aa) sequentially stores the status information of the terminals received from the management system 50 (step S33). Accordingly, the request source terminal (terminal 10aa) may acquire the current operating status information of the destination candidate terminals such as the terminal 10ab and the like capable of communicating with the request source terminal (terminal 10aa).

Subsequently, the address list creating unit 20 of the request source terminal (terminal 10aa) creates an address list to which the statuses of the destination candidate terminals 10 are reflected based on the address list information and the terminal status information stored in the volatile storage unit 1100 and the display control unit 16 controls address list display time of the display 120 illustrated in FIG. 2 (step S34).

As described above, the display 120aa may display the address list containing the destination names 11-2, status information icons 11-3a reflecting the status information and the like presented in the address list frame 11-1 as illustrated in FIG. 22.

Referring back to FIG. 21, the terminal extraction unit 54 of the management system 50 searches the address list management table (see FIG. 12) by the terminal ID (01aa) of the request source terminal (i.e., terminal 10aa) that has requested for the login as a search key, and extracts terminal IDs of other request source terminals that have been registered as the destination candidate terminals for the terminal ID "01aa" of the request source terminal (terminal 10aa). As a result, the terminal extraction unit 54 extracts the terminal IDs of other request source terminals that have been registered as the destination candidate terminals for the terminal ID "01aa" of the request source terminal (terminal 10aa) (step S35). In the address list management table illustrated in FIG. 12, the extracted terminal IDs of the other request source terminals that have been registered as the destination terminals for the terminal ID "01aa" of the request source terminal (terminal 10aa) are "01ab", "01ba", and "01db".

Next, the terminal status acquisition unit 55 of the terminal extraction unit 50 searches the terminal management table (see FIG. 11) by the terminal ID (01aa) of the request source terminal (i.e., terminal 10aa) that has requested for the login as a search key, and acquires the operating status of the request source terminal (i.e., terminal 10aa) (step S36).

Among the terminals (10ab, 10ba, 10db) corresponding to the terminal IDs (01ab, 01ba, 01db) extracted in step S35, the transmitter-receiver unit 51 transmits the terminal status information containing the terminal ID "01aa" and the operating status "ONLINE" of the request source terminal (terminal 10aa) acquired in step S36 to the terminals (terminals 10ba, 10db) the operating statuses of which are presented as "ONLINE" in the terminal management table (see FIG. 11) (steps S37-1, S37-2). Note that the transmitter-receiver unit 51 refers to the IP address of the terminals managed in the terminal management table illustrated in FIG. 11 based on the terminal IDs (01ba, 01db in this case) when the transmitter-receiver unit 51 transmits the status information of the terminals (10ba, 10db). Accordingly, the terminal ID "01aa" and the operating status "ONLINE" of the request source terminal (terminal 10aa) may be transmitted to each of the other destination terminals (10ba, 10db) capable of communicating with the request source terminal (terminal 10aa) that has requested the login as the destination terminal.

In a similar manner as step S21, when the user switches ON the power switch 109 illustrated in FIG. 2, the operation-inputs receiver unit 12 illustrated in FIG. 4 receives a power-ON signal to switch ON the power of another terminal 10, and processes similar to those carried out in steps S22 through S38-1, S38-2 are subsequently performed. Thus, the descriptions of the steps S22 through S38-1, S38-2 are omitted.

Next, a process in which the terminal requests another terminal to initiate communication is described. Note that FIG. 23 illustrates a process in which various management information items are transmitted and received in the management information sessions sei. Further, in this embodiment, the request source terminal (terminal 10aa) may communicate with at least one of the terminals (10bb, 10cb, 10db) having the operating status "ONLINE" and the communication status "NONE" that are indicated by the terminal status information received in step S32. Accordingly, in the following, a case where the user of the request source terminal (terminal 10aa) selects the destination terminals (terminals 10bb, 10cb, 10db) to initiate communication is described.

Initially, when the user of the request source terminal (terminal 10aa) presses an operations button 108 illustrated in FIG. 2 to select the destination terminals (terminals 10bb, 10cb, 10db), the operation-inputs receiver unit 12 illustrated in FIG. 4 receives the respective requests for initiating communication with the destination terminals (terminals 10bb, 10cb, 10db) (step S41). The transmitter-receiver unit 11 of the terminal 10aa transmits initiation request information containing the terminal ID "01aa" of the request source terminal 10aa, the terminal IDs (01bb, 01cb, 01db) of the terminals (terminals 10bb, 10cb, 10db) and alteration request information "INVITE" indicating the request for initiating communication to the management system 50 (step S42). Accordingly, the transmitter-receiver unit 51 of the management system 50 receives the initiation request information while detecting the IP address "1.2.1.3" of the request source terminal 10aa that is a transmission source terminal.

The status management unit 53 alters the communication status fields of the records associated with the terminal IDs "01aa", "01bb", "01cb", "01db" in the terminal management table (see FIG. 11) based on the terminal ID "01aa" of the request source terminal 10aa, the terminal IDs (01bb, 01cb, 01db) of the terminals (terminals 10bb, 10cb, 10db) contained in the initiation request information (step S43).

Herein, the process in step S43 is described further in detail with reference to FIG. 24. In this embodiment, the status management unit 53 alters the communication status of the terminal 10 based on communication status alteration rules illustrated by a status transition diagram in FIG. 36. For example, when the status management unit 53 receives the alteration request "CANCEL" and the communication status of the terminal is "RINGING" or "CALLING", the status management unit 53 alters the communication status from "RINGING" or "CALLING" to "NONE". When the communication status of the terminal is "ACCEPTED", the status management unit 53 allows the communication status to remain "ACCEPTED". In this embodiment, an example in which the status alteration management table (see FIGS. 16, 17, and 18) is utilized for implementing the status alteration by the status management unit 53 is described; however, the implementation of the status alteration may not be limited to this example. In this case, management system programs may be defined such that the status management unit 53 alters the communication status of the terminal 53 based on communication status alteration rules illustrated by the status transition diagram in FIG. 36.

Figure 5:
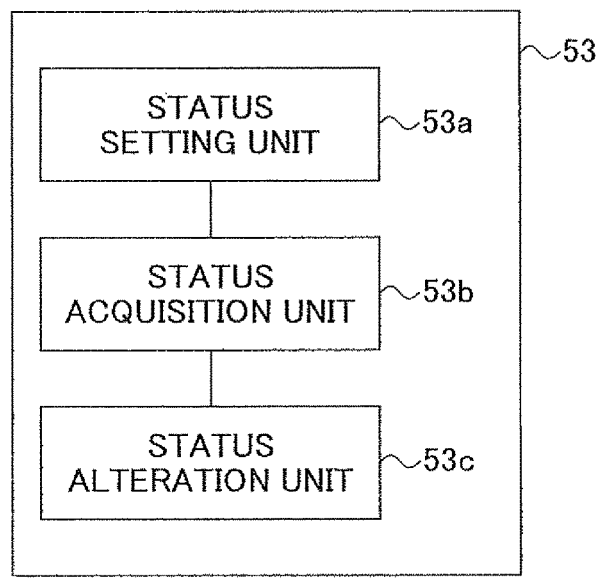
FIG. 5 is a detailed functional block diagram depicting a status management unit illustrated in FIG. 4 in detail.
Figure 6:
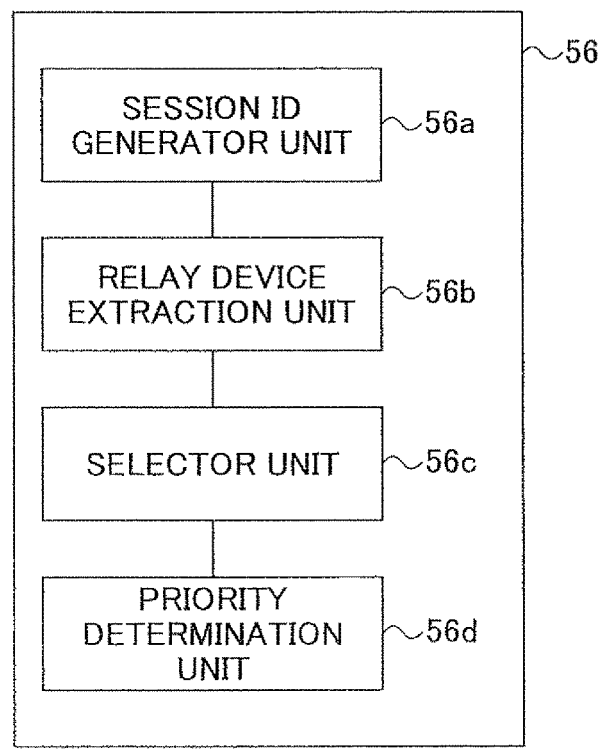
FIG. 6 is a functional block diagram depicting a relay device selector unit illustrated in FIG. 4 in detail.

Initially, the status acquisition unit 53b of the status management unit 53 illustrated in FIG. 5 acquires the communication statuses of the terminals managed by the terminal management DB 5003 (step S43-1). In this case, the alteration request information "INVITE" received by the transmitter-receiver unit 51 is determined in advance by the alteration request information determination unit 63 as the specific alteration request information. The status management unit 53 thus not only acquires the communication status of the request source terminal (terminal 10aa) but also acquires the communication statuses of the destination terminals (terminals 10bb, 10cb, 10db). In this case, the status acquisition unit 53b searches the terminal management table (see FIG. 11) by the terminal ID "01aa" of the request source terminal (i.e., terminal 10aa) as a search key, and acquires the operating status "NONE" of the request source terminal (i.e., terminal 10aa) that has requested the initiation of the communication. Likewise, the status acquisition unit 53b also acquires the communication statuses "NONE" of the destination terminals 10bb and 10db.

Subsequently, the status alteration unit 53c of the status management unit 53 acquires respective pre-alteration status information items of the request source terminal and the destination terminals corresponding to the alteration request information "INVITE" (step S43-2). In this case, the status alteration unit 53c searches the status alteration management table (see FIG. 17) by the alteration request information "INVITE" and the terminal information "request source" as search keys, and acquires the pre-alteration status information "NONE" of the request source terminal. Similarly, the status alteration unit 53c searches the status alteration management table (see FIG. 17) by the alteration request information "INVITE" and the terminal information "destination" as search keys, and acquires the pre-alteration status information "NONE" of the destination terminals.

Subsequently, the status alteration unit 53c compares the communication status acquired by the status acquisition unit 53b and the pre-alteration status information acquired by the status alteration unit 53c for each terminal and determines whether the communication status matches the pre-alteration status information (step S43-3). In this case, the status alteration unit 53c compares the communication status "NONE" of the request source terminal (terminal 10aa) acquired by the status acquisition unit 53b and the pre-alteration status information "NONE" of the request source terminal acquired by the status alteration unit 53c and determines whether the communication status matches the pre-alteration status information. Similarly, the status alteration unit 53c compares the communication status of the destination terminal (terminal 10bb, 10cb, or 10db) acquired by the status acquisition unit 53b and the pre-alteration status information of the destination terminals (terminal 10bb, 10cb, or 10db) acquired by the status alteration unit 53c and determines whether the communication status matches the pre-alteration status information for each destination terminal.

If the communication status of the request source terminal acquired by the status acquisition unit 53b and the pre-alteration status information of the request source terminal acquired by the status alteration unit 53c are matched, and the communication statuses of the destination terminals (terminals 10bb, 10cb, and 10db) acquired by the status acquisition unit 53b and the respective pre-alteration status information of the destination terminals (terminals 10bb, 10cb, and 10db) acquired by the status alteration unit 53c are matched (YES in step S43-3), the status alteration unit 53c acquires alteration information of the request source terminal and those of the destination terminals corresponding to the alteration request information "INVITE" (step S43-4). In this case, the status alteration unit 53c searches the status alteration management table (see FIG. 17) by the alteration request information "INVITE" and the terminal information "request source" as search keys, and acquires the alteration information "CALLING" of the request source terminal. Similarly, the status alteration unit 53c searches the status alteration management table (see FIG. 17) by the alteration request information "INVITE" and the terminal information "destination" as search keys, and acquires the alteration information "RINGING" of the destination terminals.

The status alteration unit 53c alters the communication status fields of the respective records associated with the terminal IDs "01aa", "01bb", "01cb", "01db" in the terminal management table (see FIG. 11) based on the terminal ID "01aa" of the request source terminal 10aa, the terminal IDs (01bb, 01cb, 01db) of the terminals (terminals 10bb, 10cb, 10db) contained in the initiation request information (step S43-5). In this case, the communication status field of the record associated with the terminal ID "01aa" in the terminal management table is altered to "CALLING" based on the acquired alteration information of the request source terminal. Likewise, the communication status fields of the records associated with the terminal IDs "01bb", "01cb", and "01db" in the terminal management table are altered to "RINGING" based on the acquired alteration information of the destination terminals. Further, the determination unit 61 determines appropriate processes (see steps S48-1, S48-2, and S48-3) for transmitting the communication initiation request information to the destination terminals (terminals 10bb, 10cb, 10db) in order to perform call-control on the communications between the request source terminal (terminal 10aa) and the destination terminals (terminals 10bb, 10cb, 10db).

Note that if the communication status and the pre-alteration status information of the request source terminal are not matched, or the communication status and the pre-alteration status information of anyone of the destination terminals (terminals 10bb, 10cb, and 10db) are not matched (NO in step S43-3), the status alteration unit 53c does not alter the communication status field of the record associated with a corresponding one of the terminal IDs "01aa", "01bb", "01cb", and "01db" in the terminal management table (see FIG. 11). This is because any one of the request source terminal (terminal 10aa) and the destination terminals (terminals 10bb, 10cb, 10db) is not ready to initiate communications. Further, the determination unit 61 determines an appropriate process for creating a predetermined error message and transmitting it to the request source terminal (terminal 10aa). Subsequently, the transmitter-receiver unit 51 creates the predetermined error message and transmits it to the request source terminal (terminal 10aa), thereby completing the process.

Next, referring back to FIG. 23, a process subsequent to the process of transmitting the initiation request information to the corresponding destination terminals determined by the determination unit 61 is described. Initially, the session ID generator unit 56a generates a session ID "se1" for identifying a session (i.e., communication data session sed) that executes the communication requested by the request source terminal (terminal 10aa) between the request source terminal and each of the destination terminals (step S44). When the session ID generator unit 56a generates the session ID "se1", the generated session ID "se1" and the number of destination terminals "3" are stored in the volatile storage unit 5100. The number of destination terminals ("3" in this case) is utilized for determining whether the alteration request information "REJECT" is received from all the destination terminals when the alteration request information "REJECT" indicating the rejecting the initiation of the communication is received.

Subsequently, the relay device selector unit 56 of the status management unit 50 selects the relay device 30 for relaying the communications between the request source terminal (terminal 10aa) and the destination terminals (terminals 10bb, 10cb, 10db) based on the relay device management DB 5001 and a relay device selection management DB 5008 (see FIG. 4) (step S45). In this case, the relay device selector unit 56 searches a relay device selection management table (see FIG. 15) by the terminal IDs "01aa", "01bb", "01cb", and "01db" contained in the communication initiation request information (step S43) as search keys and extracts the relay device IDs "111a", "111b", "111c", and "111d" associated with the terminals (10aa, 10bb, 10cb, and 10db).

If the extracted relay terminal IDs are identical, the selector unit 56c refers to the operating status of the relay device 30 in the relay device management table (see FIG. 9) corresponding to the extracted relay device ID. If the operating status corresponding to the extracted relay device ID is the "ONLINE" status, the selector unit 56c selects the relay device corresponding to the extracted relay device ID as the relay device utilized for relaying the communication. However, if the extracted relay device IDs are not identical, or the operating status is the "OFFLINE" as a result of referring to the operating status of the relay device corresponding to the extracted relay device ID, the selector unit 56c selects a relay device 30e corresponding to the extracted relay device ID "111e" as the relay device utilized for relaying the communication. In the following, the case where the selector unit 56c selects the relay device 30e as the relay device utilized for relaying the communication is described.

After the selecting of the relay device 30 (relay device 30e in this case) is completed, the session management unit 57 stores the terminal ID "01aa" of the request source terminal 10aa in the request source terminal ID field, the terminal IDs (01bb, 01cb, 01db) of the terminals (terminals 10bb, 10cb, 10db) in the destination terminal field, and the relay device ID (111e) of the selected relay device in the relay device field of the record associated with the session ID "se1" in the session management table (see FIG. 13) (step S46).

Next, the transmitter-receiver unit 51 illustrated in FIG. 4 transmits the session ID generated by the session ID generator unit 56a and relay device connecting information utilized for connecting the relay device 30e selected by the selector unit 56c to the request source terminal (terminal 10aa) via the communication network 2 (step S47). The relay device connecting information may contain an IP address "1.1.1.3" of the relay device 30e, authentication information, and a port number and the like. Accordingly, the terminal 10aa may detect the relay device connecting information utilized for connecting to the relay device 30e that relays the communication data by execution of the session corresponding to the session ID "se1".

Subsequently, the transmitter-receiver unit 51 transmits the terminal ID "01aa" of the request source terminal 10aa, the alteration request information "INVITE" indicating the request for initiating communication with the destination terminals, the communication initiation request information containing the session ID "se1", the relay device connecting information utilized for connecting to the relay device 30e, and the IP address of the management system 50 to all the destination terminals (terminals 10bb, 10cb, 10db) (steps S48-1, S48-2, and S48-3). Accordingly, the transmitter-receiver units 11 of the destination terminals (terminals 10bb, 10bcb, 10db) may receive the communication initiation request information and detect the relay device connecting information utilized for connecting to the relay device 30e that relays the communication data, and the IP address "1.1.1.2" of the management system 50 as a transmission source device.

Subsequently, a process to be carried out when the destination terminal (terminal 10db) that has received the communication initiation request information receives a response indicating permission to initiate the communication with the request source terminal (terminal 10aa) by the user of the destination terminal (terminal 10db) pressing the operations button 108 illustrated in FIG. 2 with reference to FIGS. 24 and 25. The destination terminal (terminal 10db) receives the response indicating the permission to initiate the communication with the request source terminal (terminal 10aa) when the user of the destination terminal (terminal 10db) presses the operations button 108 (step S49). The transmitter-receiver unit 11 of the destination terminal 10db transmits initiation response information containing the terminal ID "01db" of the destination terminal 10db, the terminal ID "01aa" of the request source terminal 10aa, alteration request information "ACCEPT" indicating the permission to initiate the communication, and the session ID "se1" to the management system 50 (step S50).

When the transmitter-receiver unit 51 of the management system 50 receives the initiation response information, the status management unit 53 alters the communication status fields of the respective records associated with the terminal IDs "01aa" and "01db" in the terminal management table (see FIG. 11) based on the terminal ID "01aa" of the request source terminal 10aa and the terminal ID (01db) of the terminal (terminal 10db) (step S51).

Herein, the process in step S51 is described further in detail with reference to FIG. 24. Initially, when the transmitter-receiver unit 51 of the management system 50 receives the initiation response information, the status acquisition unit 53b of the status management unit 53 illustrated in FIG. 5 acquires the communication statuses of the terminals managed by the terminal management table (see FIG. 11) in a similar manner as the process in step S43-1 (step S51-1). In this case, the alteration request information "ACCEPT" received by the transmitter-receiver unit 51 is determined in advance by the alteration request information determination unit 63 as the specific alteration request information. The status management unit 53 thus not only acquires the communication status "RINGING" of the destination terminal (terminal 10db) but also acquires the communication status "CALLING" of the request source terminal (terminal 10aa).

Subsequently, the status alteration unit 53c of the status management unit 53 acquires the pre-alteration status information "CALLING" and "ACCEPTED" of the request source terminal 10aa associated with the alteration request information "ACCEPT" managed in the status alteration management table (see FIG. 17) in a similar manner as the process in step S43-2. Likewise, the status alteration unit 53c of the status management unit 53 acquires the pre-alteration status information "RINGING" of the destination terminal associated with the alteration request information "ACCEPT" managed in the status alteration management table (see FIG. 17) (step S51-2).

Subsequently, the status alteration unit 53c compares the communication status acquired by the status acquisition unit 53b and the pre-alteration status information acquired by the status alteration unit 53c for each terminal and determines whether the communication status matches the pre-alteration status information (step S51-3). In this case, the status alteration unit 53c compares the communication status "CALLING" of the request source terminal (terminal 10aa) acquired by the status acquisition unit 53b and the pre-alteration status information "CALLING" of the request source terminal acquired by the status alteration unit 53c and determines whether the communication status "CALLING" of the request source terminal (terminal 10aa) matches one of the pre-alteration status information items "CALLING" and "ACCEPTED". Similarly, the status alteration unit 53c determines whether the communication status "RINGING" of the destination terminal (terminal 10db) acquired by the status acquisition unit 53b matches the pre-alteration status information "RINGING" of the destination terminal acquired by the status alteration unit 53c.

If the communication status of the request source terminal and the pre-alteration status information of the request source terminal are matched, and the communication status of the destination terminal (terminal 10db) and the pre-alteration status information of the destination terminal (terminal 10db) are matched (YES in step S51-3), the status alteration unit 53c acquires alteration information of the request source terminal and that of the destination terminal corresponding to the initiation response information "ACCEPT" (step S51-4). In this case, the status alteration unit 53c searches the status alteration management table (see FIG. 17) by the initiation response information "ACCEPT", the terminal information "REQUEST SOURCE" indicating the request source terminal, and the pre-alteration status information "CALLING" indicating the previous communication status of the request source terminal as search keys, and acquires the alteration information "ACCEPTED" of the request source terminal. Likewise, the status alteration unit 53c searches the status alteration management table (see FIG. 17) by the initiation response information "ACCEPT", the terminal information "DESTINATION" indicating the destination terminal, and the pre-alteration status information "RINGING" indicating the previous communication status of the destination terminal as search keys, and acquires the alteration information "ACCEPTED" of the destination terminal.

Subsequently, the status alteration unit 53c alters the communication status fields of the respective records associated with the terminal IDs "01aa" and "01db" contained in the initiation response information in the terminal management table (see FIG. 11) based on the terminal ID "01aa" of the request source terminal 10aa and the terminal ID (01db) of the destination terminal (terminal 10db) (step S51-5). In this case, the communication status field of the record associated with the terminal ID "01aa" in the terminal management table is altered to "ACCEPTED" based on the acquired alteration information of the request source terminal. Similarly, the communication status field of the record associated with the terminal ID "01db" in the terminal management table is altered to "ACCEPTED" based on the acquired alteration information of the destination terminal. Further, the determination unit 61 determines an appropriate process (see step S52) for transmitting the initiation response information to the request source terminal (terminal 10aa) in order to perform call-control on the communications between the request source terminal (terminal 10aa) and the destination terminal (terminal 10db).

Note that if the communication status and the pre-alteration status information items of the request source terminal (10aa) are not matched, or the communication status and the pre-alteration status information items of the destination terminal (terminal 10db) are not matched (NO in step S51-3), the status alteration unit 53c does not alter the communication status field of the record associated with a corresponding one of the terminal IDs "01aa" and "01db" in the terminal management table (see FIG. 11). In this case, the determination unit 61 determines an appropriate process for creating a predetermined error message and transmitting it to the destination terminal (terminal 10db). Subsequently, the transmitter-receiver unit 51 creates the predetermined error message and transmits it to the destination terminal (terminal 10db), thereby completing the process.

Next, referring back to FIG. 25, a process to be performed when transmission of the initiation response information to the destination terminal is determined by the determination unit 61 is described. The transmitter-receiver unit 51 transmits initiation response information containing the terminal ID "01db" of the destination terminal 10db, alteration request information "ACCEPT" indicating the permission to initiate the communication with the destination terminal, and the session ID "se1" to the request source terminal (step S52). On receiving the initiation response information, the transmitter-receiver unit 11 of the request source terminal (terminal 10aa) transmits the session ID "se1" and the relay device connecting information acquired in step S47 to the relay device 30e, thereby connecting the request source terminal (terminal 10aa) and the relay device 30e (step S53). Likewise, the transmitter-receiver unit 11 of the destination terminal (terminal 10db) transmits the session ID "se1" and the relay device connecting information acquired in step S48-1 to the relay device 30e, thereby connecting the destination terminal (terminal 10db) and the relay device 30e (step S54).

Subsequently, a process to be carried out when the destination terminal (terminal 10bb) that has received the communication initiation request information receives a response indicating a rejection in initiating the communication with the request source terminal (terminal 10aa) by the user of the destination terminal (terminal 10bb) pressing the operations button 108 illustrated in FIG. 2 is described with reference to FIGS. 26 and 27. When the destination terminal (terminal 10bb) receives the response indicating the rejection in initiating the communication with the request source terminal (terminal 10aa) by the user pressing the operations button 108 of the destination terminal (terminal 10bb) (step S55), the transmitter-receiver unit 11 of the terminal 10bb transmits initiation response information containing the terminal ID "01bb" of the request source terminal 10bb, alteration request information "REJECT" indicating the rejection in initiating the communication, and the session ID "se1" to the management system 50 (step S56).

When the transmitter-receiver unit 51 of the management system 50 receives the initiation response information, the status management unit 53 alters the communication status fields of the respective records associated with the terminal IDs "01aa" and "01bb" in the terminal management table (see FIG. 11) based on the terminal ID "01aa" of the request source terminal 10aa and the terminal ID "01db" of the terminal 10bb (step S57).

Herein, the process in step S57 is described further in detail with reference to FIG. 27. Initially, when the transmitter-receiver unit 51 of the management system 50 receives the initiation response information, the assessment unit 62 stores the number of the initiation response information "REJECT" received by the transmitter-receiver unit 51 (the number of received responses) in the session indicated by the session ID "se1" in the volatile storage unit 5100 (step S57-1). In this case, since the initiation response information "REJECT" received from the destination terminal (terminal 10bb) is the first one of the initiation response information "REJECT" in the session indicated by the session ID "se1", the assessment unit 62 stores the number of received responses "1" in association with the session ID "se1" in the volatile storage unit 5100.

Subsequently, the status acquisition unit 53b of the status management unit 53 illustrated in FIG. 5 acquires the communication statuses of the terminals managed by the terminal management table (see FIG. 11) in a similar manner as the process in step S43-1 (step S57-2). In this process, the alteration request information determination unit 63 determines the alteration request information "REJECT" received by the transmitter-receiver unit 51 as the specific alteration request information. Thus, the status management unit 53 not only acquires the communication status "RINGING" of the destination terminal (terminal 10bb) but also acquires the communication status "ACCEPTED" of the request source terminal (terminal 10aa) (step S57-2).

Subsequently, the status alteration unit 53c of the status management unit 53 acquires the pre-alteration status information "CALLING" and "ACCEPTED" of the request source terminal associated with the initiation response information "REJECT" managed in the status alteration management table (see FIG. 18) in a similar manner as the process in step S43-2 (step S57-3).

Subsequently, the status alteration unit 53c compares the communication status acquired by the status acquisition unit 53b and the pre-alteration status information acquired by the status alteration unit 53c and determines whether the communication status matches the pre-alteration status information for each terminal (step S57-4). In this case, the status alteration unit 53c compares the communication status "ACCEPTED" of the request source terminal (terminal 10aa) acquired by the status acquisition unit 53b and one of the pre-alteration status information items "CALLING" and "ACCEPTED" of the request source terminal acquired by the status alteration unit 53c and determines whether the communication status "ACCEPTED" of the request source terminal (terminal 10aa) matches one of the pre-alteration status information items "CALLING" and "ACCEPTED". Similarly, the status alteration unit 53c determines whether the communication status "RINGING" of the destination terminal (terminal 10bb) acquired by the status acquisition unit 53b matches the pre-alteration status information "RINGING" of the destination terminal (terminal 10bb) acquired by the status alteration unit 53c.

If the communication status and the pre-alteration status information of the request source terminal are matched, and the communication status and the pre-alteration status information of the destination terminal (terminal 10bb) are matched for each terminal (YES in step S57-4), the assessment unit 62 determines whether all the destination terminals have rejected the request from the request source terminal (terminal 10aa), or part of the destination terminals has rejected the request from the request source terminal (terminal 10aa) (step S57-5). In this process, the assessment unit 62 acquires the number of destination terminals "3" of the destination to which the request information is transmitted by the request source terminal (i.e., terminal 10aa) from the volatile storage unit 5100 (see step S44). Subsequently, the assessment unit 62 acquires the number of received initiation response information items "REJECT" (the number of received responses) "1" measured by a measuring unit from the volatile storage unit 5100 (see step S57-1). Thus, the assessment unit 62 determines that part of the destination terminals has rejected the request from the request source terminal (terminal 10aa).

Having completed the above determination made by the assessment unit 62, the status alteration unit 53c acquires respective alteration information of the request source terminal and the destination terminals associated with the response information "REJECT" (step S57-6). In this case, the status alteration unit 53c searches the status alteration management table (see FIG. 18) by the response information "reject", the terminal information "request source" indicating the request source terminal, the determination information "PART" indicating the result determined by the assessment unit 62, and the pre-alteration status information "ACCEPTED" indicating the previous communication status of the request source terminal as search keys, and acquires the alteration information "ACCEPTED" of the request source terminal. Similarly, the status alteration unit 53c searches the status alteration management table (see FIG. 18) by the response information "REJECT" and the terminal information "destination" as search keys, and acquires the alteration information "NONE" of the destination terminals.

Subsequently, the status alteration unit 53c alters the communication status fields of the respective records associated with the terminal IDs "01aa" and "01bb" in the terminal management table (see FIG. 11) based on the terminal ID "01aa" of the request source terminal 10aa and the terminal ID (01bb) of the terminal (terminal 10bb) (step S57-7). In this case, the communication status field of the record associated with the terminal ID "01aa" in the terminal management table is altered to "ACCEPTED" based on the acquired alteration information of the request source terminal. Similarly, the communication status field of the record associated with the terminal ID "01bb" in the terminal management table is altered to "NONE" based on the acquired alteration information of the destination terminal. Further, the determination unit 61 determines an appropriate process (see step S59) for transmitting the initiation response information to the request source terminal (terminal 10aa) in order to perform call-control on the communications between the request source terminal (terminal 10*aa*) and the destination terminal (terminal 10*bb*).

Note that if the communication status and the pre-alteration status information of the request source terminal (10*aa*) are not matched, or the communication status and the pre-alteration status information of the destination terminal (terminal 10*bb*) are not matched (NO in step S57-4), the status alteration unit 53*c* does not alter the communication status field of the record associated with a corresponding one of the terminal IDs "01*aa*" and "01*bb*" in the terminal management table (see FIG. 11). In this case, the determination unit 61 determines an appropriate process for creating a predetermined error message and transmitting it to the destination terminal (terminal 10*bb*). Subsequently, the transmitter-receiver unit 51 creates the predetermined error message and transmits it to the destination terminal (terminal 10*bb*), thereby completing the process.

Next, referring back to FIG. 26, a process to be performed when the process of transmitting the communication initiation request information to the request source terminal (terminal 10*aa*) is determined by the determination unit 61 is described. Initially, the session management unit 57 deletes the terminal ID "01*bb*" of the destination terminal (terminal 10*bb*) from the destination terminal ID field of the record associated with the session ID "se1" in the session management table of the nonvolatile storage unit 5000 (see FIG. 13) (step S58). Further, the transmitter-receiver unit 51 transmits initiation response information containing the terminal ID "01*bb*" of the destination terminal 10*bb*, response information "REJECT" indicating the rejection in initiating the communication, and the session ID "se1" to the request source terminal (terminal 10*aa*) (step S59). Accordingly, the request source terminal (terminal 10*aa*) detects the indication that initiating the communication with the destination terminal (terminal 10*bb*) has been rejected.

Subsequently, a process to be carried out when the request source terminal (terminal 10*aa*) has received a request for cancelling the communication initiation request for the communication by the user of the request source terminal (terminal 10*aa*) pressing the operations button 108 after the communication initiation request for the communication is transmitted by the request source terminal (terminal 10*aa*) is described with reference to FIGS. 24 and 28. When the request source terminal (terminal 10*aa*) receives the response indicating cancelling of the communication initiation request (hereinafter called "cancellation request information") by the user pressing the operations button 108 of the request source terminal (terminal 10*aa*) (step S61), the transmitter-receiver unit 11 of the terminal 10*aa* transmits cancellation request information containing the terminal ID "01*aa*" of the request source terminal (terminal 10*aa*), alteration request information "CANCEL" indicating the cancellation of the communication initiation request, and the session ID "se1" to the management system 50 (step S62).

When the transmitter-receiver unit 51 of the management system 50 receives the cancellation request information, the status management unit 53 alters the communication status field of the record associated with the terminal ID "01*aa*" in the terminal management table (see FIG. 11) based on the terminal ID "01*aa*" of the request source terminal 10*aa* (step S63).

Herein, the process in step S63 is described further in detail with reference to FIG. 24. Initially, when the transmitter-receiver unit 51 of the management system 50 receives alteration request information "CANCEL" contained the cancellation request information, the status acquisition unit 53*b* of the status management unit 53 illustrated in FIG. 5 acquires the communication statuses of the terminals managed by the terminal management table (see FIG. 11) (step S63-1). In this process, the alteration request information determination unit 63 determines the alteration request information "CANCEL" received by the transmitter-receiver unit 51 as the specific alteration request information. Thus, the status management unit 53 not only acquires the communication status of the request source terminal (terminal 10*aa*) but also acquires the communication statuses of the destination terminals (step S63-1). In this case, the status acquisition unit 53*b* searches the terminal management table (see FIG. 11) by the terminal ID "01*aa*" of the request source terminal (terminal 10*aa*) as a search key, and acquires the communication status "ACCEPTED" of the request source terminal (terminal 10*aa*) that has requested the initiation of the communication. Subsequently, the status acquisition unit 53*b* searches the session management table (see FIG. 13) by the session ID "se1" as a search key, and acquires the terminal IDs "01*db*" and "01*cb*" of the destination terminals. Next, the status acquisition unit 53*b* searches the status alteration management table (see FIG. 11) by the terminal ID "01*db*" of the destination terminal (terminal 10*db*) and the terminal ID "01*cd*" of the destination terminal (terminal 10*cb*) as search keys, and acquires the respective communication statuses "ACCEPTED" and "RINGING" of the destination terminals (terminals 10*db* and 10*cd* in this case).

Subsequently, the status alteration unit 53*c* of the status management unit 53 acquires the pre-alteration status information "CALLING" and "ACCEPTED" of the request source terminal and the pre-alteration status information "RINGING" of the destination terminal associated with the initiation response information "CANCEL" managed in the status alteration management table (see FIG. 17) in a similar manner as the process in step S43-2 (step 63-2).

Subsequently, the status alteration unit 53*c* compares the communication status acquired by the status acquisition unit 53*b* and the pre-alteration status information acquired by the status alteration unit 53*c* for each terminal and determines whether the communication status matches the pre-alteration status information (step S63-3). In this case, the status alteration unit 53*c* compares the communication status "ACCEPTED" of the request source terminal (terminal 10*aa*) acquired by the status acquisition unit 53*b* and one of the pre-alteration status information "CALLING" and "ACCEPTED" of the request source terminal acquired by the status alteration unit 53*c* and determines whether the communication status "ACCEPTED" of the request source terminal (terminal 10*aa*) matches one of the pre-alteration status information "CALLING" and "ACCEPTED" of the corresponding destination terminal. Similarly, the status alteration unit 53*c* determines whether the communication status "ACCEPTED" of the destination terminal (terminal 10*db*) and the communication status "RINGING" of the destination terminal (terminal 10*cb*) acquired by the status acquisition unit 53*b* matches the pre-alteration status information "RINGING" of the corresponding destination terminal acquired by the status alteration unit 53*c*.

If the communication status of the request source terminal acquired by the status acquisition unit 53*b* and the pre-alteration status information of the request source terminal acquired by the status alteration unit 53*c* are matched, and the communication statuses of the destination terminals acquired by the status acquisition unit 53*b* and the respective pre-alteration status information items of the destination terminals acquired by the status alteration unit 53*c* are matched (YES in step S63-3), the status alteration unit 53*c* acquires alteration information of the request source terminal and those of the destination terminals corresponding to the alteration request information "CANCEL" (step S63-4). In this case, the status alteration unit 53c searches the status alteration management table (see FIG. 18) by the alteration request information "CANCEL", the terminal information "request source" indicating the request source terminal, and the pre-alteration status information "ACCEPTED" indicating the previous communication status of the request source terminal as search keys, and acquires the alteration information "ACCEPTED" of the request source terminal. Similarly, the status alteration unit 53c searches the status alteration management table (see FIG. 17) by the alteration request information "CANCEL" and the terminal information "destination" as search keys, and acquires the alteration information "NONE" of the destination terminal.

Subsequently, the status alteration unit 53c alters the communication status fields of the respective records associated with the terminal IDs "01aa" and "01cb" in the terminal management table (see FIG. 11) based on the terminal ID "01aa" of the request source terminal 10aa and the terminal ID (01cb) of the terminal (terminal 10cb) (step S63-5). In this case, the communication status field of the record associated with the terminal ID "01aa" in the terminal management table is altered to "ACCEPTED" based on the acquired alteration information of the request source terminal. Similarly, the communication status field of the record associated with the terminal ID "01cb" in the terminal management table is altered to "NONE" based on the acquired alteration information of the destination terminal. Further, the determination unit 61 determines appropriate processes (see steps S65-1 and S65-2) for transmitting the cancellation request information to the request source terminal (terminal 10aa) and the destination terminal (terminal 10cb) in order to perform call-control on the communications between the request source terminal (terminal 10aa) and the destination terminal (terminal 10cb).

If the communication status and the pre-alteration status information of the request source terminal are not matched, or the communication status and the pre-alteration status information of the destination terminal are not matched (NO in step S63-3), the status alteration unit 53c does not alter the communication status field of the record associated with a corresponding one of the terminal IDs of the request source terminal and destination terminal in the terminal management table (see FIG. 11). In this embodiment, since the communication status "ACCEPTED" of the destination terminal (terminal 10db) differs from the pre-alteration status "RINGING" of the destination terminal (terminal 10db), the communication status field of the record associated with the terminal ID "01db" is not altered in the terminal management table (see FIG. 11. This is because the destination terminal (terminal 10db) has already authorized the communication request and may not thus cancel the communication request. In this case, the determination unit 61 determines an appropriate process for creating a predetermined error message indicating that the communication with the destination terminal (terminal 10db) may not be cancelled and transmitting it to the request source terminal (terminal 10aa). Subsequently, the transmitter-receiver unit 51 creates the predetermined error message and transmits it to the request source terminal (terminal 10aa), thereby completing the process.

Next, referring back to FIG. 28, a process to be performed when transmission of information indicating that the communication request has been cancelled to the request source terminal (terminal 10aa) and the destination terminal (terminal 10cb) is determined by the determination unit 61 is described. Initially, the session management unit 57 deletes the terminal ID "01cb" of the destination terminal (terminal 10cb) from the destination terminal ID field of the record associated with the session ID "se1" in the session management table of the nonvolatile storage unit 5000 (see FIG. 13) (step S64).

Further, the transmitter-receiver unit 51 transmits the cancellation information containing the session ID "se1" and the information indicating that the communication with the destination terminal (terminal 10cb) has been cancelled to the request source terminal (terminal 10aa) and the destination terminal (terminal 10cb) (steps S65-1 and S65-2). Accordingly, the request source terminal (terminal 10aa) and the destination terminal (terminal 10cb) detect the indication that the communication between the request source terminal (terminal 10aa) and the destination terminal (terminal 10cb) has been cancelled.

Next, a process in which the relay device 30e initiates relaying the communication data communicated between the request source terminal (terminal 10aa) and the destination terminal (terminal 10db) is described. Note that FIG. 29 illustrates a process in which various management information items are transmitted and received via the management information sessions sei.

Initially, when the request source terminal (terminal 10aa) has connected to the relay device 30e (see step S53), the transmitter-receiver unit 11 of the request source terminal (10aa) transmits relay request information containing the terminal ID "01aa" of the request source terminal (terminal 10aa), the session ID "se1", and alteration request information "JOIN" indicating a request for initiating relaying of the communication data (hereinafter called a "relay initiation request") to the management system 50 at a predetermined timing (step S71-1).

When the transmitter-receiver unit 51 of the management system 50 receives the relay request information, the status management unit 53 alters the communication status field of the record associated with the terminal ID "01aa" in the terminal management table (see FIG. 11) based on the terminal ID "01aa" of the request source terminal 10aa (step S72-1).

Herein, the process in step S72-1 is described further in detail with reference to FIG. 30. Initially, the status acquisition unit 53b of the status management unit 53 illustrated in FIG. 5 acquires the communication statuses of the terminals managed by the terminal management DB 5003 (step S72-1-1). In this case, the alteration request information "JOIN" received by the transmitter-receiver unit 51 is determined in advance by the alteration request information determination unit 63 as non-specific alteration request information. The status management unit 53 thus only acquires the communication status of the request source terminal (terminal 10aa). In this case, the status acquisition unit 53b searches the terminal management table (see FIG. 11) by the terminal ID "01aa" of the request source terminal (terminal 10aa) as a search key, and acquires the communication status "ACCEPTED" of the request source terminal (terminal 10aa) that has requested the initiation of relaying the communication data.

Subsequently, the status alteration unit 53c of the status management unit 53 acquires pre-alteration status information of the request source terminal (terminal 10aa) corresponding to the alteration request information "JOIN" (step S72-1-2). In this case, the status alteration unit 53c searches the status alteration management table (see FIG. 16) by the alteration request information "JOIN" as a search key, and acquires the pre-alteration status information "ACCEPTED" of the request source terminal (terminal 10aa).

Subsequently, the status alteration unit 53c compares the communication status acquired by the status acquisition unit 53b and the pre-alteration status information acquired by the status alteration unit 53c for the terminal 10aa and determines whether the communication status matches the pre-alteration status information (step S72-1-3). In this case, the status alteration unit 53c compares the communication status "ACCEPTED" of the request source terminal (terminal 10aa) acquired by the status acquisition unit 53b and the pre-alteration status information "ACCEPTED" of the request source terminal (terminal 10aa) acquired by the status alteration unit 53c and determines whether the communication status matches the pre-alteration status information.

If the communication status of the request source terminal acquired by the status acquisition unit 53b and the pre-alteration status information of the request source terminal acquired by the status alteration unit 53c are matched (YES in step S72-1-3), the status alteration unit 53c acquires alteration information of the request source terminal associated with the alteration request information "JOIN" (step S72-1-4). In this case, the status alteration unit 53c searches the status alteration management table (see FIG. 16) by the alteration request information "JOIN" as a search key, and acquires the alteration information "BUSY".

Subsequently, the status alteration unit 53c alters the communication status field of the record associated with the terminal ID "01aa" in the terminal management table (see FIG. 11) based on the terminal ID "01aa" of the request source terminal 10aa (step S72-1-5). In this case, the communication status field of the record associated with the terminal ID "01aa" in the terminal management table is altered to "BUSY" based on the acquired alteration information. Further, the determination unit 61 determines an appropriate process (see step S73-1) for transmitting the relay initiation request to the relay device 30e in order to perform call-control on the communications.

Note that if the communication status and the pre-alteration status information of the request source terminal (10aa) are not matched (NO in step S72-1-3), the status alteration unit 53c does not alter the communication status field of the record associated with the terminal ID "01aa" in the terminal management table (see FIG. 11). In this case, the determination unit 61 determines an appropriate process for creating a predetermined error message and transmitting it to the request source terminal (terminal 10aa). Subsequently, the transmitter-receiver unit 51 creates the predetermined error message and transmits it to the request source terminal (terminal 10aa), thereby completing the process.

Next, referring back to FIG. 29, a process to be performed when transmission of the relay initiation request to the relay device 30e is determined by the determination unit 61 is described. Initially, the management system 50 transmits the relay initiation request containing the terminal ID "01aa" of the request source terminal 10aa and the session ID "se1" to the relay device 30e (step S73-1). When the relay device 30e receives the relay initiation request, the relay device 30e transmits relay initiation permission information containing report information "OK" indicating the permission to initiate the relaying of the communication data to the management system 50 (step S74-1). On receiving the relay initiation permission information as a response, the transmitter-receiver unit 51 of the management system 50 transmits the received relay initiation permission information to the request source terminal (terminal 10aa) (step S75-1). Accordingly, a communication data session sed is established between the request source terminal (terminal 10aa) and the relay device 30e (step S76-1).

Meanwhile, when the destination terminal (terminal 10db) has connected to the relay device 30e (see FIG. 25 step S54), the transmitter-receiver unit 11 of the destination terminal (10db) transmits relay request information containing the terminal ID "01db" of the destination terminal (terminal 10db), the session ID "se1", and alteration request information "JOIN" indicating a request for initiating relaying of the communication data to the management system 50 at a predetermined timing (step S71-2).

Subsequently, the management system 50 and the relay device 30e execute processes similar to those in steps S72-1, S73-1, S74-1, and S75-1, so that a communication data session sed is established between the destination terminal (terminal 10db) and the relay device 30e (steps 72-2, S73-2, S74-2, S75-2 and S76-2). When respective communication data sessions sed are established between the request source terminal (terminal 10aa) and the relay device 30e, and between the destination terminal (terminal 10db) and the relay device 30e, the relay device 30e may relay three levels of image data, that is, low resolution, medium resolution and high resolution image data, and audio data between the terminals (terminals 10aa and 10db). Accordingly, a videoconference may be initiated between the terminals (10aa and 10db).

Next, a process in which the image data and audio data are transmitted and received between the request source terminal (terminal 10aa) and the destination terminal (terminal 10db) to initiate the videoconference between them is described with reference to FIGS. 4 and 31. Note that a process of transmitting and receiving the image data and audio data and the later described delay time detecting process are the same between a one-way process of transmitting the image data and audio data from the terminal 10aa to the terminal 10db and a reverse process of transmitting the image data and audio data from the terminal 10db to the terminal 10aa. Accordingly, the process of transmitting and receiving the image data and audio data and the later described delay time detecting process are described based on the one-way process of transmitting the image data and audio data from the terminal 10aa to the terminal 10db alone and the descriptions of those for the reverse process are omitted.

Initially, the transmitter-receiver unit 11 of the request source terminal (terminal 10aa) transmits the image data of a subject captured by the imaging unit 14 and the audio data input by the voice input unit 15a in the image and audio data session sed to the relay device 30e via the communication network 2 (step S81). Note that in this embodiment, high quality image data formed of three levels of image data, that is, low resolution, medium resolution and high resolution image data illustrated in FIG. 20 and the audio data are transmitted. Accordingly, the transmitter-receiver unit 31 of the relay device 30e may receive the three resolution levels of the image data and the audio data.

The data quality checker unit 33 searches the alteration quality management table (see FIG. 7) by the IP address of the destination terminal (terminal 10db) as a search key, and checks quality of the image data to be relayed by extracting image quality of the corresponding image data to be relayed (step S82). In this embodiment, the image quality of the image data checked by the data quality checker unit 33 is "high image quality" that is the same image quality as that of the image data receives by the transmitter-receiver unit 31. Accordingly, the relay device 30a transfers the image data and audio data in the image and audio data session sed to the destination terminal (terminal 10*db*) without any change (step S83). Thus, in the destination terminal (terminal 10*db*), the transmitter-receiver unit 11 received the image data and audio data, the display control unit 16 displays the images on the display 120 based on the above image data, and the voice output unit 15*b* outputs sounds based on the above audio data.

Next, the delay detector unit 18 of the destination terminal (terminal 10*db*) detects delay time of the image data received by the transmitter-receiver unit 11 per a predetermined time (e.g., per second) (step S84). Note that in the following, a case where the delay time is determined as 200 ms is described.

The transmitter-receiver unit 11 of the destination terminal (terminal 10*db*) transmits delay information indicating the delay time "200 ms" in the management information session sei to the management system 50 via the communication network 2 (step S85). Accordingly, the management system 50 may detect the delay time and the IP address "1.3.2.4" of the destination terminal 10*db* that is a transmission source terminal for transmitting the delay information.

Subsequently, the delay time management unit 60 of the management system 50 searches the terminal management table (see FIG. 11) by the IP address "1.3.2.4" of the destination terminal (terminal 10*db*) as a search key to extract the corresponding terminal ID "01*db*". Further, the delay time management unit 60 manages the delay time by storing the delay time "200 ms" indicated by the delay information in a delay time field of the record corresponding to the extracted terminal ID "01*db*" in the session management table (see FIG. 13) (step S86).

Subsequently, the quality determination unit 58 searches the quality management table (see FIG. 14) by the delay time "200 ms" as a search key, and extracts the "medium image quality" for the corresponding image data to determine the image quality of the image data as the "medium image quality" (step S87).

Subsequently, the quality determination unit 51 searches the relay device management table (see FIG. 9) by the relay device ID "111*e*" associated with the terminal ID "01*db*" in the session management table (see FIG. 13) as a search key, and extracts the corresponding IP address "1.1.1.3" of the relay device 30*e* (step S88).

The transmitter-receiver unit 51 then transmits quality information indicating the image quality "medium" of the image data determined in step S87 to the relay device 30*e* via the communication network 2 (step S89). The quality information contains the IP address "1.3.2.4" of the destination terminal (terminal 10*db*) utilized as the search key in step S86. Accordingly, in the relay device 30*e*, the alteration quality management unit 34 stores the IP address "1.3.2.4" of the transmission source terminal 10 (terminal 10*db* in this case) and the image quality "medium image quality" of the image data to be relayed by associating the transmission source terminal 10 (terminal 10*db* in this case) with the IP address "1.3.2.4" and the image quality "medium image quality" of the image data to be relayed in the alteration quality management table (see FIG. 7) (step S90).

Subsequently, the terminal 10*aa* continuously transmits three levels of low, medium and high image quality image data and audio data in the image and audio data session sed to the relay device 30*e* in a similar manner as the process in step S81 (step S91). Accordingly, in the relay device 30*e*, the data quality checker unit 33 searches the alteration quality management table (see FIG. 7) by the IP address "1.3.2.4" of the destination terminal (terminal 10*db*) as a search key, and checks the quality of the image data to be relayed by extracting the "medium image quality" for the corresponding image data to be relayed in a similar manner as the process in step S82 (step S92).

In this embodiment, the image quality of the image data checked by the data quality checker unit 33 is "medium image quality" the level of which is lower than the image quality of the image data received by the transmitter-receiver unit 31. Accordingly, the data quality alteration unit 35 alters the image quality of the image data by degrading the high image quality image data to the medium image quality image data (step S93). The transmitter-receiver unit 31 then transmits the image data having the "medium" image quality and the audio data without alteration of sound quality in the image and audio data session sed to the terminal 10*db* via the communication network (step S94). Thus, when receiving of the image data by the destination terminal (terminal 10*db*) is delayed, the relay device alters the image quality such that participants in the videoconference may not feel unnatuaral.

Subsequently, a process in which the destination terminal (terminal 10*cb*) participates in the communication data session that has been established between the request source terminal (terminal 10*aa*) and the destination terminal (terminal 10*db*) is described with reference to FIG. 32. Note that FIG. 32 illustrates a process in which various management information items are transmitted and received via the management information sessions sei.

Initially, the user of the request source terminal (terminal 10*aa*) presses an operations button 108 illustrated in FIG. 2 to receive information on a request for reporting the session ID to the destination terminal 10*cb* in order for the destination terminal 10*cb* to participate in the communication session sed (step S101). The transmitter-receiver unit 11 of the request source terminal (terminal 10*aa*) transmits session ID report request information containing the terminal ID "01*aa*" of the request source terminal (terminal 10*aa*), the terminal ID "01*cb*" of the destination terminal (terminal 10*cb*) and the session ID "se1" to the management system 50 (step S102). On receiving the session ID report request information, the transmitter-receiver unit 51 of the management system 50 transmits session ID report information containing the terminal ID "01*aa*" of the request source terminal (terminal 10*aa*) and the session ID "se1" to the terminal 10*cb* (step S103).

On receiving the session ID report information, the destination terminal (terminal 10*cb*) receives a participation request in the communication data session sed (step S104). In this case, the user of the destination terminal (terminal 10*cb*) presses an operations button 108 illustrated in FIG. 2 to receive the participation request in the communication data session sed. Accordingly, the transmitter-receiver unit 11 of the destination terminal (terminal 10*cb*) transmits session participating request information containing the terminal ID "01*cb*" of the destination terminal (terminal 10*cb*), alteration request information "CALL" indicating a request for participating in the communication data session and the session ID "se1" to the management system 50 (step S105).

On receiving the session participating request information, the status management unit 53 of the management system 50 alters the communication status field of the record associated with the terminal ID "01*cb*" in the terminal management table (see FIG. 11) based on the terminal ID "01*cb*" of the request source terminal (terminal 10*cb*) contained in the session participating request information (step S106).

Herein, the process in step S106 is described further in detail with reference to FIG. 33. Initially, the status acquisition unit 53b of the status management unit 53 illustrated in FIG. 5 acquires the communication statuses of the terminals managed by the terminal management DB 5003 (step S106-1). In this case, the alteration request information "CALL" received by the transmitter-receiver unit 51 is determined in advance by the alteration request information determination unit 63 as non-specific alteration request information. The status management unit 53 thus only acquires the communication status of the destination terminal (terminal 10cb). In this case, the status acquisition unit 53b searches the terminal management table (see FIG. 11) by the terminal ID "01cb" of the destination terminal (terminal 10cb) as a search key, and acquires the communication status "NONE" of the destination terminal (terminal 10cb) that has requested the participation in the communication data session.

Subsequently, the status alteration unit 53c of the status management unit 53 acquires pre-alteration status information of the destination terminal corresponding to the alteration request information "CALL" (step S106-2). In this case, the status alteration unit 53c searches the status alteration management table (see FIG. 16) by the alteration request information "CALL" as a search key, and acquires the pre-alteration status information "NONE" of the destination terminal (terminal 10cb).

Subsequently, the status alteration unit 53c compares the communication status acquired by the status acquisition unit 53b and the pre-alteration status information acquired by the status alteration unit 53c and determines whether the communication status matches the pre-alteration status information (step S106-3). In this case, the status alteration unit 53c compares the communication status "NONE" of the destination terminal (terminal 10cb) acquired by the status acquisition unit 53b and the pre-alteration status information "NONE" of the destination terminal (terminal 10cb) acquired by the status alteration unit 53c and determines whether the communication status matches the pre-alteration status information.

If the communication status of the destination terminal acquired by the status acquisition unit 53b and the pre-alteration status information of the destination terminal acquired by the status alteration unit 53c are matched (YES in step S106-3), the status alteration unit 53c acquires alteration information of the destination terminal associated with the alteration request information "CALL" (step S106-4). In this case, the status alteration unit 53c searches the status alteration management table (see FIG. 16) by the alteration request information "CALL" as a search key, and acquires the alteration information "ACCEPTED" of the destination terminal (terminal 10cb).

Subsequently, the status alteration unit 53c alters the communication status field of the record associated with the terminal ID "01cb" in the terminal management table (see FIG. 11) based on the terminal ID "01cb" of the destination terminal (terminal 10cb) (step S106-5). In this case, the communication status field of the record associated with the terminal ID "01cb" in the terminal management table is altered to "ACCEPTED" based on the acquired alteration information of the destination terminal. Further, the determination unit 61 determines appropriate processes (see steps S107-1, S107-2, and S107-3) for transmitting information indicating that the participation request has been authorized to the request source terminal (terminal 10aa) and the destination terminals (terminals 10cb, 10db) for performing call-control on the communications between the request source terminal (terminal 10aa) and the destination terminals (terminals 10cb, 10db).

Note that if the communication status and the pre-alteration status information of the destination terminal (terminal 10cb) are not matched (NO in step S106-3), the status alteration unit 53c does not alter the communication status field of the record associated with the terminal ID "01cb" in the terminal management table (see FIG. 11). In this case, the determination unit 61 determines an appropriate process for creating a predetermined error message and transmitting it to the destination terminal (terminal 10cb). Subsequently, the transmitter-receiver unit 51 creates the predetermined error message and transmits it to the destination terminal (terminal 10cb), thereby completing the process.

Next, referring back to FIG. 32, a process to be performed when transmission of information indicating that the participation request has been authorized to the request source terminal (terminal 10aa) and the destination terminals (terminals 10cb, 10db) are determined by the determination unit 61 is described. Initially, the session management unit 57 inserts the terminal ID "01cb" of the destination terminal (terminal 10cb) that has requested for the participation in the communication data session into the destination terminal ID field of the record associated with the session ID "se1" in the session management table of the nonvolatile storage unit 5000 (see FIG. 13).

Subsequently, the transmitter-receiver unit 51 of the management system 50 transmits the participation report containing the terminal ID of the terminal (terminal 10cb) for participating in the communication data session sed and the session ID "se1" to the request source terminal (terminal 10aa) and the terminal ID "01db" of the destination terminal (terminal 10db) that have already participated in the communication data session sed (steps S107-1, S107-2). Accordingly, the request source terminal (terminal 10aa) and the destination terminal (terminal 10db) may detect the indication that the destination terminal (terminal 10cb) may participate in the communication data session sed. Further, the transmitter-receiver unit 51 of the management system 50 transmits a participation permission report containing the session ID "se1" for participating in the communication data session sed and relay device connecting information utilized for connecting the relay device to the destination terminal (terminal 10cb) that will participate in the communication data session sed (steps S107-3).

On receiving the participation permission report, the transmitter-receiver unit 11 of the destination terminal (terminal 10cb) transmits the session ID "se1" and the relay device connecting information contained in the participation permission report to the relay device 30e, thereby connecting the destination terminal (terminal 10cb) and the relay device 30e (step S108). Further, when the destination terminal (terminal 10db) has connected to the relay device 30e, the transmitter-receiver unit 11 of the destination terminal (10cb) transmits relay request information containing the terminal ID "01cb" of the destination terminal (terminal 10cb), the session ID "se1", and alteration request information "JOIN" indicating a request for initiating relaying of the communication data to the management system 50 at a predetermined timing. Subsequently, the management system 50 and the relay device 30e execute processes similar to those in steps S72-1, S73-1, S74-1, and S75-1, so that a communication data session sed is established between the destination terminal (terminal cb) and the relay device 30e. When the communication data session sed is established between the destination terminal (terminal cb) and the relay device 30e, the relay device 30e may relay low resolution, medium resolution and high resolution image data and audio data between the terminals (terminals 10aa, 10cb and 10db). Accordingly, videoconference may be initiated between the terminals (10aa, 10cb and 10db).

Subsequently, a process in which the request source terminal (terminal 10aa) leaves (quits) the communication data session that has been established between the request source terminal (terminal 10aa) and the destination terminals (terminals 10cb, 10db) is described with reference to FIG. 34. Note that FIG. 20 illustrates a process in which various management information items are transmitted and received via the management information session sei.

Initially, the user of the request source terminal (terminal 10aa) presses an operations button 108 illustrated in FIG. 2 to receive a leaving request for leaving the communication data session sed (step S111). The transmitter-receiver unit 11 of the request source terminal (terminal 10aa) transmits session leaving request information containing the terminal ID "01aa" of the request source terminal (terminal 10aa), alteration request information "LEAVE" indicating a request for leaving the communication data session and the session ID "se1" to the management system 50 (step S112).

On receiving the session leaving request, the status management unit 53 of the management system 50 alters the communication status field of the record associated with the terminal ID "01aa" in the terminal management table (see FIG. 11) based on the terminal ID "01aa" of the request source terminal 10aa contained in the session leaving request (step S113).

Herein, the process in step S113 is described further in detail with reference to FIG. 30. Initially, the status acquisition unit 53b of the status management unit 53 illustrated in FIG. 5 acquires the communication statuses of the terminals managed by the terminal management DB 5003 (step S113-1). In this case, the alteration request information "LEAVE" received by the transmitter-receiver unit 51 is determined in advance by the alteration request information determination unit 63 as non-specific alteration request information. The status management unit 53 thus only acquires the communication status of the request source terminal (terminal 10aa). In this case, the status acquisition unit 53b searches the terminal management table (see FIG. 11) by the terminal ID "01aa" of the request source terminal (terminal 10aa) as a search key, and acquires the communication status "BUSY" of the request source terminal (terminal 10aa).

Subsequently, the status alteration unit 53c of the status management unit 53 acquires pre-alteration status information of the request source terminal (terminal 10aa) corresponding to the alteration request information "LEAVE" (step S113-2). In this case, the status alteration unit 53c searches the status alteration management table (see FIG. 16) by the alteration request information "LEAVE" as a search key, and acquires the pre-alteration status information "BUSY" of the request source terminal (terminal 10aa).

Subsequently, the status alteration unit 53c compares the communication status acquired by the status acquisition unit 53b and the pre-alteration status information acquired by the status alteration unit 53c and determines whether the communication status matches the pre-alteration status information (step S113-3). In this case, the status alteration unit 53c compares the communication status "BUSY" of the request source terminal (terminal 10aa) acquired by the status acquisition unit 53b and the pre-alteration status information "BUSY" of the request source terminal (terminal 10aa) acquired by the status alteration unit 53c and determines whether the communication status matches the pre-alteration status information.

If the communication status of the terminal acquired by the status acquisition unit 53b and the pre-alteration status information of the terminal acquired by the status alteration unit 53c are matched (YES in step S113-3), the status alteration unit 53c acquires alteration information of the terminal associated with the alteration request information "LEAVE" (step S113-4). In this case, the status alteration unit 53c searches the status alteration management table (see FIG. 16) by the alteration request information "LEAVE" as a search key, and acquires the pre-alteration status information "NONE".

Subsequently, the status alteration unit 53c alters the communication status field of the record associated with the terminal ID "01aa" in the terminal management table (see FIG. 11) based on the terminal ID "01aa" of the request source terminal 10aa (step S113-5). In this case, the communication status field of the record associated with the terminal ID "01aa" in the terminal management table is altered to "NONE" based on the acquired alteration information of the request source terminal. Further, the determination unit 61 determines an appropriate process for transmitting information indicating that the leaving from the communication data session has been authorized to the destination terminals in order to perform call-control on the communications between the request source terminal (terminal 10aa) and the destination terminals (terminals 10cb, 10db).

Note that if the communication status and the pre-alteration status information of the request source terminal (10aa) are not matched (NO in step S113-3), the status alteration unit 53c does not alter the communication status field of the record associated with the terminal IDs "01aa" in the terminal management table (see FIG. 11). In this case, the determination unit 61 determines an appropriate process for creating a predetermined error message and transmitting it to the request source terminal (terminal 10aa). Subsequently, the transmitter-receiver unit 51 creates the predetermined error message and transmits it to the request source terminal (terminal 10aa), thereby completing the process.

Next, referring back to FIG. 34, a process subsequent to the process of transmitting the information on the session leaving permission to the corresponding destination terminals determined by the determination unit 61 is described. Initially, the session management unit 57 deletes the terminal ID "01aa" of the request source terminal (terminal 10aa) from the request source terminal ID field of the record associated with the session ID "se1" in the session management table of the nonvolatile storage unit 5000 (see FIG. 13) (step S114). The management system 50 transmits a report indicating a request for leaving from the communication data session containing the terminal ID "01aa" of the request source terminal 10aa and the session ID "se1" to the relay device 30e (step S115). Accordingly, the communication data session is terminated between the request source terminal (terminal 10aa) and the relay device 30e, and the request source terminal (terminal 10aa) is disconnected from the relay device 30e. Subsequently, the relay device 30e transmits the report indicating the permission for the request for leaving from the communication data session containing the terminal ID "01aa" of the request source terminal 10aa and the session ID "se1" to the management system 50 (step S116).

On receiving the report indicating the permission for the request for leaving from the communication data session, the management system 50 transmits session leaving permission information containing the terminal ID "01aa" of the request source terminal 10aa, the alteration request information "LEAVE", reporting information "OK" indicating the permission for leaving from the communication data session and the session ID "se1" to the request source terminal (terminal 10aa) (step S117). On receiving the session leaving permission information, the user of the request source terminal (terminal 10aa) presses a power switch 109 illustrated in FIG. 2 to receive a power off request (step S118). On receiving the power off request, the transmitter-receiver unit 11 of the terminal 10aa transmits disconnection request information containing the terminal ID "01aa" of the terminal 10aa, report information indicating disconnecting of the terminal 10aa from the management system 50 to management system 50 (step S119).

When the transmitter-receiver unit 51 of the management system 50 receives the disconnection request information, the status management unit 53 deletes a record of the communication status field associated with the terminal ID "01aa" in the terminal management table (see FIG. 11) based on the terminal ID "01aa" of the request source terminal 10aa contained in the disconnection request information (step S120). Subsequently, the transmitter-receiver unit 51 transmits disconnection permission information indicating that the disconnection request has been authorized to the request source terminal (terminal 10aa) (step S121). Accordingly, the management data session is terminated between the request source terminal (terminal 10aa) and the management system 50, and the request source terminal (terminal 10aa) is disconnected from the management system 50.

On receiving the disconnection permission information, the request source terminal (terminal 10aa) executes switching off the power, thereby completing the process (step S122). The terminals 10cb and 10db may also leave the communication data session sed in a similar manner as the processes carried out by the request source terminal 10aa in steps S111 to S121 to complete (terminate) the communications between the terminals.

Major Effects of Embodiment

As described above, in the transmission system according to the embodiment, the management system 50 manages the communication status of the terminal 10 that communicates with another terminal. When the management system 50 receives the alteration request information indicating a request for altering the communication status of the terminal 10, the management system 50 may alter the communication status of the terminal 10 based on the received alteration request information and the communication status of the terminal 10 managed by the management system 50. Accordingly, since the management system 50 may detect the communication status of the terminal 10, the management system 50 may effectively control the connection between the terminals.

In addition, the management system 50 further manages the communication status of another terminal. When the management system 50 receives the alteration request information indicating a request for altering the communication status of another terminal, the management system 50 may alter the communication status of another terminal based on the received alteration request information and the communication statuses of the terminals managed by the management system 50. Accordingly, since the management system 50 manages the communication status of another terminal, the management system 50 may effectively control the connection between the terminals.

Moreover, when the alteration request information is determined as specific alteration request indicating the request for altering the communication status of another terminal, the management system 50 may acquire the communication statuses of another terminal. Accordingly, the management system 50 may be able to effectively alter one or both of the communication statuses of the terminals that initiate the communication based on various alteration request information.

Further, the management system 50 includes the status alteration management DB 5009 formed of the status alteration management table having the alteration request information, the pre-alteration status information and the post-alteration management information that are associated with one another. Accordingly, the management system 50 may be able to effectively alter the communication statuses of the terminals based on the alteration request information received by the transmitter-receiver unit 51 and the communication status acquired by the status acquisition unit 53b.

Moreover, when the communication status of the terminal 10 does not match the predetermined communication status corresponding to the predetermined alteration request information, the management system 50 does not alter the status information of the terminal 10, and when the communication status of another terminal does not match the predetermined communication status corresponding to the predetermined alteration request information, the management system 50 does not alter the status information of another terminal. Accordingly, the management system 50 may be able to accurately manage the communication statuses of the terminal 10 and another terminal.

Further, the management system 50 transmits the predetermined information utilized for altering the communication statuses based on the predetermined alteration request information to at least one of the terminal 10 and another terminal. Accordingly, the management system 50 may be able to effectively control the connection between the terminal 10 and another terminal.

Moreover, when the terminal 10 as the request source terminal receives the alteration request information indicating the request for initiating the communication with plural terminals as the destination terminals, the management system 50 transmits the predetermined information indicating the request for initiating the communication to the plural destination terminals. Accordingly, the management system 50 may be able to effectively control the connections between the request source terminal and the destination terminals when the communications between the request source terminal and the destination terminals are initiated in another area.

Further, when the management system 50 receives the predetermined alteration request information indicating the rejection of the initiation of the communication with the request source terminal from any one of the destination terminals, the management system 50 determines whether the predetermined alteration request information indicating the rejection of the initiation of the communication with the request source terminal is received from all the destination terminals, and alters the status information of the request source terminal based on the determined result. Accordingly, the management system 50 may be able to accurately manage the communication statuses of the request source terminal when the management system 50 receives the alteration request information indicating the rejection of the initiation of the communication with the request source terminal from the destination terminals.

Further, the management system 50 alters the status of the terminal 10 managed by the management system 50 into the status indicating the connection or the disconnection when the management system 50 receives information based on the connection or the disconnection between the terminal 10 and the management system 50. Accordingly, the management system 50 may be able to accurately manage the communication status of the terminal 10 when the terminal 10 and the management system are connected or disconnected.

Supplementary Information of Embodiment

The above embodiment has described a case where the user of the request source terminal (terminal 10aa) selects the destination terminals (terminals 10bb, 10cb, 10db) to initiate communications; however, the embodiment is not limited to the aforementioned case. The user of the request source terminal (terminal 10aa) may select the own terminal (i.e., terminal 10aa) as the destination terminal. When the own terminal (terminal 10aa) is selected as the destination terminal, the communication data session sed is initially established between the request source terminal (terminal 10aa) and the relay device 30. Subsequently, the request source terminal (terminal 10aa) specifies a desired destination terminal, receives information indicating a request for reporting the session ID required for participating in the communication data session sed to the specified destination terminal (step S101), and initiates communications by executing the process of requesting participation in the communication data session sed. Note that when the request source terminal (terminal 10aa) selects own terminal as a destination terminal and transmits the alteration request information "INVITE" to the own terminal (terminal 10aa), the management system 50 searches the status alteration management table (see FIG. 17) by the terminal information "own terminal selection" as a search key, and alters the status of the request source terminal (terminal 10aa).

In this embodiment, the address list frame 11-1 including the destination names 11-2, icons 11-3a and the like is displayed as illustrated in FIG. 22; however, the destination names 11-2, icons 11-3a and the like may be displayed without the address list frame 11-1.

Further, according to the embodiment, the management system 50 and the program providing system 90 may be integrated in a single computer, or various functions and units of the management system 50 and the program providing system 90 may be separately arranged in two or more computers. Moreover, if the program providing system 90 is formed in a single computer, programs transmitted via the program providing system 90 may be grouped into two or modules or may not be grouped. Further, if the program providing system 90 is formed of two or more computers, the programs grouped into modules may be transmitted from the separate computers.

Moreover, according to the embodiment, recording media storing a terminal program, a relay device program and a transmission management program, and the program providing system 90 including the HD 204 storing such programs may be distributed to users domestically and abroad as a program product.

Further, according to the embodiment, the image data relayed by the relay device 30 are managed based mainly focused on the resolutions of the images as an example of quality of the images by utilizing the alteration quality management table illustrated in FIG. 7 and the quality management table illustrated in FIG. 14. However, the quality of the images is not limited to this example. The quality of images may be managed based on the depth of the image data, the sampling frequency of the audio data, or the bit length of the audio data.

In addition, the receipt time and dates are managed by the relay device management table, the terminal management table and the session management table illustrated in FIGS. 9, 11 and 13. However, at least the receipt time may be managed by the relay device management table, the terminal management table and the session management table.

Moreover, according to the embodiment, the IP addresses of the relay devices are managed by the relay device management table, and the IP addresses of the terminals are managed by the terminal management table as illustrated in FIGS. 9 and 11. However, alternatively, respective fully qualified domain names (FQDNs) of the relay devices 30 and the terminals 10 may be managed instead of the respective IP addresses as relay device specifying information for specifying the relay devices 30 over the communication network 2 and terminal specifying information for specifying the terminals 10 over the communication network 2. In this case, a known domain name system (DNS) server may acquire the IP address corresponding to the FQDN. Note that the "relay device specifying information for specifying the relay devices 30 over the communication network 2" may also be expressed as "relay device access point information indicating access points of the relay devices 30 over the communication network 2" or "relay device destination information indicating destinations of the relay devices 30 over the communication network 2". Likewise, the "terminal specifying information for specifying the terminals 10 over the communication network 2" may also be expressed as "terminal access point information indicating access points of the terminals 10 over the communication network 2" or "terminal destination information indicating destinations of the terminals 10 over the communication network 2".

In this embodiment, the terms "videoconference" and "teleconference" may be interchangeably used.

Further, according to the above embodiment, the video conference system is described as an example of the transmission system 1; however, the transmission system 1 may not be limited to the video conference system. The transmission system 1 may be a telephone system such as an Internet protocol (IP) phone or an Internet phone. Further, the transmission system 1 may be a car navigation system. In this case, one of the terminals 10 may be a car navigation device mounted on a vehicle and the other terminal 10 may be a management terminal or a management server configured to manage the car navigation, or another car navigation device mounted on another vehicle. Further, the transmission system 1 may be an audio conferencing system or a personal computer (PC) screen shared system.

In addition, the transmission system 1 may be a mobile phone communication system. In this case, the terminal 10 may be a mobile phone terminal. FIG. 35 illustrates an example of an address list displayed on the mobile phone terminal. Specifically, the mobile phone terminal as the terminal 10 includes a main body 10-1, a menu screen display button 10-2 arranged on the main body 10-1, a display unit 10-3 arranged on the main body 10-1, a microphone provided in a lower part of the main body 10-1 and a speaker provided in a surface of the main body 10-1. Among these, the "menu screen display button" 10-2 is utilized for displaying a menu screen on which icons of various applications are displayed. The display unit 10-3 is formed of a touch panel on which the user touches with a finger or hand to select a desired address name to communicate with a person of the desired address name.

Further, according to the above embodiment, the image data and the audio data are described as an example of the content data; however, the content data may not be limited to the image data or the audio data. The content data may be touch data (tactile data). In this case, a tactile sense obtained by the user who has touched one terminal may be transmitted to the other terminal. Further, the content data may be smell (olfactory sense) data. In this case, the smell (odor) obtained by one terminal may be transmitted to the other terminal. Further, the content data may be at least one of the image data, the audio data, the touch data and the smell data.

Moreover, according to the above embodiment, the video conference system implemented by the transmission system 1 is described; however, the transmission system 1 may not be limited to the video conference system. The transmission system 1 may be utilized for a preliminary meeting, a general conversation between family members or friends, or one-way presentation of information.

As described above, in the transmission system according to the embodiment, a transmission management system manages a communication status of a first transmission terminal that communicates with a second transmission terminal. When the transmission management system receives alteration information for altering the communication status of the first transmission terminal from the first transmission terminal, the transmission management system alters the communication status of the first transmission terminal based on the received alteration information and the communication status of the first transmission terminal managed by the transmission management system. Accordingly, since the transmission management system detects the communication status of the first transmission terminal, the transmission management system may effectively control connection between the first and second transmission terminal.

The advantages illustrated above are merely examples of the most preferred ones provided by the embodiments, and therefore are not limited to those described in the embodiments.

Embodiments of the present invention have been described heretofore for the purpose of illustration. The present invention is not limited to these embodiments, but various variations and alterations may be made without departing from the scope of the present invention. The present invention should not be interpreted as being limited to the embodiments that are described in the specification and illustrated in the drawings.

The invention claimed is:

1. A transmission management system comprising:
a memory configured to store status information indicating a communication status between one of transmission terminals and another one of the transmission terminals, for each of the transmission terminals;
a receiver configured to receive a communication initiating request from a first transmission terminal of the transmission terminals to a second transmission terminal of the transmission terminals;
one or more processors, wherein when the communication initiating request is received by the receiver, the processors determine whether each of first status information of the first transmission terminal stored in the memory and second status information of the second transmission terminal stored in the memory indicates a status in which a corresponding one of the first transmission terminal and the second transmission terminal does not communicate with other transmission terminals, and when the processors determine that each of the first status information of the first transmission terminal and the second status information of the second transmission terminal indicates a status in which a corresponding one of the first transmission terminal and the second transmission terminal does not communicate with other transmission terminals, the processors select a desired one of relay devices configured to relay content data transmitted between the first transmission terminal and the second transmission terminal; and
a transmitter configured to transmit connection information to each of the first transmission terminal and the second transmission terminal for connecting a corresponding one of the first transmission terminal and the second transmission terminal to the relay device selected by the processors,
wherein
the memory stores a piece of operating status information indicating that each transmission terminal is online or offline, for each of the transmission terminals, the operating status information differing from the communication status indicating a status of communications performed by the corresponding transmission terminal with other transmission terminals, and
wherein
the transmitter transmits the respective operating status information pieces of the transmission terminals serving as the destination candidates for the first transmission terminal to cause display of the transmitted operation status information pieces on a screen of the first transmission terminal, in response to the first transmission terminal that has logged in the transmission management system.

2. The transmission management system as claimed in claim 1, wherein
the memory stores relay device identification information pieces for identifying the different relay devices, and
when the processors determine that each of the first status information of the first transmission terminal and the second status information of the second transmission terminal indicates a status in which a corresponding one of the first transmission terminal and the second transmission terminal does not communicate with other transmission terminals, the processors select the desired one of the relay devices from the different relay device identification information pieces stored in the memory.

3. The transmission management system as claimed in claim 2, wherein
the connection information transmitted to the second transmission terminal includes at least address information of the relay device corresponding to the selected relay identification information.

4. The transmission management system as claimed in claim 1, wherein
the communication initiating request received by the receiver includes the second transmission terminal selected as a destination from the transmission terminals serving as destination candidates, based on an instruction input from a user received by the first transmission terminal.

5. The transmission management system as claimed in claim 1, wherein
the memory stores the communication status indicating the status of the communications with other transmission terminals in association with the terminal identification information for identifying the transmission terminals, and
the processors determine whether each of the first status information and the second status information acquired from the memory indicates a status in which a corresponding one of the first transmission terminal and the second transmission terminal does not communicate with other transmission terminals by utilizing terminal identification information for identifying each of the first transmission terminal and the second transmission terminal included in the communication initiating request.

6. The transmission management system as claimed in claim 1, wherein
when at least one of the first status information of the first transmission terminal and the second status information of the second transmission terminal stored in the memory indicates a status other than a status in which the corresponding transmission terminal does not communicate with other transmission terminals, the transmitter transmits information indicating an error to the first transmission terminal.

7. The transmission management system as claimed in claim 1, wherein
the processors
generate session identification information for identifying a session established between the first transmission terminal and the second transmission terminal when each of the first status information and the second status information is changed from status information indicating a status in which the corresponding one of the first transmission terminal and the second transmission terminal does not communicate with other transmission terminals to status information indicating a status other than the status in which the corresponding one of the first transmission terminal and the second transmission terminal does not communicate with other transmission terminals,
store the generated session identification information in association with the first transmission terminal and the second transmission terminal in the memory, and
utilize the session identification information stored in the memory for connecting the first transmission terminal and the second transmission terminal via the relay device selected therebetween such that the first transmission terminal and the second transmission terminal communicate the content data to each other.

8. The transmission management system as claimed in claim 7, wherein
the transmitter transmits to the second transmission terminal the session identification information together with the connection information for connecting the first transmission terminal and the second transmission terminal to the selected relay device.

9. The transmission management system as claimed in claim 1, wherein
when the processors determine that each of the first status information of the first transmission terminal and the second status information of the second transmission terminal indicates a status in which a corresponding one of the first transmission terminal and the second transmission terminal does not communicate with other transmission terminals, the processors changes each of the first status information and the second status information from status information indicating the status in which a corresponding one of the first transmission terminal and the second transmission terminal does not communicate with other transmission terminals to status information indicating a status other than the status in which the corresponding one of the first transmission terminal and the second transmission terminal does not communicate with other transmission terminals.

10. The transmission management system as claimed in claim 9, wherein
when the processors change each of the first status information and the second status information from status information indicating a status in which the corresponding one of the first transmission terminal and the second transmission terminal does not communicate with other transmission terminals to status information indicating a status other than the status in which the corresponding one of the first transmission terminal and the second transmission terminal does not communicate with other transmission terminals, the processors change the first status information to status information indicating a status in which the first transmission terminal is calling another transmission terminal, and change the second status information to status information indicating a status in which the second transmission terminal is being called by another transmission terminal.

11. The transmission management system as claimed in claim 1, wherein
the content data includes at least one of image data and audio data.

12. A transmission system comprising:
the transmission management system as claimed in claim 1; and
the plurality of transmission terminals.

13. The transmission system as claimed in claim 12, further comprising:
any one of a teleconference system, a telephone system, a car navigation system, an audio conference system, and a personal computer screen sharing system.

14. The transmission system as claimed in claim 12, further comprising;
a relay device configured to relay content data transmitted between at least two of the transmission terminals connected such that the content data are transmitted by the transmission management system.

15. A method, implemented by a transmission management system, comprising:
storing, in a memory, status information indicating a communication status between one of transmission terminals and another one of the transmission terminals, for each of the transmission terminals;
receiving, by a receiver, a communication initiating request from a first transmission terminal of the transmission terminals to a second transmission terminal of the transmission terminals;
when the communication initiating request is received by the receiver, determining whether each of first status information of the first transmission terminal stored in the memory and second status information of the second transmission terminal stored in the memory indicates a status in which a corresponding one of the first transmission terminal and the second transmission terminal does not communicate with other transmission terminals, and when determining that each of the first status information of the first transmission terminal and the second status information of the second transmission terminal indicates a status in which a corresponding one of the first transmission terminal and the second transmission terminal does not communicate with other transmission terminals, selecting a desired one of relay devices configured to relay content data transmitted between the first transmission terminal and the second transmission terminal; and transmitting connection information to each of the first transmission terminal and the second transmission terminal for connecting a corresponding one of the first transmission terminal and the second transmission terminal to the selected relay device, wherein the method further includes storing, in the memory, a piece of operating status information indicating that each transmission terminal is online or offline, for each of the transmission terminals, the operating status information differing from the communication status indicating a status of communications performed by the corresponding transmission terminal with other transmission terminals, and transmitting the respective operating status information pieces of the transmission terminals serving as the destination candidates for the first transmission terminal to cause display of the transmitted operation status information pieces on a screen of the first transmission terminal, in response to the first transmission terminal that has logged in the transmission management system.

16. A computer-readable recording medium for storing therein a computer program that includes instructions which when executed on a computer causes the computer to execute a method comprising:

storing, in a memory, status information indicating a communication status between one of transmission terminals and another one of the transmission terminals, for each of the transmission terminals;

receiving, by a receiver, a communication initiating request from a first transmission terminal of the transmission terminals to a second transmission terminal of the transmission terminals;

when the communication initiating request is received by the receiver, determining whether each of first status information of the first transmission terminal stored in the memory and second status information of the second transmission terminal stored in the memory indicates a status in which a corresponding one of the first transmission terminal and the second transmission terminal does not communicate with other transmission terminals, and when determining that each of the first status information of the first transmission terminal and the second status information of the second transmission terminal indicates a status in which a corresponding one of the first transmission terminal and the second transmission terminal does not communicate with other transmission terminals, selecting a desired one of relay devices configured to relay content data transmitted between the first transmission terminal and the second transmission terminal; and transmitting connection information to each of the first transmission terminal and the second transmission terminal for connecting a corresponding one of the first transmission terminal and the second transmission terminal to the selected relay device, wherein the method further includes storing, in the memory, a piece of operating status information indicating that each transmission terminal is online or offline, for each of the transmission terminals, the operating status information differing from the communication status indicating a status of communications performed by the corresponding transmission terminal with other transmission terminals, and transmitting the respective operating status information pieces of the transmission terminals serving as the destination candidates for the first transmission terminal to cause display of the transmitted operation status information pieces on a screen of the first transmission terminal, in response to the first transmission terminal that has logged in the transmission management system.

* * * * *